US012773615B2

(12) United States Patent
Schroder, IV et al.

(10) Patent No.: US 12,773,615 B2
(45) Date of Patent: Oct. 27, 2026

(54) GOLF TOURNAMENT MANAGEMENT SYSTEM

(71) Applicant: PGA TOUR Enterprises, LLC, Ponte Vedra Beach, FL (US)

(72) Inventors: William Henry Schroder, IV, Ponte Vedra Beach, FL (US); Jacqueline Shelly, Ponte Vedra Beach, FL (US); Barry Walker, Ponte Vedra Beach, FL (US); Kevin Kerr, Ponte Vedra Beach, FL (US); Spencer Border, Ponte Vedra Beach, FL (US)

(73) Assignee: PGA TOUR Enterprises, LLC, Ponte Vedra Beach, FL (US)

( * ) Notice: Subject to any disclaimer, the term of this patent is extended or adjusted under 35 U.S.C. 154(b) by 0 days.

(21) Appl. No.: 19/316,308

(22) Filed: Sep. 2, 2025

(65) Prior Publication Data

US 2026/0175106 A1 Jun. 25, 2026

Related U.S. Application Data

(63) Continuation of application No. 18/999,995, filed on Dec. 23, 2024, now Pat. No. 12,403,375.

(51) Int. Cl.
*A63B 71/06* (2006.01)
*A63B 24/00* (2006.01)
(Continued)

(52) U.S. Cl.
CPC ...... *A63B 71/0616* (2013.01); *A63B 24/0062* (2013.01); *A63B 71/0622* (2013.01);
(Continued)

(58) Field of Classification Search
CPC ............ A63B 71/0616; A63B 24/0062; A63B 71/0622; A63B 2102/32; A63B 2071/0636; A63B 2220/70; G06F 16/29
See application file for complete search history.

(56) References Cited

U.S. PATENT DOCUMENTS 5,046,107 A 9/1991 Iwamatsu
5,364,093 A 11/1994 Huston et al.
(Continued)

FOREIGN PATENT DOCUMENTS

EP 0710494 A1 5/1996
EP 2515548 A1 10/2012
(Continued)

OTHER PUBLICATIONS

International Search Report issued Mar. 30, 2023 in connection with PCT Application No. PCT/US23/10229.
(Continued)

*Primary Examiner* — Steven J Hylinski
(74) *Attorney, Agent, or Firm* — Blank Rome LLP

(57) ABSTRACT

A golf tournament management system may include a visualization system to generate graphical display data with respect to a golf course. A course variable specification unit may enable user specification of course variables including simulated sensor device placements, each simulated sensor device having a simulated field of view with respect to a simulated coverage area, and course setup variables. A simulation engine may execute play simulations of a player field on the golf course utilizing the course variables and output performance metrics with respect to simulated capture of balls, players, or both within the simulated coverage areas during play. The visualization system may provide field of view visualizations within the graphical display data comprising simulated field of view overlays representing the simulated coverage areas.

4 Claims, 31 Drawing Sheets

(51) Int. Cl.
*G06F 16/29* (2019.01)
*A63B 102/32* (2015.01)

(52) U.S. Cl.
CPC ...... *G06F 16/29* (2019.01); *A63B 2071/0636* (2013.01); *A63B 2102/32* (2015.10); *A63B 2220/70* (2013.01)

(56) References Cited

U.S. PATENT DOCUMENTS 5,562,550 A 10/1996 Chartrand
5,685,786 A 11/1997 Dudley
5,740,077 A 4/1998 Reeves
5,984,798 A 11/1999 Gilmour
6,072,504 A 6/2000 Segen
6,162,129 A 12/2000 Nielsen
6,296,579 B1 10/2001 Robinson
6,456,938 B1 9/2002 Barnard
6,579,190 B2 6/2003 Yamamoto
6,774,932 B1 8/2004 Ewing et al.
7,306,524 B1 12/2007 Rogers
7,847,808 B2 * 12/2010 Cheng .................. G06T 19/006 463/3
8,355,903 B1 1/2013 Birnbaum et al.
8,517,854 B2 8/2013 Jung
8,693,848 B1 4/2014 Pacor
9,028,344 B2 5/2015 Baker et al.
9,298,986 B2 3/2016 Ferlatte et al.
9,460,242 B2 10/2016 Kamino
10,325,410 B1 6/2019 Smith et al.
10,478,706 B2 11/2019 O'Connor et al.
11,443,404 B1 * 9/2022 Kokins ................. G06T 15/005
11,582,522 B1 2/2023 Mahyar et al.
11,607,601 B1 3/2023 Lovell et al.
11,745,084 B1 9/2023 Lovell et al.
11,872,464 B1 1/2024 Vitti et al.
11,946,997 B2 4/2024 Tuxen
11,986,699 B1 5/2024 Walker et al.
11,998,829 B2 6/2024 Lovell et al.
12,161,913 B2 12/2024 Walker et al.
12,179,085 B2 12/2024 Vitti et al.
12,397,220 B2 8/2025 Vitti et al.
12,399,476 B2 8/2025 Johnson et al.
12,403,375 B1 9/2025 Schroder, IV et al.
12,418,705 B2 9/2025 Fegan et al.
12,432,392 B1 9/2025 Raimondo et al.
12,458,842 B2 11/2025 Walker et al.
12,510,206 B2 12/2025 Howell et al.
2001/0030667 A1 10/2001 Kelts
2001/0035880 A1 11/2001 Musatov et al.
2002/0004723 A1 1/2002 Meifu et al.
2002/0151994 A1 10/2002 Sisco
2002/0161461 A1 10/2002 Lobb et al.
2003/0191547 A1 10/2003 Morse
2004/0007617 A1 1/2004 Shaw et al.
2005/0096761 A1 5/2005 Hanover et al.
2005/0101415 A1 5/2005 Sweeney
2005/0172323 A1 8/2005 Yang et al.
2005/0227791 A1 10/2005 McCreary et al.
2005/0261069 A1 11/2005 Weeks
2006/0247807 A1 11/2006 Bernstein et al.
2007/0047542 A1 3/2007 Thukral
2007/0129178 A1 6/2007 Reeves
2007/0167247 A1 7/2007 Lindsay
2008/0065740 A1 3/2008 Baio et al.
2008/0068511 A1 3/2008 Yeh et al.
2008/0261711 A1 10/2008 Tuxen
2009/0017944 A1 1/2009 Savarese et al.
2009/0036237 A1 2/2009 Nipper et al.
2009/0222793 A1 9/2009 Frank et al.
2009/0239685 A1 9/2009 Belton
2010/0009780 A1 1/2010 Doherty
2010/0156906 A1 * 6/2010 Montgomery ........ G06T 15/205 345/427
2010/0303145 A1 12/2010 Nambiath
2010/0321581 A1 12/2010 Lwakura
2010/0332968 A1 12/2010 Squillace
2011/0013087 A1 1/2011 House et al.
2012/0004956 A1 1/2012 Huston et al.
2012/0238380 A9 9/2012 Marty et al.
2012/0322582 A1 12/2012 Solheim et al.
2013/0085018 A1 4/2013 Jensen et al.
2013/0162467 A1 6/2013 Winther
2013/0166048 A1 6/2013 Werner et al.
2013/0237346 A1 9/2013 Sweeney
2014/0152832 A1 6/2014 Goldfeder
2014/0195675 A1 7/2014 Silver
2014/0274240 A1 9/2014 Meadows
2014/0317040 A1 10/2014 Liu et al.
2014/0365640 A1 12/2014 Wohl et al.
2015/0032237 A1 1/2015 Roebke
2015/0126308 A1 5/2015 Penn et al.
2015/0196822 A1 7/2015 Voutilainen et al.
2015/0312652 A1 10/2015 Baker et al.
2015/0343292 A1 12/2015 Leech
2016/0008696 A1 1/2016 Bastawros
2016/0012640 A1 * 1/2016 Abraham .............. A63F 13/655 345/420
2016/0101358 A1 4/2016 Ibrahim et al.
2016/0234566 A1 8/2016 Suoknuuti et al.
2016/0234567 A1 8/2016 Suoknuuti et al.
2016/0360378 A1 12/2016 Borowski et al.
2016/0364087 A1 12/2016 Thompson
2017/0021260 A1 1/2017 Willett et al.
2017/0125064 A1 5/2017 Aggarwal et al.
2017/0178687 A1 6/2017 Tamir et al.
2017/0250941 A1 8/2017 Weisberg et al.
2018/0007448 A1 1/2018 Gupta et al.
2018/0114375 A1 4/2018 Lucas
2018/0120428 A1 5/2018 Tuxen et al.
2018/0190077 A1 7/2018 Hall et al.
2018/0285491 A1 10/2018 O'Connor et al.
2018/0288496 A1 10/2018 Ade et al.
2018/0316874 A1 11/2018 Nakamura
2019/0045258 A1 2/2019 Egedi et al.
2019/0089996 A1 3/2019 Surcouf et al.
2019/0192951 A1 6/2019 Rojas et al.
2019/0255418 A1 8/2019 Seo
2019/0267041 A1 8/2019 Ricciardi
2019/0299056 A1 10/2019 Vollbrecht et al.
2019/0349647 A1 11/2019 Hall
2019/0354763 A1 11/2019 Stojancic et al.
2020/0004322 A1 1/2020 Kudirka et al.
2020/0086200 A1 3/2020 McCartin
2020/0107075 A1 4/2020 Davies et al.
2020/0164258 A1 * 5/2020 Tuxen ................ G09B 19/0038
2020/0236288 A1 7/2020 Schwartz et al.
2020/0269121 A1 8/2020 Ferras
2020/0320305 A1 10/2020 Park
2021/0037168 A1 * 2/2021 Mathur ................... H04L 65/61
2021/0089761 A1 3/2021 Tyomkin
2021/0113912 A1 4/2021 Ebert et al.
2021/0213357 A1 * 7/2021 Morishita ........... A63F 13/5252
2021/0220718 A1 7/2021 Tuxen et al.
2021/0228943 A1 7/2021 Marais et al.
2021/0295533 A1 9/2021 DeLeon et al.
2021/0344972 A1 11/2021 Burkhart et al.
2022/0116551 A1 4/2022 Hiraishi et al.
2022/0138969 A1 5/2022 Forsgren et al.
2022/0176224 A1 6/2022 Tuxen
2022/0196783 A1 6/2022 Dorris et al.
2022/0219065 A1 7/2022 Rankin et al.
2022/0280855 A1 9/2022 Tuxen et al.
2022/0284625 A1 9/2022 Tuxen et al.
2022/0284628 A1 9/2022 Tuxen et al.
2022/0296964 A1 9/2022 Thurner
2022/0305365 A1 9/2022 Cunningham-Rhoads et al.
2022/0319173 A1 10/2022 Ricciardi
2022/0321892 A1 10/2022 Liu
2022/0327830 A1 10/2022 Chang et al.
2022/0335790 A1 10/2022 Tucker
2022/0387873 A1 12/2022 Hall et al.
2022/0399042 A1 12/2022 Beatch
2022/0400202 A1 12/2022 Imes

(56) References Cited

U.S. PATENT DOCUMENTS

| | | | |
|---|---|---|---|
| 2023/0085842 | A1 | 3/2023 | Hugmark |
| 2023/0186493 | A1 | 6/2023 | Lee et al. |
| 2023/0199295 | A1 | 6/2023 | Jansson et al. |
| 2023/0218948 | A1 | 7/2023 | Yang et al. |
| 2023/0267736 | A1 | 8/2023 | Green et al. |
| 2023/0267737 | A1 | 8/2023 | Green et al. |
| 2023/0275950 | A1 | 8/2023 | Sundareson |
| 2023/0306682 | A1 | 9/2023 | Paris et al. |
| 2023/0372802 | A1 | 11/2023 | Colangelo |
| 2023/0381625 | A1 | 11/2023 | Imes |
| 2023/0405438 | A1 | 12/2023 | Lovell et al. |
| 2024/0017148 | A1 | 1/2024 | Palmgren |
| 2024/0129599 | A1 | 4/2024 | Basser et al. |
| 2024/0259537 | A1 | 8/2024 | Imes |
| 2024/0316436 | A1 | 9/2024 | Lovell et al. |
| 2024/0325847 | A1 | 10/2024 | Peterson et al. |
| 2024/0325859 | A1 | 10/2024 | Lovell et al. |
| 2024/0416207 | A1 | 12/2024 | Johnson |
| 2025/0085434 | A1 | 3/2025 | Shevelev |
| 2025/0099808 | A1 | 3/2025 | Walker et al. |
| 2025/0144471 | A1 | 5/2025 | Haddad |
| 2025/0155862 | A1 | 5/2025 | Johnson et al. |
| 2025/0158448 | A1 | 5/2025 | Rabhan et al. |
| 2025/0170472 | A1 | 5/2025 | Vitti et al. |
| 2025/0186836 | A1 | 6/2025 | Craven et al. |
| 2025/0216022 | A1 | 7/2025 | Howell et al. |
| 2025/0220281 | A1 | 7/2025 | Fegan et al. |
| 2025/0249339 | A1 | 8/2025 | Mullen et al. |
| 2025/0312682 | A1 | 10/2025 | Howell et al. |
| 2026/0012688 | A1 | 1/2026 | Fegan et al. |
| 2026/0059149 | A1 | 2/2026 | Raimondo et al. |
| 2026/0061256 | A1 | 3/2026 | Walker et al. |
| 2026/0078863 | A1 | 3/2026 | Howell et al. |

FOREIGN PATENT DOCUMENTS

| | | | |
|---|---|---|---|
| JP | 2006-094963 | A | 4/2006 |
| JP | 2021-154023 | A | 10/2021 |
| KR | 20040009499 | A | 1/2004 |
| KR | 100767292 | B1 | 10/2007 |
| KR | 20180131739 | A | 12/2018 |
| KR | 20210100723 | A | 8/2021 |
| KR | 102436279 | B1 | 8/2022 |
| WO | 2004042517 | A2 | 5/2004 |
| WO | 2019147388 | A1 | 8/2019 |
| WO | 2022056315 | A1 | 3/2022 |
| WO | 2022096353 | A1 | 5/2022 |

OTHER PUBLICATIONS

Written Opinion of the International Searching Authority issued Mar. 30, 2023 in connection with PCT Application No. PCT/US23/10229.

International Search Report issued Apr. 18, 2024 in connection with PCT Application No. PCT/US23/81333.

Written Opinion of the International Searching Authority issued Apr. 18, 2024 in connection with PCT Application No. PCT/US23/81333.

International Search Report issued Mar. 3, 2025 in connection with PCT Application No. PCT/US24/61117.

Written Opinion of the International Searching Authority issued Mar. 3, 2025 in connection with PCT Application No. PCT/US24/61117.

International Search Report issued Mar. 7, 2025 in connection with PCT Application No. PCT/US24/56303.

Written Opinion of the International Searching Authority issued Mar. 7, 2025 in connection with PCT Application No. PCT/US24/56303.

U.S. Appl. No. 19/087,160, filed Mar. 21, 2025 entitled Golf Cart Tow Link.

U.S. Appl. No. 18/999,995, filed Dec. 23, 2024 entitled Golf Tournament Management System.

U.S. Appl. No. 18/813,325, filed Aug. 23, 2024 entitled Golf Event Broadcast Production System.

U.S. Appl. No. 19/170,473, filed Apr. 4, 2025 entitled Management of Golf Tournament Scoring Data.

International Search Report issued Jul. 15, 2025 in connection with PCT Application No. PCT/US25/14383.

Written Opinion of the International Searching Authority issued Jul. 15, 2025 in connection with PCT Application No. PCT/US25/14383.

Written Opinion of the International Searching Authority issued Jun. 5, 2025 in connection with PCT Application No. PCT/US25/23267.

International Search Report issued Jun. 5, 2025 in connection with PCT Application No. PCT/US25/23267.

U.S. Appl. No. 19/309,127, filed Aug. 25, 2025 entitled Golf Play Outcome Simulation Modeling System.

U.S. Appl. No. 19/308,972, filed Aug. 25, 2025 entitled General Purpose Command System and Interface for a Live Broadcast.

Extended European Search Report issued Feb. 2, 2026 in connection with European Patent Application No. 23824359.6.

Examination Report issued Dec. 5, 2025 in connection with corresponding Australian Patent Application No. 2023294498.

Decision to Grant issued Dec. 16, 2025 in connection with corresponding Japanese Patent Application No. 2024-571325.

International Search Report issued Dec. 15, 2025 in connection with PCT Application No. PCT/US25/043169.

Written Opinion of the International Searching Authority issued Dec. 15, 2025 in connection with PCT Application No. PCT/US25/043169.

Extended European Search Report issued Feb. 23, 2026 in connection with European Patent Application No. 23898691.3.

U.S. Appl. No. 19/316,308, filed Sep. 2, 2025 entitled Golf Tournament Management System.

Invitation to Pay Additional Fees and, Where Applicable, Protest Fee issued Apr. 3, 2026 in connection with 1 corresponding PCT Application No. PCT/US2025/060954.

Abiyev et al., NEUIslanders Team Description Paper RoboCup 2019, Available online: https://tdp.robocup.org/wp-content/uploads/tdp/robocup/2019/robocupsoccer-small-size/neuislanders-141/robocup-2019-robocupsoccer-small-size-neuislandersLxUSasYirF.pdf (Year: 2019).

Lorensen et al., "Golf Green Visualization," IEEE Computer Graphics and Applications, 12.4 (1995): 35-44 (Year: 1992).

Griffiths et al., "To Evaluate the Relative Influence of Coefficient of Friction on the Motion of a Golf Ball (Speed and Roll) During a Golf Putt," Proceedings of the 10th International Symposium on Computer Science in Sports (ISCSS), Advances in Intelligent Systems and Computing, vol. 392 (Year: 2016).

Rist et al., "Golf Ball Deceleration Measuring System to Evaluate Surface Uniformity on Golf Course Greens," Crop Science, vol. 39, Issue 39, Issue 3, pp. 604-941, https://doi.org/10.2135/cropsci1999.0011183X003900030022x (Year: 1999).

Rod Cross, "Rolling to a Stop Down an Inclined Plane," European Journal of Physics, vol. 36, Issue 6, DOI:10.1088/0143-0807/36/6/065047 (Year: 2015).

Examination Report issued Jun. 17, 2026 in connection with corresponding Australian Patent Application No. 2023400140.

Examination Report issued Jul. 16, 2026 in connection with corresponding Australian Patent Application No. 2023294498.

Examiner's Report issued Jul. 30, 2026 in connection with corresponding Canadian Patent Application No. 3257368.

Examination Report issued Jul. 15, 2026 in connection with European Patent Application No. 23824359.6.

Written Opinion of the International Searching Authority issued Jun. 10, 2026 in connection with PCT Application No. PCT/US26/022663.

International Search Report issued Jun. 10, 2026 in connection with PCT Application No. PCT/US26/022663.

Weber, "Green Speed Physics," Apr. 30, 1997, (retrieved on Jun. 1, 2026) Retrieved from the Internet: URL: https://www.waddengolfacademy.com/putting/USGA%20Green%20Speed%20Physics.pdf, pp. 12-15.

(56) References Cited

OTHER PUBLICATIONS

International Search Report issued Jun. 12, 2026 in connection with PCT Application No. PCT/US25/60954.
Written Opinion of the International Searching Authority issued Jun. 12, 2026 in connection with PCT Application No. PCT/US25/60954.

* cited by examiner

1500

GOLF TOURNAMENT MANAGEMENT SYSTEM

CROSS-REFERENCE TO RELATED APPLICATIONS

This patent application is a continuation of U.S. patent application Ser. No. 18/999,995, filed Dec. 23, 2024, the contents of which are hereby incorporated herein by reference.

TECHNICAL FIELD

The present disclosure relates to management of competitive golf events. More specifically, the present disclosure relates to utilization of simulation and historical data to provide insight and guidance golf course setup for competitive events.

SUMMARY

In one aspect, a golf tournament management system includes a visualization system configured to generate graphical display data that when rendered provides graphical display renderings of a golf course. A course variable specification unit may enable user specification of course variables comprising simulated sensor device placements, each simulated sensor device having a simulated field of view with respect to a simulated coverage area, and course setup variables. A simulation engine may simulate play of a player field on the golf course utilizing the course variables and output performance metrics with respect to simulated capture of balls, players, or both within the simulated coverage areas during play. The visualization system may provide field of view visualizations within the graphical display renderings comprising simulated field of view overlays representing the simulated coverage areas.

In one example, the simulation engine may simulate historical or predicted shot-level data comprising shot locations and ball flights for simulated shots, and the visualization system may integrate the shot-level data into the course visualization to depict location plots of captured objects relative to the simulated field of view overlays, thereby enabling visual evaluation of where missed objects traveled outside the simulated coverage areas and supporting both 3D perspective rendering and virtual coverage analysis.

In one example, the simulation engine may output data for evaluating the simulated sensor device placements, comprising whether a proposed simulated sensor device placement would provide a simulated field of view that would adequately capture objects of media or tracking operations of the simulated sensor device. The visualization system may integrate the simulation data into the course visualization to enable visual evaluation of effectiveness of the simulated sensor device placements.

In one example, the course variable specification unit may enable user specification of additional course variables comprising tee and pin placements, environmental variables, and player characteristics. The simulation engine may simulate play of the player field utilizing both the simulated sensor device placements and the additional course variables to output performance metrics with respect to both simulated capture within the simulated coverage areas and predicted player performance.

In another aspect, a golf tournament management system may include a visualization system configured to generate graphical display data that when rendered on a display of a user interface provides a plurality of graphical display renderings of a golf course A course variable specification unit may include course setup features that enable user interaction with the user interface to specify course variables comprising one or more of tee and pin placements, course conditions, environmental variables, or player characteristics. A simulation engine may be configured to receive user input specifying a desired player performance metric and perform simulation modeling configured to output one or more course variables projected to result in the specified player performance metric. The simulation engine may modify one or more of the course variables within simulations to output one or more combinations of course variables projected to achieve the specified player performance metric.

In one example, the simulation engine may perform a statistically significant number of hole simulations with the course variables and calculate predicted performance metrics. In one configuration, each hole simulation comprises performing an optimum target analysis for shots to calculate target landing spots, calculating predicted shot locations using dispersion coefficient calculations, and repeating the target analysis and shot location calculations for subsequent shots until the ball is on the green or in the hole.

In one example, the simulation engine may evaluate performance by comparing simulated performance against the desired performance metric and output data indicating whether the specified course variables would achieve the desired player performance.

In one example, the simulation engine may evaluate different combinations of course variables selected from tee placements, pin placements, course conditions, and environmental conditions to identify one or more combinations that achieve the desired performance. In a further example, the simulation engine may evaluate performance deviation between the simulated performance and the desired performance and output data indicating the effectiveness of the course variables in achieving the desired player performance.

In one example, the one or more output course variables include one or more course conditions, tee location, pin location, or combination thereof. The course variables may include pin placement and tee placement, course conditions selected from one or more of rough height, rough density, fairway height, fairway firmness, green speed, green slope, or green elevation, environmental conditions selected from one or more of wind direction or wind speed, and player skill level of the player field.

In one example, the simulation modeling may take user input that specifies at least one of the one or more output course variables.

In one example, the specified performance of the player field comprises one or more of scoring average, segmented scoring, average driving distance, fairway hits, fairway hit percentage, greens in regulations, or green in regulation percentage.

In one example, the course variable specification unit may receive user constraints specifying which course variables are available for modification and which course variables are to remain fixed during the simulation modeling.

In one example, the course variables further comprise simulated sensor device placements having simulated coverage areas. The simulation engine may output one or more combinations of both traditional course setup variables and simulated sensor device placements projected to achieve the specified player performance metric while optimizing capture coverage for media or tracking operations.

In still another aspect, a golf tournament management system may include a 3D course perspective system configured to convert golf course data, including topographical information, course layouts, and course variables into a 3D rendering format. A mesh rendering engine may be configured to construct a high-fidelity terrain mesh to serve as a foundation for a graphical rendering of the golf course, A 3D perspective interface may be configured to map textures and 3D models representing golf course features onto the mesh to render a 3D perspective view and enable user selective perspective navigation within the 3D perspective view. The course variables may include placement of one or more sensor devices comprising media devices or tracking devices, each of the sensor devices having a field of view with respect to a sensor coverage area. The 3D perspective interface may provide field of view visualizations within the 3D perspective view comprising one or more of point-of-view representing the field of view or a representative field of view overlay overlaid within the course visualization.

In one example, the system also includes or incorporates outputs of a simulation engine may configured to simulate play of a player field on the golf course and output performance metrics with respect to capture of balls, players, or both within the sensor coverage areas during the simulated play.

In one example, the field of view visualizations include a 3D cone projection that originates from the sensor device and projects outward onto the course to visualize the coverage and field of view of the device.

In one example, the system further includes coverage manipulation controls that enable a user to remotely address sensor device controls to manipulate coverage areas of actual sensor devices represented by sensor device objects within the 3D perspective view. In one example, the 3D perspective interface may track manipulations of the coverage areas and dynamically update a dynamic data layer to reflect the manipulations of the coverage areas.

In one example, the sensor device controls include mechanized pan and tilt heads on which sensor devices are mounted that include a motor configured to drive pan and tilt movements and a control system addressable by the golf tournament management system to manipulate the field of view of mounted sensor devices.

In one example, the mesh rendering engine may provide terrain mesh data to terrain-aware algorithms that are configured to receive user interactions adjusting sensor device positions and dynamically recalculate sensor coverage areas based on terrain topology. The terrain-aware algorithms may account for terrain features including elevation changes, surface contours, and obstruction data when updating the sensor coverage areas within the 3D perspective view.

In yet another aspect, a golf tournament management system includes a visualization system configured to generate graphical display data that when rendered provides graphical display renderings of a golf course. A course variable specification unit may be configured to enable user specification of course variables comprising simulated sensor device placements, each simulated sensor device having a simulated field of view with respect to a simulated coverage area. A simulation engine may be configured to simulate play of a player field on the golf course utilizing the course variables and output performance metrics with respect to simulated capture of balls, players, or both within the simulated coverage areas during the simulated play. The visualization system may provide field of view visualizations within the graphical display renderings comprising one or more of simulated point-of-view representations or simulated field of view overlays overlaid within the course visualization.

In one example, the simulated field of view overlays may include a simulated field of view cone overlaid within the course visualization to represent the simulated coverage area of the simulated sensor device.

In one example, the course variable specification unit may be configured to enable interactive positioning of the simulated sensor device placements within the graphical display renderings, and the visualization system may dynamically recalculate and update the simulated coverage areas as the simulated sensor device placements are adjusted.

In one example, the simulation engine may output data for evaluating the simulated sensor device placements comprising whether a proposed simulated sensor device placement would provide a simulated field of view that would adequately capture objects of media or tracking operations. The visualization system may integrate the simulation data into the course visualization to enable visual evaluation of effectiveness of the simulated sensor device placements.

In one example, the simulated sensor devices may include one or more simulated tracking devices selected from simulated camera devices, simulated radar devices, or simulated laser devices. The simulation engine may simulate tracking of player locations, ball locations, or both relative to the simulated coverage areas.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIGS. 6A-6E illustrate example operation and display of specialized views as applied to a green perspective view using a multi-layered approach according to various embodiments described herein, wherein FIG. 6A illustrates a green perspective view, FIG. 6B illustrates a specialized green contour view, FIG. 6C illustrates a specialized green arrow view, FIG. 6D illustrates a specialized green elevation heat map view, FIG. 6E illustrates specialized green slope heat map view.

DESCRIPTION

Figure 1:
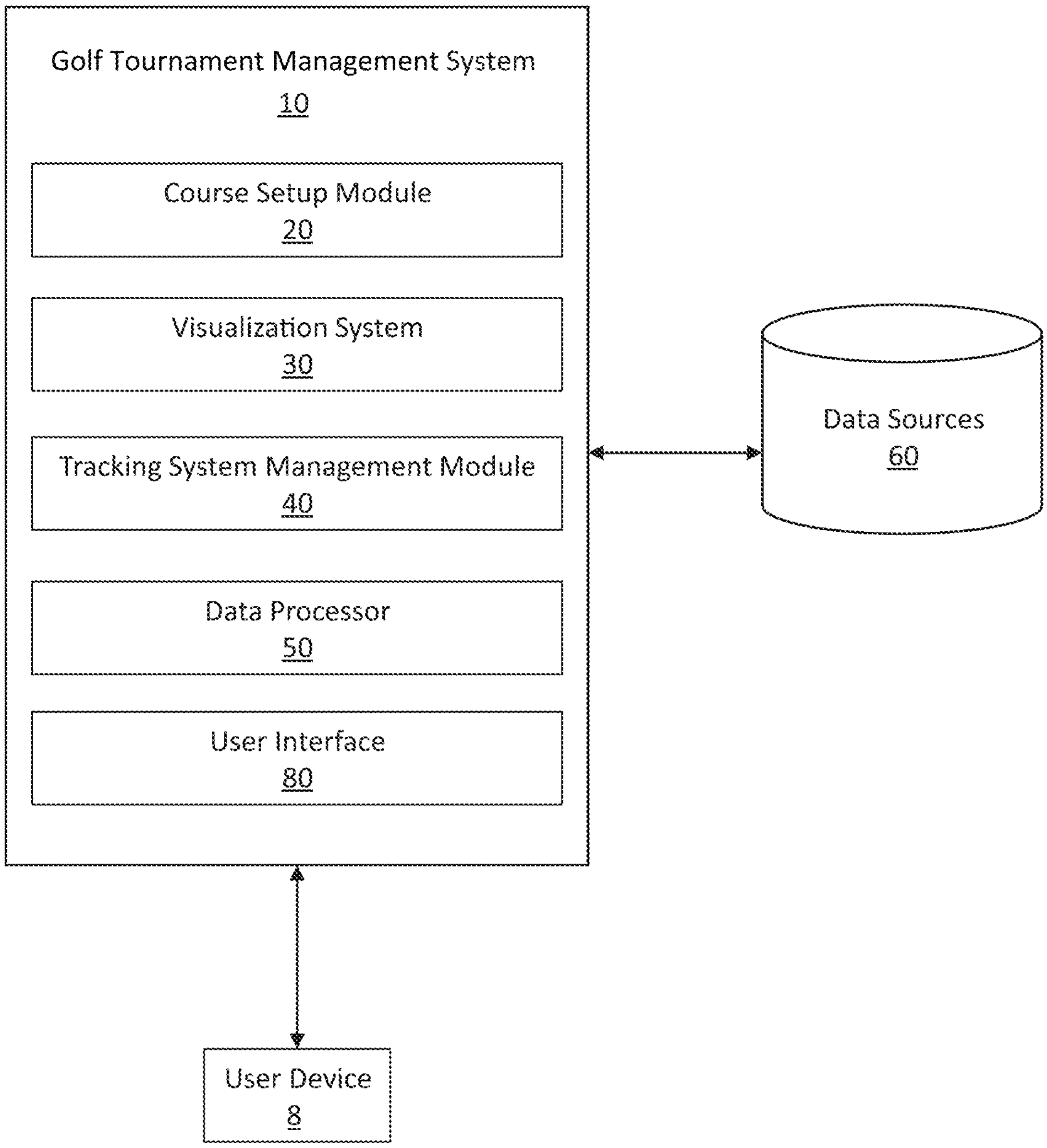
FIG. 1 schematically illustrates components of a golf tournament management system according to various embodiments described herein.

A golf tournament management system may include a visualization and simulation tool configured for analyzing and optimizing golf course setups for tournament play. The golf tournament management system may beneficially enhance efficiencies in a golf course setup modeling process by providing users immediate access to detailed, scenario-based predictions, and historical data that may be utilized to enable data-driven decision-making in the planning and setup of a course for golf competitions. The golf competitions may include golf tournaments, such as professional golf tournaments or otherwise.

The golf tournament management system may provide interactive course setup features that enable users to define course variables while viewing the impact of the defined course variables like placements of tee and hole locations in a golf course setup modeling process or sensor devices in a tracking system management operation. The golf tournament management system may be configured to provide various interactive course views to aid in the above or other setup operations to view setup variables. For example, the golf tournament management system may include a course visualization system configured to provide hole visualization to assist a user in placements of tee and hole locations during a golf course setup modeling process. The visualization system may be configured to generate detailed views of the course to inform such placements as well as in other course setup operations. For instance, the visualization system may provide one or more selectable topographical views of a hole for user interaction during course setup. In some embodiments, the views may be provided in selectable visualization layers.

The golf tournament management system may be configured to enable users to identify, define, or modify course variables for specification in the setup process or in the evaluation thereof. Example course variables may include tee and pin placements, course conditions, course features, environmental variables, or combinations thereof. In one embodiment, course variables may include player characteristics. In these or other embodiments, course variables may include setup variables such as placements of sensor devices, such as tracking devices, media devices, or both. Specification of course variables may be provided in an interactive environment wherein a user defines course variables such as tee or pin placements within a course visualization. Additionally or alternatively, course editing may be provided to enable a user to define setup variables comprising course features such as zone locations, dimensions, or characteristics of course features. For instance, a course editor may be provided wherein a user may interact with a course visualization to add setup variables comprising course features such as bunkers and define their locations and dimensions. Available setup variables and editor tools for defining setup variables via interaction with a course visualization may be provided within a user interface. In an example, the editor enables users to define characteristics of the course features such as sand type or density. The golf tournament management system may be configured to integrate these and other course variables into its operations.

Additionally or alternatively, the golf course management system may be configured to provide course setup operations related to setup variables comprising sensor device placements such as placements of media devices, e.g., media cameras for broadcast or other image or video production, or tracking devices such as radar devices, camera devices, laser devices sensors, or other tracking devices used to track players, balls, scoring, or play around the golf course. This may include presenting interactive course visualizations the enable users to specify device placements within the context of the course, which may incorporate a current or historical course setup or a user specified setup of course variables described above or elsewhere herein. For example, course setup modeling may integrate course visualization that incorporate device placements and present fields of view for evaluation. In various embodiments, fields of view may be predefined in the visualization system, definable by the user, or both. In one example, the visualization system may be configured to provide field of view visualizations within a digital rendering, e.g., 3D representation, of the course comprising one or more of point-of-view representing the field of view or a representative field of view overlay such as a field of view cone overlaid within the course visualization. The visualizations may include course features such as vegetation that may obstruct fields of view. In one configuration, the visualization system enables a user to toggle between or fly to different locations within the course visualization to evaluate device placement. In various embodiments, simulations may be executed by the simulation engine to assist in evaluation of device placements. The simulations may include simulations of previous play on the course, predicted course play according to a proposed course setup, or both. For instance, simulations may output data comprising or for use in evaluating device placements, such as whether a proposed device placement would provide a field of view that would adequately capture the objects of the media or tracking operations of the device. This may include outputting a percentage of intended objects captured, identification of areas outside the field of view in which objects were missed, or a visualization chart depicting location of captured objects relative to the field of view, which may include location plots, percentages, heat map, or the like. In one example, the visualization system may integrate the simulation into a course visualization that depicts the objects and the fields of view of the devices to enable a user to visually see the effectiveness of a device placement in capturing the objects and where missed objects traveled outside the device's field of view. For instance, historical or simulated shot-level data or player tracking data may be integrated into a course visualization to evaluate device placements.

In any of the above or other embodiments, the golf tournament management system may include a report generator configured to generate reports. The reports may include hole reports, 9-hole reports, 18-hole reports, or combination thereof. The reports may be generated to evaluate a proposed course setup model. For example, reports may provide views and insights into how a particular course setup will play or capture objects during play (e.g., evaluation of proposed locations of tracking system components within the course setup). Reports may be further generated to include reports at the event-level. For instance, such reports may provide one or more course setup profiles for each round/event to help to ensure course setups over the course of a season are balanced and not favoring one particular style of play. In one configuration, the simulation engine is configured to output scoring related data predictions with respect to style of play of players of a desired skill level. For instance, style of play may include various specifications, which in one example may be specified by a user or the golf tournament management system in multiple combinations, such as long hitter, short hitter, accurate hitter, short game accuracy types (putting, chipping, pitching, or combination thereof), or other strength or weakness.

FIGS. 1-20 illustrate various features and components of a golf tournament management system 10 according to various embodiments wherein like features are identified by like numbers.

With reference to FIG. 1, which schematically illustrates various components that may be included in embodiments of a golf tournament management system 10, the golf tournament management system 10 may include a course setup module 20 configured to provide course setup operations. The course setup operations may include those with respect to golf course setup modeling process as described herein. The golf tournament management system 10 may also include a visualization system 30 configured to process map data and interface with the setup module 20 to provide interactive course displays and graphics with respect to the course setup operations, tracking system management operations, or combination thereof.

The course setup module 20 may be configured to enable users to interactively set up course variables. This may include specifying setup variables such as tee or pin placements within an interactive course visualization. In some embodiments, the course setup module 20 may be configured to process user specified course variables, current or historical course variables, or combination thereof for display of the course variables in a user interface 80, which may include utilizing operations of the visualization system 30. Example course variables may include those described herein, such as course conditions, course features, environmental variables, or player characteristics. The course variables may be incorporated in the course visualization, in text, icons, indexes, menus, or otherwise. Specification of course variables within a golf course setup modeling process may include interaction with a course visualization to, for example, set setup variables such as tee or pin placements, define or otherwise edit aspects of other course features such as location, dimension, or characteristics, among others. As described in more detail below, in one embodiment, the course variables may be utilized in simulations to predict how the course variables may impact player performance. These simulation results may be output to the user, e.g., incorporated into the user interface 80 for analysis by the user.

In addition to or instead of the course setup module 20, some embodiments of the golf tournament management system 10 may include a tracking system management module 40 configured to allow users to manage positions, coverage, field of view, or both of tracking devices of a tracking system. Tracking devices may include cameras devices, radar devices, laser devices, or other devices used to track objects during the competition, such as players or balls, or combination thereof. In some embodiments, the tracking system management module 40 may provide management operations for media devices, such as cameras for broadcast television or other media production. In some embodiments, media devices may be employed for player tracking. The tracking system management module 40 may provide interactive positioning, device control, visualizations of positions, coverages, field of views, or combination thereof. For instance, sensor device positions and settings may be one or more of altered, visualized, or controlled while leveraging historical data and predictive analysis to ensure optimal coverage of the course and seamless content generation across multiple platforms. In various embodiments, the tracking system management module 40 may generate and distribute real-time content from cameras, such as media cameras, which may be integrated across multiple platforms such as websites, apps, social media, broadcasts, and the like. In one example, the tracking system management module 40 includes one or more of a Live Mode feature wherein live image snapshots or live video streams are captured from cameras, a Demo Mode feature configured to provide a virtual cinematic showcase of interesting holes, shots, or other points of interest, a demo Mode feature that highlights shots from leading players, which can be integrated across platforms to offer an enhanced viewing experience.

The golf tournament management system 10 may comprise various programmed computer hardware including a processor configured to execute a software program, computer readable mediums storing software instructions, and the like. In some embodiments, the golf tournament management system 10 may comprise a service provided by hardware executing software instructions. In one embodiment, the golf tournament management system 10 may include a native application executed on a computing device such as a server, mainframe, personal computer, laptop, mobile device, tablet, or other suitable computing device. The golf tournament management system 10 may operate within various computing environments such as cloud-based, virtual, remote access, standalone, networked, or combination thereof. In various embodiments, the golf tournament management system 10 may be configured for operation in various network environments. For example, the golf tournament management system 10 may be configured for operation in network-based environments comprising local, remote, distributed, or combination thereof. In these or other embodiments, the golf tournament management system 10 may be configured for operation in a web-based, cloud-based, or other suitable network environment. Networks may include wireless networks, local area networks (LAN), personal networks (PAN), wide area networks (WAN), among others. Example networks may include internet, intranet, virtual local networks, private intranets, or combination thereof. In various embodiments, computer hardware and software may comprise a server. For example, the golf tournament management system 10 may comprise a client-server architecture. In some embodiments, one or more aspects of the golf tournament management system 10 comprise a server that hosts an application. In one example, the golf tournament management system 10 comprises a network application, such as a web application, executed, at least in part, on the server. In one example, the application is a web application. The server may include one or more servers. The server may comprise a physical server or virtual server, such as a cloud server, or combination thereof. The server may additionally comprise various server types such as a web server, database server, file server, application server, proxy server, gateway server, or combination thereof. Servers and applications may reside on a same or separate physical machines. For instance, operations may be provided by a single server providing a web server and database server. When multiple servers are used, the servers may share or separate processing or other system operation responsibilities.

Various aspects of the golf tournament management system 10 may be accessed by a user device 8. A user device 8 may include an electronic communication device, such as a computing device, e.g., a personal computer, laptop, desktop, tablet, smart device, or dedicated device, configured to access one or more operations of the golf tournament management system 10. In one embodiment, a user device 8 comprises a virtual machine. User devices 8 may include a processor configured to perform instructions that when executed directly or indirectly cause performance of one or more operations provided by the golf tournament management system 10. For example, a user device 8 may be configured to perform one or more client-side operations, which may include providing or presenting a user interface 80 for receiving user interactions, transmitting data requests, receiving requested and other system data, performing rendering operations to provide a visual display provided by the golf tournament management system 10, or the like. In various embodiments, the golf tournament management system 10 may comprise a web application configured for execution via a browser to provide ease of access and scalability across multiple users and devices. The user device 8 may include or be configured to access operations of a client-side application for interfacing with the operations of the golf tournament management system 10, which may be provided by a server-side application, which may include a server-side web application. In various configurations, the client-side application may be executed or simulated, in-whole or in-part, on the user device 8. In various embodiments, the golf tournament management system 10 or one or more aspects thereof may be web-based. In one example, one or more components of the golf tournament management system 10 or one or more operations thereof may operate or be configured to operate within a browser or browser-like environment. For example, the golf tournament management system 10 may comprise a web application, which may include a progressive web application, hybrid application, or other suitable platform from which operations of the golf tournament management system 10 may be served, executed, simulated, rendered, or otherwise provided for user interaction. In one example, a user device 8 may transmit a request to a web application of the golf tournament management system 10 and the web application may be executed at the server and a web application user interface 80 may be sent to the user device 8 for presentation via a browser. In one configuration, the golf tournament management system 10 comprises an application including a web-based application and a user device 8 may access the application via a network, which may include remotely. The user device 8 may interface with a webserver to request and obtain data. In one embodiment, a user device 8 may connect to the server using a web browser or client-side software, e.g., via a website hosted by the webserver.

As introduced above, the golf tournament management system 10 may comprise or be configured to provide or cause to be provided a user interface 80 that interfaces users with the operations of the golf tournament management system 10. The user interface 80 may include visualizations, displays, graphics, hard buttons, soft buttons, sliders, dropdowns, toggles, or other interactive features for interfacing with the operations of the golf tournament management system 10. In some embodiments, the golf tournament management system 10 may comprise a frontend and backend architecture as understood by those skilled in the art. For instance, a user device 8, a user interface 80 provided to a user on the user device 8, or one or more operations thereof may comprise the frontend, e.g., a presentation layer. The backend may comprise a data access layer, data storage, business logic, server or server operations thereof, or the like. In various embodiments, the golf tournament management system 10 comprises a user authentication feature wherein users, using a user device 8, are required to securely sign into the operations of the golf tournament management system 10, e.g., using a username and password.

The course setup module 20 may include or be configured to coordinate operations with a course visualization system 30 configured to generate various visualizations described herein, such as course visualizations. As described in more detail below, in some embodiments, the visualization system 30 may include a combination of server-side processing and client-side rendering. However, in some embodiments, one or more of processing, rendering, or combination thereof is executed partially or exclusively server-side or client-side. While various features and operations may be described herein as being server-side or client-side, those having skill in the art will appreciate that the features and operations are not limited to a client-server model and the teachings herein are applicable to other models and architectures. In some embodiments, whether utilizing a client-server model or otherwise, the client, server, and one or more operations thereof may reside on the same system. In another embodiment, server-side and client-side operations communicate over a computer network, such as a distributed network, e.g., internet. The visualizations may be provided in various formats, which may include renderings, hybrid photo and image renderings, such as photo simulations, animations, virtual reality, mixed reality, augmented reality, as examples. The visualization formats may be 3D, 2.5D, 2D, or hybrid. In one example, visualization formats may include full 3D model visualizations. In a further example, the visualization formats may be non-immersive, semi-immersive, or fully immersive. The visualizations may include visual representations in a graphical display format of one or more of the course variables with respect to the course. For example, the visualizations may include visual representations of the course. Visual representations of the course may include a graphical display depicting the course. The visualizations may depict course variables, typically setup course variables such as tee and pin placements, zones, zone characteristics, or other course features. In one example, various zones such as tee box, fairway, green, and bunker or outlines thereof are provided. In a further example, one or more additional zones or subzones are provided such as rough, first cut, second cut, fringe, water hazards, vegetation (e.g., trees or bushes), cart paths, waste areas, natural areas, manmade objects (e.g., camera towers, stands, or spectator areas). In some embodiments, one or more of these zones, subzones, objects, or areas may be visually differentiated, e.g., by colors, in course visualization. In one configuration, a user may be provided options via the user interface 8 from which to select which zones or other course features to be included in a graphical display of the course.

The visualization system 30 may incorporate one or more course perspective features provided in a graphical display. The course perspective features may include scaled views of the course from different perspectives. For example, perspective features may include 3D representations of golf courses. The 3D representations may be interactive and allow users to intuitively navigate the 3D space. In a further example, the visualization system 30 incorporates a camera control mechanism that defines movement boundaries, preventing disorientation.

The golf tournament management system 10 may include or access one or more data sources 60. Data sources 60 may include one or more databases, which may include data structures maintained or accessed by the course setup module 20, visualization system 30, tracking system management module 40. In one embodiment, data sources 60 comprise one or more relational databases, non-relational databases, virtualized databases, cloud databases, or combination thereof. Data sources 60 may contain details about multiple golf tournaments, courses, or both. Details may include tournament name and associated courses. Details may also include other identifying information for tournaments, course, or both, which may include unique codes, for example. The data sources 60 may include map data with respect to courses, which may include map data corresponding to a course during a previous tournament. In some embodiments, data sources 60 contain details about courses, tournaments, historical course features during previous play on courses or tournaments, which may include course setup, e.g., course variables present during the previous play, historical play data including historical player performance, which may further include historical scoring related data, e.g., scoring and scoring statistics at tournaments or otherwise play on courses. Data sources 60 may include tracking data, such as player tracking data, shot tracking data, or both. Such data sources 60 may include scoring related data, which may include shot-level data, player tracking data, or both. The tracking data may be collected by various player tracking, shot tracking, or combination tracking systems that include tracking sensors or tracking sensor networks, such as ShotLink, owned and operated by PGA TOUR. Player tracking or shot tracking data sources or tracking systems configured to collect tracking data for use by the golf tournament management system 10 may include tracking networks, such as those described in U.S. patent application Ser. No. 17/841,660, filed Jun. 15, 2022, U.S. patent application Ser. No. 18/238,234, filed Aug. 25, 2023, or U.S. Provisional Patent Application 63/599,557, filed Nov. 15, 2023, the contents of which are hereby incorporated herein by reference. The tracking data may be stored by or otherwise accessible by data sources 60. In various embodiments, map data and historical play data may be associated for use by the golf tournament management system 10 or may be associated by the golf tournament management system 10 for use in the operations described herein. For example, historical player performance data may be keyed or otherwise relatable to the corresponding course, e.g., map data, course variables, or combination thereof.

Figure 2:
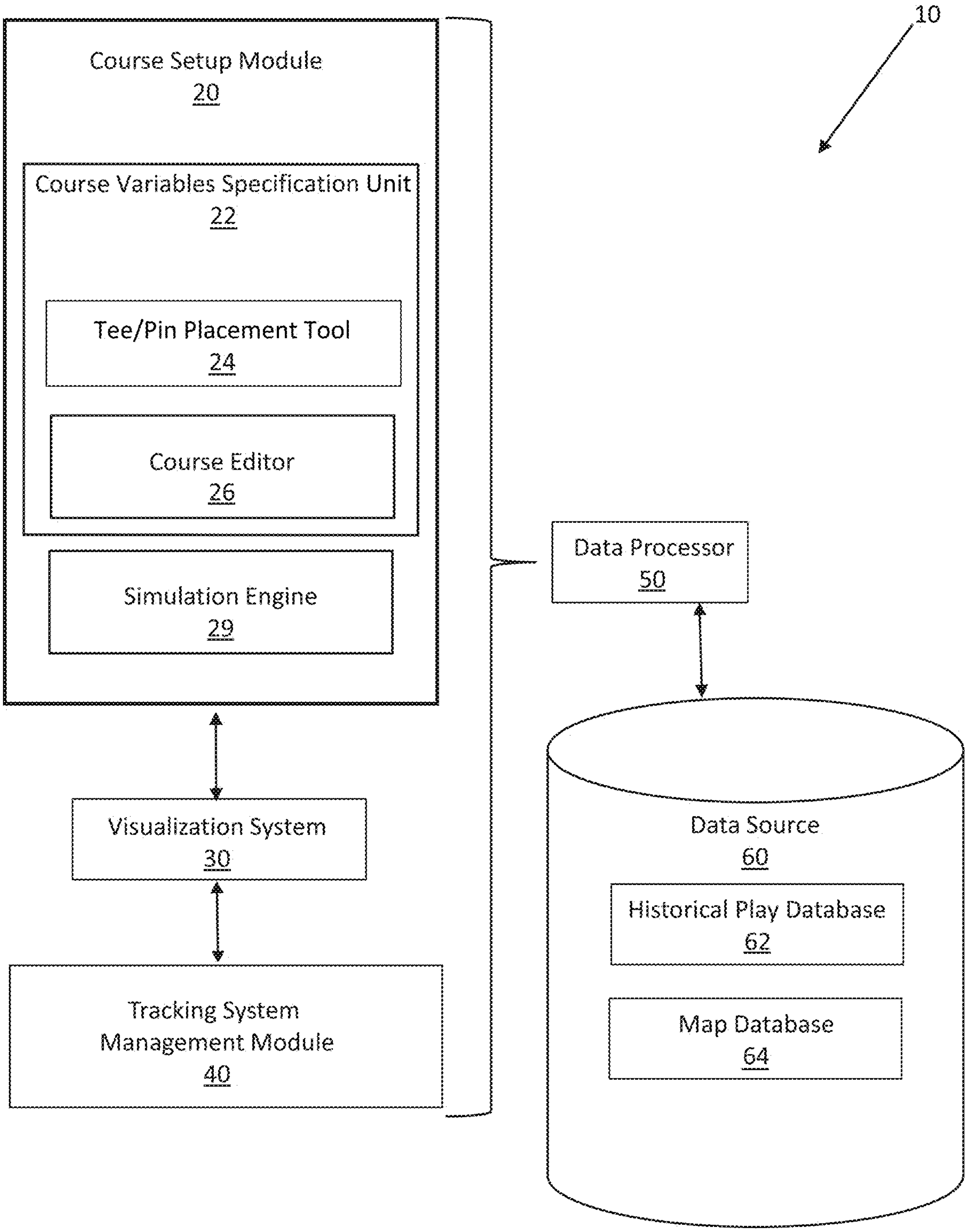
FIG. 2 schematically illustrates components of a golf tournament management system according to various embodiments described herein.

With further reference to FIG. 2 illustrating a schematic of various components that may be included in the golf tournament management system 10.

The course setup module 20 may include a course variables specification unit 22 configured to manage course variables. The course variables may include those described above and elsewhere herein such as tee and pin placements, course features such as bunker placements, rough locations, course boundaries, vegetation locations, grass types, cart path locations, bunker density, or other course features, course conditions such as green firmness, fairway firmness, green stimp, fairway grass height, rough grass height, pruning status of vegetation, or elevation for instance, environmental variables such as wind speed, wind direction, humidity, precipitation or other environmental variables, player characteristics such as skill level, or combinations thereof. Setup variables generally include course variables that may be setup or otherwise specified by the operations via the operations of the golf course management system 10, e.g., in course setup operations using the variable specification unit, which may include operations of the course editor 26 that may be incorporated into the course visualization. Thus, depending on the configuration, setup variables may include tee and pin placement, certain course features, certain course conditions, and certain environmental variables. In some embodiments, course variables may include setup variables comprising placements of sensor devices, such as tracking devices, media devices, or both. Tracking devices may include cameras, laser devices, radar devices, or other senor devices positioned around a course to track players, balls, golf club movement, or other objects. The tracking devices may be configured to track score, which may be withing an automated score tracking system. Media devices may include camera devices configured to capture still images or video or other media, which in one instance may include sound.

In some embodiments, the course setup module 20 may also provide historical data analysis features. For example, the course setup module 20 may include or be configured to load or transmit historical data, e.g., from a historical play database 62, which may include a data structure, from past tournaments to user devices 8 for user viewing of the historical data to facilitate analysis of past player performance and tournament results. Utilizing a visualization system 30, the historical hole and course data may be caused to be overlaid within a course visualization comprising a graphical display provided in a user interface 80 for further analysis and comparison with simulated results. The past player performance may be associated with course variables present during the past play the scoring relates, such as one or more of tee/pin placements, course conditions, course features, player characteristics, environmental variables, or combination thereof. Such course variables may be displayed or available for selective display on a user device 8 via user interaction with a user interface 80 provided by the golf tournament management system 10. For example, the graphical display may include visual representations of the course variables present during the previous play on the course the historical data relates, such as depictions of tee and hole locations. Other course variables may also be displayed or available for display for consideration of potential player performance impacts on the historical play or predicted play the player performance data relates. Examples may include text or graphics indicating course conditions, course features, environmental variables, player characteristics associated with the historical or predicted play. In one example, text or graphics depicting variations in course features may be displayed, such as when zone (e.g., bunker, rough, or green) outlines or topologies differ between past and present course setups.

The course setup module 20 may include a course editor 26. The course editor 26 may be configured with tools for course designers to modify course features, such as adding bunkers. In some embodiments, course features such as rough locations, course boundaries, vegetation locations, pruning statuses, or other course features may be modified using the course editor 26. As with other course setup features described above, the simulation engine 29 may be configured run simulations based on the course edits to simulate their impact on player performance and output the information for analysis. The output of the simulation results may be similar to that described above with respect to specification of course variables. In some embodiments, simulations may be run using user specified course variables and modified course features resulting from use of the course editor 26.

A course editor 26 may be provided that enables users to edit course features such as bunker placements, rough locations, course boundaries, vegetation locations, grass types, cart path locations or surface materials, bunker densities, or other course features. The golf tournament management system 10 may include or be configured to access previous course setups that may be displayed for user interaction via operations of the visualization system 30. Additionally or alternatively, the course setup module 20 may be configured to output player performance with respect to previous course setups to allow a user to consider how course variables may alter player performance.

The golf tournament management system 10 may be configured to ingest player tracking data, shot tracking data, or both from various tracking data sources. For instance, the shot tracking data sources may include ShotLink, owned and operated by PGA TOUR to tracking shot and other competition data, e.g., scoring related data such a shot location, score, shot distance, and other scoring related data, including shot-level data. The tracking data may be ingested from a historical play database 64. In one example, the golf tournament management system 10 may be configured to translate between different coordinate systems used by tracking systems, course map data, and the like for one or more of course setup, player performance simulation modeling, tracking system management.

The course setup module 20 may utilize simulated data, historical data, or both to give insight and guidance for the setup of a golf course for competitive play. For instance, the course setup module 20 may be utilized to provide users, such as competition course setup officials, the ability to set up or change course variables for the course and then calculate, utilizing a simulation engine 29 expected impacts on player performance. In one embodiment, the course setup module 20 utilizes simulated data, historical data, or both to give insight and guidance for the setup of a golf course for competitive play. The simulated data, historical data, or both may include shot-level data. Shot-level data may include data with respect to hit location, landing location, final resting position, locations relative to a hole, shot distances, club, ball flight trajectory, hole identification, shot numbers, hole score, or the like. In some embodiments, shot-level data may be used to determine hole strategies for use in simulations such as intended landing or resting position of shots to generate shot dispersion coefficients and hole strategy predictions on holes, which may consider differences and similarities in course variables. In some embodiments, for courses where no or insufficient shot-level data is available, e.g., play on the course has not previously been tracked or has not been tracked for the skill level of play to be simulated, default data point baselines such as shot dispersion coefficients may be used, which may be generated from shot-level data from historical play from other events of players of the skill level to be simulated. In some embodiments, course layouts or features from similar courses may be used to enhance these simulations, which may include enhancing prediction of player strategies such as preferred landing zones for shots.

The simulation engine 29 may be configured to simulate play according to the course variables specified by the user. For example, the simulation engine 29 may apply the course variables within a simulation model defined at least in part by the course variables to generate predicted player performance. As introduced above, a user may specify course variables for ingestion such as tee and hole locations for analysis, course conditions, course features, or the like, which may include but not limited to rough height, rough density, fairway height, fairway firmness, green speed, green slope, green elevation. In some embodiments, users may specify, or the simulation engine may incorporate, environmental variables, such as wind direction, wind speed, humidity, forecasted precipitation, as examples. In some embodiments, users may specify, or the simulation engine may incorporate, course variables comprising player characteristics such as skill level of play. This may be used to compare impact of other course variables specified by the user on a desired skill level of players in order to obtain a more accurate prediction as to how such competitors would fare on the course. In one example, predicted player performance is generated by running large numbers of simulations using map data of the course, such as detailed point cloud data. When configured with historical player performance from one or more tournaments played on a previous course setup, the user may compare simulated player performance on a proposed course setup specified by the user to historical play.

The simulation modeling may provide one or more data points with respect to scoring related data. For example, the simulation engine 29 may be configured to provide projected hole-level data points, course-level data points, or both, which may include but not limited to scoring average, segmented scoring (e.g., birdies, par, bogeys), or other statistics such as rough penalty or miss fairway penalty. The scoring related data may include shot locations, hole strategies, or both. Additionally or alternatively, scoring related data may include statistics such as average driving distance, fairways hit, greens in regulation, or other scoring related data may be provided. The scoring related data may include statistics such as scoring average of each hole or the course high, low scores, driving distance, fairway hit percentage, greens in regulation, penalties, putting averages for hole or course, among others. In some embodiments, various levels of scoring related data may be generated for analysis, such as course-level, hole-level, zone-level, or sub-zone level data. Sub-zone level may include, for example, scoring related data with respect to a specific zone for a hole, such as greens in regulation from hit rough, pars following fairway hit, birdies from hit from rough, among others. Similarly hole-level data may include sub-hole level data. Sub-hole level data points may include zone related data, which may include zone or sub-zone level data, such as layup percentage or count from particular locations or zones, bunker shots, putt related statistics (e.g., such as average putt count, 1-putt, 2-putt, 3-putt, average putt distances), scrambling from zones or distances, accuracy (e.g., proximity to hole from zones or distances, such as sand, rough, fringe, 10-20 yards, 20-30 yards, or 30+ yards). As noted above, some embodiments of the simulation engine 29 may be configured to output shot-level data. For example, the simulation engine 29 may be configured to output ball plots or location coordinates of shot locations, ball flights, or both of simulated shots from and to the various points of a hole. In one example, the course setup module 20 utilizing the visualization system 30 may be configured to integrate simulation modeling outputs into course or other visualizations. For instance, landing locations of simulated tee shots may be visually displayed relative to a visual depiction of a hole. In a further example, landing positions of subsequent simulated shots may be displayed. In one configuration, displayed ball plots may be color coded or otherwise coded to depict eventual hole score from the shot (e.g., birdie, par, bogey), depict subsequent simulated shots on a hole, or both. Ball flight may be depicted with tracer lines representing predicted ball flight of simulated shots. Thus, the course setup module 20 may be configured to apply course variables, such as those specified by a user, and simulate player performance utilizing the simulation engine 29 to predict impact of the course variables on play.

In various embodiments, data sources 60 may include a map database 64 that stores map data related to courses. The map data may include one or more of zone map data, topographical map data, elevation map data, terrain map data, obstruction map data, zone map data, among others. Zone map data may include coordinates of zones, such as zone outlines or coordinates thereof for holes, of a course. Zones may be identified within the map data as specific or as general as needed. For example, identified zones may include tee box, fairway, rough, and green. Additional zones or subzones may be included such as fringe, primary rough, secondary rough, bunker, natural area, or water hazard, as examples. Topographical map data may include topographical descriptions or representations of a course. Elevation map data may include elevation descriptions or representations of a course. Terrain map data may comprise topographical information, elevation information, surface feature information, or the like with respect to a course. Obstruction map data may include objects positioned on terrain such as elevated natural or manmade objects. Detailed feature map data may include surface map data, which may include surface material properties, such as firmness. In some embodiments, the map data comprises data models. The data models may comprise digital data models that represent the mapped data in computer graphical representation, rendered or in data, such as digital models (e.g., computer aided drafting models, digital terrain models (DTM), digital surface models (DSM), digital elevation models (DEM), or other models). For example, terrain map data may include a DTM. In some embodiments, the map data includes a DSM, DTM, or both. The map data may be defined within one or more coordinate systems, such as a Euclidean space. For example, map data may be defined within a 3D coordinate system. Map data defined within a 3D coordinate system may comprise point cloud data. For instance, surface objects, canopy, or the like may be represented in point cloud data. Additional formats may include rasterized or vectorized abstraction formats. Additionally or alternatively, map data may include geometric facets, e.g., mesh, representations representing a continuous surface via connected points or vertices of the geometric facets. For instance, digital models may comprise triangulated irregular networks (TIN). In one example, the map data, such as the map data identified above and elsewhere herein, comprises or is used to generate geographic information system (GIS) data.

All or a portion of the map database 64 may be local or remote with respect to the golf tournament management system 10. Thus, map data may be stored and retrieved from a local map database, remote map database, or both. Such map data may be present or retrieved in various levels of processed states. For instance, map data may be pre-processed into data packages. The data packages may include serialized map data for ease of transmission. In one configuration, data packages may include transformed map data wherein coordinates of the map data have been transformed to a coordinate system used by a system process that is to subsequently process the map data, e.g., further process, render, or manipulate. In some embodiments, the golf tournament management system 10 is configured to maintain or access data structures comprising map data for ease of access and handling, such as modification or transmission. In this or another embodiment, map data includes or is associated with additional data related to the location represented by the map data. The additional data may include identifying information for identifying or locating the map data. The additional data may include additional data for handling or processing the map data, such as packaging, transmitting, serializing or deserializing, rendering, manipulating, among others. In some embodiments, one or more of the above data processing, which may include access, retrieving, packaging, handling, pre-processing, post-processing, transmission, manipulation, or combination thereof, may be executed in-whole or in-part by data processor 50.

The map data may be available separately or in any combination of combined format as well as represented in data. For example, surface features and zone feature specifications may be assigned to coordinates to which they correspond within a single map. In some embodiments, terrain, elevation, or surface models may be provided separate from zone maps. In one configuration, map data may include a coordinate map comprising a 3D coordinate space defining a Euclidian space or similar and which may be incorporated in, overlaid, or be projectable onto a corresponding model. In one embodiment, when a zone map is defined separate from a terrain or surface model, coordinates corresponding to the zones may be defined with respect to the zone map. In some embodiments, the map database 64 includes map data comprising or processable by the data processor to generate a coordinate map including a 2D coordinate grid that overlays the property. In some embodiments, the coordinates may correspond to GPS coordinates, a proprietary coordinate system, a standardized coordinate system, or combination thereof. In one embodiment, the data processor 50 is configured to transform coordinates between coordinate systems for use in operations of the golf tournament management system 10.

Map data may be collected prior to play using suitable technology such as lidar, laser, photogrammetry, GPS, or the like. In some embodiments, individuals on foot, aircraft, drones, or robots may survey a property utilizing such technology. In one example, lidar, laser and photogrammetry carried by remotely piloted or other aircraft as well as by walking or robotic ground-based devices are used to collect map data. In some embodiments, a model includes terrain identification that also includes surface properties such as surface contours, angles, relative heights of surfaces, or both. Models may include 3D detail keyed to a coordinate space. In one embodiment, detailed surface properties such as material, firmness, or the like may be incorporated into the model or provided separately, for example, in additional associated map data. Surface features may be modeled in various levels of detail. For instance, in some embodiments, surface features may be specified down to an inch or less. Surface models may include manmade objects in addition to natural terrain and vegetation of the property. For example, surfaces of objects on the property such as camera towers or grandstands may be modeled to include detailed three-dimensional structures. In one example, trees may be mapped in detail beyond canopy dimensions, e.g., to include limbs and leaf locations, or a bridge may be mapped to include railings and posts. In one example, rather than a point cloud representing a canopy above a terrain, obstruction map data may be provided in a pure point cloud format for detailed representation to include, for example, tree trucks, limbs, or other details.

In some embodiments, the golf tournament management system 10 includes or accesses, e.g., via the map database, an object model library comprising map data with respect to objects, such as grandstands, towers, kiosks, walls, sensor devices such as camera, radar, or laser devices, media devices, such as cameras or microphones, or the like that may be incorporated into map data of a location. For example, the object model library may include map data of objects that may be added to a course to edit a course model for visualization, analysis, or the like. For instance, as described in more detail below, the golf tournament management system 10 may include a course editor 26 that enables a user to interact with a rendering of a course within a graphical display and edit course features. This may include adding or modifying a location, shape, or size of a green, fairway, rough, vegetation, bunker, or other zone. The object model library may be used to insert the object, which may further include surface dimensions of the object, into a course model the user is modifying at a user specified location that inform the visualization system 30 as to the parameters of the modification. Additionally or alternatively, the object map data within the object model library may be used to modify models for simulation of play to analyze the impact of the modification on player performance, play strategy as it relates to preferred or target landing locations and layup positions, or camera or other sensor device location with respect to field of view for tracking of players or balls.

The map data may include topographical map data with respect to courses, course layouts, and object placements. In some embodiments, map data is provided in or constructed into a high-fidelity terrain mesh. For example, textures and 3D models representing course features, such as trees, buildings, or other landmarks, may be mapped onto this mesh to create an immersive environment.

In one embodiment, map data is provided in, or the golf tournament management system 10 is configured to leverage, a mapping framework to render a highly detailed base map of a golf course. A dynamic data layer incorporating objects such as course features, course setup information, or both may overlay the base map. The objects may be manipulated by a user and the manipulated objects may be presented for visualization in a graphical display within the manipulated immersive environment. In one example, the base map comprises map tiles generated from high-resolution satellite imagery and course survey data that provides an accurate and detailed representation of course features. The base map may be overlaid with a dynamic data layer that displays course setup information, such as cameras devices, radars devices, sprinklers, fairway widths, or other setup information, and key features that represent noteworthy elements that influence gameplay, player decision-making, and the like. Examples of key features for a hole may include "Front of Bunker", "Back of Bunker", "Front of Green", "Back of Green", "Tree", "Turn in Fairway", among others. The objects may be manipulated by a user, e.g., the objects may be rendered as draggable icons, and as they are adjusted, the visualization system 30 dynamically recalculates and provides visualizations of the objects and, when applicable, their coverage areas, e.g., using terrain-aware algorithms. In one example, course setup information includes tracking devices, media devices, or both and coverage areas of these devices, such as that described in more detail below, e.g., with respect to FIGS. 13-19. As an example, coverage areas may be depicted with a 3D cone/pyramid projection that originates from the device, such as a camera lens, and projects outward onto the course to visualize the coverage and field of view of the device. As another example, shading or a colored overlay may be applied to the rendering of the course terrain based on the field of view of the device to represent an area covered by the camera. As another example, a heatmap overlay may be applied to the course terrain, e.g., using a color gradient, to represent how effectively the device can capture details at varying distances. For instance, a color gradient of green, yellow, and red may be used. When these objects are moved, the visualization system 30 may recalculate, e.g., dynamically, the coverage areas for generation of the coverage areas as modified.

As introduced above, data sources 60 may include a historical play database 62. The historical play database 62 may include information about historical play. The historical play may be associated with courses, such as courses the play took place during tournaments. The historical play may include player performance, such as scoring related data described herein. The historical play may include shot-level data, hole-level data, course-level data. For example, the historical play may include shot locations, e.g., initial shot location, landing location, shot resting positions, hole strategies, or other shot location related data. The shot locations may correspond zones the shots were taken and landed, rested, or both. The historical play may include shot trajectories or other shot parameters. The historical play may include course variables corresponding to the shots, such as pin placements, hole placements, or other course variables that may be used for analysis, simulation, or incorporation in to map data for visualization. In some embodiments, map data for a course may be combined in the map database 64 with the corresponding course variables per tournament such that a tournament and tournament date specify a set of map data of a course that includes course variables incorporated into the map data or other course details. In some embodiments, the course details include level of competition. For example, the historical play for a course or tournament may specify player characteristics such as a skill level of competing players the historical play relates. That is, historical play may be related to the top players, major, pre-cut, post-cut, collegiate, amateur, or by professional level of play, e.g., by major, tour, ranking, or tier.

As introduced above, the golf tournament management system 10 may include a data processor 50. The data processor 50 may be configured to process data, which may include data handling operations such as receiving data requests, retrieving requested data, transmitting or otherwise returning requested data, processing requested data, or combination thereof. The data processor 50 may be configured as a backend processor configured to perform processing operations described herein with respect to the golf tournament management system 10, course setup module 20, visualization system 30, tracking system management module 40, or components thereof. For example, the data processor 50 may comprise one or more controllers, such as those described herein with respect to the various components of the golf tournament management system 10, configured to perform various operations. The controllers may comprise hardware, software, or hybrid controllers. The one or more controllers may be configured to fetch data, e.g., a web API. In one example, the data processor 50 may comprise a model view controller in a Model-View-Controller (MVC) architecture. In some examples, controllers comprise dedicated controllers. Controllers may include classes that manage incoming client requests to the golf tournament management system 10. In response to requests, controllers may retrieve data, return data, process data, or perform other data operations. For instance, controllers may receive requests for GIS data and specify view templates that return a response to the client. A controller may include multiple controllers. As noted above, one or more controllers may be multiple dedicated controllers that separate responsibilities out into modules or classes. In one configuration of the visualization system 30, the backend is configured to calculate and provide camera perspective data, as well as GIS data, such as DTM, DSM, zone information, or combination thereof, to the frontend application for rendering the 3D world and orienting the camera in the 3D world.

Figure 3:
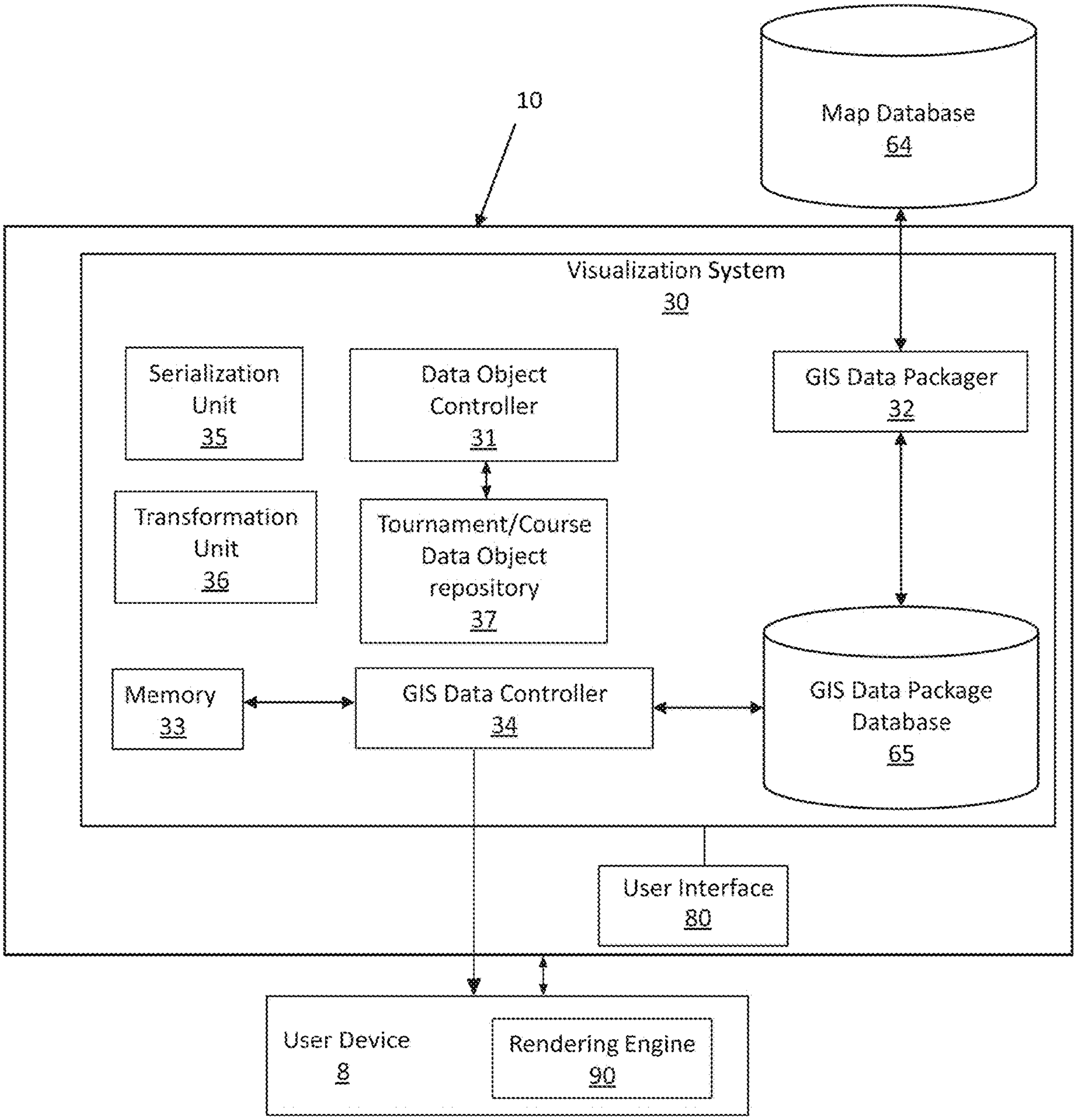
FIG. 3 schematically illustrates components of a golf tournament management system with respect to course selection, GIS data loading and processing for visualization, and transmission of the processed GIS data for rendering operations according to various embodiments described herein.

FIG. 3 schematically illustrates example components and operations of the golf tournament management system 10 with respect to course selection, GIS data loading, processing of the GIS data for visualization, and transmission of the processed GIS data for rendering operations according to various embodiments. The golf tournament management system 10 may provide a user interface 80 from which a user may select, enter, or otherwise specify a desired course for which to perform setup operations, management operations, or both using the golf tournament management system 10. For instance, the user interface 80 may present a list of courses, which may include tournaments or other identifying elements. Selection may cause the course golf tournament management system 10 to load relevant course data for analysis, simulation, or both, as described herein.

In one embodiment, course selection and data loading may begin with a request from the user device 8 to retrieve course information, tournament information, or both. For example, a client-side application configured to execute client-side operations of the visualization system 30 may be executed or simulated, in-whole or in-part, on the user device 8, which may include rendering a course visualization on a display of a user device 8. As noted above and elsewhere herein, one or more aspects of the golf tournament management system 10 may include a web application executed on one or more servers, which in one configuration may be cloud-based. In another example, the golf tournament management system 10 is executed on a computing device, such as a user device 8, that does not include a server. Upon receiving the request, a data object controller 31 may respond by returning a list of data objects that contain specific course or tournament identification information. The data objects may include courses or a list of tournament associated courses with names, identification numbers, or both. In one embodiment, the data object controller 31 may be configured to respond to the request by fetching and returning a list of tournament data objects, each containing the tournament's identification information and a list of associated courses along with corresponding names, unique numbers, or both. In various configurations, one or more data objects may be directly or indirectly retrieved from the map database 64, which may be local or remote. In one example, data objects may be retrieved from a tournament/course data object repository 37 including a data structure maintained by the golf tournament management system 10 or otherwise. The tournament/course data object repository 37 may be maintained as a local or remote resource. User selection of a course via the user interface 80 may similarly return a list of course related data objects to the golf tournament management system 10. Once a specific course is selected, the visualization system 30 may load GIS data for the selected course. For example, a GIS data controller 34 may load a selected course and hold the GIS data in a memory 33 for subsequent access for further processing to provide client GIS data, which may include portions of the GIS data or data derived therefrom.

In various embodiments, the visualization system 30 may include or utilize processes of an application that reads map data of a course and builds an in-memory representation of the course. In various embodiments, the application comprises a desktop application, which may be a separate application. In the above or another embodiment, the visualization system 30 comprises a controller, which may be referred to as a GIS data packager 32, which may include or be a component of an application, configured to map data and build an in-memory representation of courses. The GIS data packager 32 may be configured to generate pre-processed GIS data of one or more courses. The GIS data packager 32 may be further configured to package the pre-processed GIS data into GIS data packages for subsequent access and processing by the GIS data controller 34, e.g., upon client request for client GIS data for rendering course visualization. As introduced above the map data may include elevation, topography, terrain, surface, obstruction, zone, or other map data, which may be present in one or more models, files, or other formats. For example, the GIS data may include or be derived from map data comprising CAD files, shape files, and a DTM file. The map data may be pulled from the map database, which may include a directory, to build the in-memory representation of the course. In one example, the GIS data comprises a faceted geometry mesh, such as a triangulation irregular network, in a DTM, a cloud obstruction model representing above ground terrain obstructions, and zone outlines. In one example, the GIS data packager 32 may be further configured to serialize the GIS data comprising the in-memory representation of the course or portion thereof. For instance, the GIS data packager 32 may include or access operations of a serialization unit 35. Additionally or alternatively, the GIS data packager 32 may be configured to package the GIS data comprising the in-memory representation of the course or, if serialized, the serialized data thereof. For instance, the GIS data packager 32 may compress the data into a GIS data package, e.g., zip the data into a zip file. In one embodiment, the GIS data package is uploaded to a GIS data package database 65. The GIS data package database 65 may comprise a service, such as a microservice for subsequent download by visualization system 30 processes. In another example, the packaged data is provided directly for loading to visualization system 30 processes.

In one embodiment, the visualization system 30 processes may comprise a separate application that loads the GIS data packages, e.g., from the GIS data package database 65. In one embodiment, the GIS data packager 32 may perform the operations described herein for multiple tournaments or course for availability for subsequent use by the visualization system 30 upon request. As described in more detail below, the visualization system 30 may be configured to load and hold the GIS data package in a memory 33, which may be triggered upon request for a particular course as to multiple courses. The memory 33 may comprise cache, such as read-only cache, available for fast access.

The visualization system 30 may comprise a GIS data controller 34 configured to load the GIS data, e.g., GIS data packages, for holding and ease of further processing. For example, the visualization system 30 may download a GIS data package of a selected course from the GIS data package database 65. The GIS data controller 34 may further hold the GIS data in memory 33, which may include cache, such as read-only cache. When appropriate, the GIS data controller 34 may also one or both of decompress, e.g., unzip, or deserialize the GIS data for holding in memory 33 for quick access. The GIS data controller 34 may include or utilize operations of a serialization unit 35 configured to serialize a deserialize GIS data.

When a request to display a hole of a selected course is received from a user, e.g., client or other user device 8, the GIS data controller 34 may retrieve the GIS data with respect to the hole and extract client GIS data required for the client to render a visualization of the requested hole. This may include extracting coordinate points of the hole for use to construct a representation of the hole, which may be referred to as hole geometry. In one example, this includes extracting GIS faceted geometry. Additionally or alternatively, this may include extracting zone outline coordinates for the hole from the GIS data. In various embodiments, the GIS data packager 32 or GIS data controller 34 may be configured to extract hole geometry, zone outlines, or combination thereof. Faceted geometry may be derived from rendering a representation of the course from map data comprising one or more of a DTM, DSM, or obstruction model, as examples. In one application, models in point cloud format may be interpolated to a suitable faceted geometry, such as a TIN. Point cloud or faceted geometry of obstructions, terrain, full surfaces, such as a DSM, may be canopy only or may include addition or full 3D representations. The client GIS requests may be made in separate or combined requests. The response transmissions including the requested client GIS data may be in separate or combined transmissions. In one example, when a client requests client GIS data to display a hole, the request is transmitted to the visualization system 30, which may comprise a backend server, to get hole geometry and zone outlines of the GIS data for that hole. These requests may be handled by the GIS data controller 34, which may comprise one or more controllers. For instance, the GIS data controller 34 may include one or more API controllers, such as an ASP.NET REST API controller, configured to look up the GIS data with respect to the hole in the memory 33, e.g., utilizing identifying information provided in the request, such as hole number and one or both of tournament or course. As noted above, the memory 33 may comprise in-memory cache. The GIS data controller 34 may then extract the client GIS data for the hole and transmit the client GIS data to the user device 8 for rendering. In various embodiments, the GIS data controller 34 may further process the client GIS data for ease of transmission, handling, or both. For example, the GIS data controller 34 may serialize faceted geometry (e.g., triangle facets) of the GIS data for the hole into a simple binary format to reduce its size. For example, the binary format may result in a payload that is significantly smaller than using standard file formats such as JSON. The GIS data controller 34 may include or utilize operations of a serialization unit 35 configured to perform serialization with respect to the GIS data. The GIS data controller 34, which may include a same or different data controller thereof from which extracted the faceted geometry, may extract zone outlines from the GIS data. In one embodiment, the zone outlines are transmitted as JSON. The client, which may include a client-side rendering engine 90, may receive the hole geometry payload and deserializes it, as necessary. The zone outlines response may also be provided. The rendering engine 90 may then render the data to display GIS data content within the user interface 80 in connection with the operations of the golf tournament management system 10, such as the operations of the course setup module 20 described herein. In one embodiment, the GIS data may be displayed and used in connection with operations of the tracking system management module 40.

As noted above, the data may be rendered in a layered approach. The GIS data controller 34 may transmit client GIS data features, such as hole geometry and outlines together or separate. For example, client GIS data features, such as faceted geometry and zone outlines, may be transmitted in separate requests, responses, or both. This organization may be utilized to enhance rendering by the rendering engine 90 in a layered approach. For example, faceted geometry may be rendered as a base layer by applying a fill using the faceted geometry. The zone outlines may then be rendered as a subsequent layer by applying a stroke (outlines) using the zone outline data over the base layer.

It is to be appreciated that the amount and type of GIS data that is pre-processed by the GIS data packager 32 and processed for inclusion in client GIS data will generally correspond to the types of objects, mapping aspects, and level of detail that is to be rendered for course visualization. For example, rather than utilizing a canopy only obstruction cloud, a DSM or full point obstruction cloud, e.g., derived from LIDAR, may be utilized to improve visualization detail when included in the client GIS data. When the course GIS data is also used for simulations, it may be beneficial for GIS data packages to include additional detailed map data, such as DSM or full point obstruction clouds, to improve calculations within simulations, such as from balls hitting tree trunks or branches. Thus, the amount and type of GIS data provided in GIS data packages or otherwise used for simulation and the amount and type of client GIS data extracted therefrom for rendering of course visualizations may be different.

When appropriate, the GIS data controller 34 may be configured to transform GIS data into a coordinate system used by the client, e.g., client-side application. For example, GIS data may exist in multiple coordinate spaces. Typically, the GIS data will be present in one of two coordinate spaces. In the backend, the GIS data may be in a backend or "Application" coordinate space. On the client-side, the GIS data may be in a frontend or "Map" coordinate space. Maintaining consistency inside these architectural layers may be used to provide simplification and eliminates need for further transformations. For example, when the visualization system 30 transmits client GIS data to the client, the GIS data controller 34, which may operatively include or associate with the transformation unit 36, may transform the coordinates to the Map coordinate space before sending the response. In this manner, the client will not need to perform transformation, thereby keeping the client logic simpler. In various embodiments, the GIS data coordinates may be transformed by the GIS data packager 32, GIS data controller 34, or both. However, in some embodiments, client GIS data may not be transformed to the Map coordinate space before sending to the user device 8 and client-side operations may include transforming the client GIS data.

While FIG. 3 illustrates downloading of GIS data packaged from an in-memory representation of the course, other mechanisms may be used to provide map data or GIS data derived therefrom for rendering of interactive course visualizations. For example, processed map data may be transmitted to user devices 8. In some embodiments, the GIS data controller 34 may perform the operations described with respect to the GIS data packager 32 with respect to a course when a user selects a course. The visualization system 30 may include a repository or access a repository of processed GIS data with respect to courses and holes ready for transmission to the user device 8.

In various embodiments, course selection and data loading processes begin with a request to retrieve tournament and course information. The golf tournament management system 10 may maintain a database or data structure containing details about multiple golf tournaments. The details may include identifying information such as names, unique codes, and associated courses. When a user device 8, e.g., client, requests this information (e.g., client GIS data), the data object controller 31 responds by fetching, from the tournament/course data object repository 37, and returning a list of tournament data objects, each containing the tournament's identification information and a list of associated courses with their names and unique numbers. Once a specific course is selected, the GIS data controller 34 proceeds to load the detailed GIS data for that course. The GIS data may be loaded from the GIS data package database 65 when the GIS golf tournament management system 10 employs a GIS data packaging scheme, such as one described above and elsewhere herein. The request for the client GIS data may include, for example, a tournament code, course number, and hole number. In one example, the GIS data controller 34 validates the requested parameters and retrieves the hole-specific client GIS data from the memory 33, which may comprise pre-processed, read-only cache. This cache may be utilized to improve performance by storing complex GIS data in a readily accessible format. The GIS data controller 34 may processes the retrieved GIS data, filtering out irrelevant features, if present, not needed for client visualization. For each relevant GIS data feature the GIS data controller 34, utilizing the transformation unit 36, may transforms its geometric representation from an Application coordinate space to a Map, e.g., standardized map, coordinate space. In one example, relevant GIS data features include geometric facets that makeup a hole, such as each zone of a hole, and outlines of each of the zones of the hole. In a further example, the geometric facets comprise a triangulated irregular network, and the client GIS data returned comprises a collection of triangles that make up each zone and the outlines of each zone. This allows the rendering engine 90 to apply a fill using the triangle coordinates and apply a stroke (outlines) using the zone outlines data.

In one embodiment, the transformed geometries are converted into simplified data structures optimized for efficient transmission and rendering. For example, using a triangulated irregular network as an example faceted geometry, the GIS data controller 34 may loop through each zone's triangles and create a corresponding triangle data structure that has 3 vertices for the corner point coordinates for each triangle. In this or another example, the GIS data controller 34 may be configured to further optimize data transfer by converting the processed geometry data into a compact binary format, which may utilize operations of the serialization unit 35. For instance, zone names and corresponding faceted geometry coordinate vertices data, e.g., triangles, may be written in binary form into a byte array. The serialized data may include information about the number of zone geometries, zone names, and the coordinates of each vertex. The GIS data controller 34 may further extract outline information for the course zones, such as greens, fairways, and bunkers, and prepares this data in a simplified format for transmission. In one implementation, the zone geometry, e.g., vertex coordinates, are transmitted to the client as one response and the outlines of the zones are transmitted as a different response. Thus, in effect, the client may make two requests, one for the zone geometry and one for the outlines, giving the client enough information that when it needs to render the zones, the zone geometry coordinates are rendered by the rendering engine 90 to render a fill and the outlines are used by the rendering engine 90 to render the outlines of the zones. This approach to course selection and data loading may be used to ensure that the rendering engine 90 receives information in an optimized format, enabling fast initialization and smooth performance for the user. In one embodiment, one or more operations of the visualization system 30 or controllers thereof may comprise client-side operations associated with a client-side application of the visualization system 30.

FIGS. 4A-4D illustrate various methods of loading and processing GIS data for rendering by a rendering engine 90. The methods provide examples of the many potential variations in the systems and processes described above that may be used to provide client GIS data for rendering according to the present disclosure. The methods and descriptions thereof may be similarly applicable to the visualization system 30, related components, and corresponding processes described above with respect to FIG. 3 and elsewhere herein. For the sake of brevity and ease of understanding, all potential variations of components, processes, and examples will not be explicitly described in detail with respect to every example embodiment described herein. However, those having skill in the art will understand upon reading the present disclosure that the methods and accompanying descriptions applicable to such other components and processes are intended to be applicable to one or more embodiments of the same as if explicitly described as such.

Figure 4A:
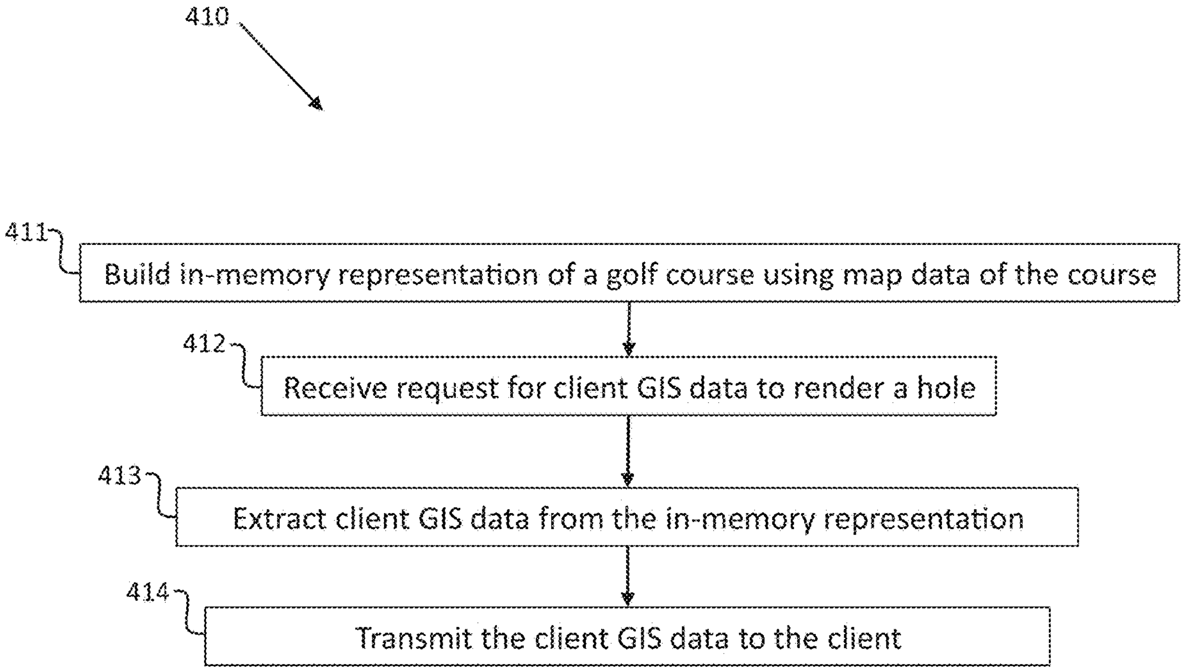
FIGS. 4A-4D illustrate various methods of loading and processing GIS data for rendering by a rendering engine according to various embodiments described herein.

In method 410, depicted in FIG. 4A, an in-memory representation of a golf course is built using map data of the course 411. The representation may be built from suitable map data, such as that described herein, to provide the level of visualization detail desired. For example, the map data may include elevation map data or models thereof providing elevations and topography, such as DEM, DTM, or the like. The map data may include zone map data or models thereof including zone identification, outlines, or other characteristics. The map data may include object maps or models thereof representing objects, including discrete objects, located on course terrain. Such models may include obstruction models. The map data or models thereof, which may further include GIS data assembled therefrom, may be provided in point cloud format. Additional formats may include rasterized or vectorized abstraction formats. In some embodiments, a GIS data packager 32 may generate an in-memory representation from map data, e.g., in a manner as described above or elsewhere herein. For instance, the resulting GIS data may be packaged in a GIS data package for subsequent recall by a GIS data controller 34 or provided directly to the GIS data controller 34. In one example, the GIS data controller 34 may one or more of decompress, deserialize, or transform the GIS data or GIS data package, e.g., when the GIS data or package has been processed by a data compression technique, serialized, or it is desirable to transform coordinates in the GIS data or package into another coordinate system.

Method 410 may include receiving a request for client GIS data to render the hole 412. For example, a user device 8 may request GIS data suitable for rendering a visualization of a hole by a rendering engine 90. To improve efficiency of processing and rendering operations, the amount of client GIS data extracted for transmission may be limited to the GIS data features needed to render the visualization in a desired level of detail. For example, a faceted geometry may be derived from rendering a representation of the course from map data comprising one or more of a DTM, DSM, obstruction model, combination thereof. In one application, models in point cloud format may be interpolated to a suitable faceted geometry, such as a TIN. Point cloud or faceted geometry of obstructions, terrain, full surfaces, such as a DSM, may be canopy only or may include additional or full 3D representations. As noted above, the representation may be built from map data having a level of detail greater than desired for visualization. This may be beneficial in instances where additional detail in the GIS data is desired for use for other applications, such as running simulations or for application to tracking system management, e.g., inclusion of tracking or media device locations, fields of view of tracking or media devices, player locations, or locations of objects outside typical play such as grandstands, camera towers, or the like.

Method 410 may include extracting the requested client GIS data from the in-memory representation 413. As described above with respect to FIG. 3, the extraction may include extracting coordinates from the GIS data representation of the hole or map data incorporated therein. For example, the GIS data controller 34 may be configured to extract the relevant coordinates via analysis of the GIS data representation or from data accompanying the GIS data, which may include a listing or file specifying one or more GIS data features that may be extracted and utilized as or to derive client GIS data.

Method 410 may include transmitting the GIS data to the client 414, which may typically include transmitting to a user device 8. The user device 8 may comprise a client-side application including request instructions and a rendering engine 90 configured to render the client GIS data to display a visualization of the hole within a user interface 80. As described above and elsewhere herein, the client GIS data may be rendered using a multi-layer approach. For example, hole geometries may be rendered in a base layer, e.g., filling, and zone outlines may be layered above the base layer by applying the outlines above the base layer at the outline coordinates provided in the client GIS data. In some embodiments, the method 410 may further include processing the client GIS data for ease of transmission, handling, rendering, of combination thereof. For example, the client GIS data may be serialized, transformed, or both.

Figure 4B:
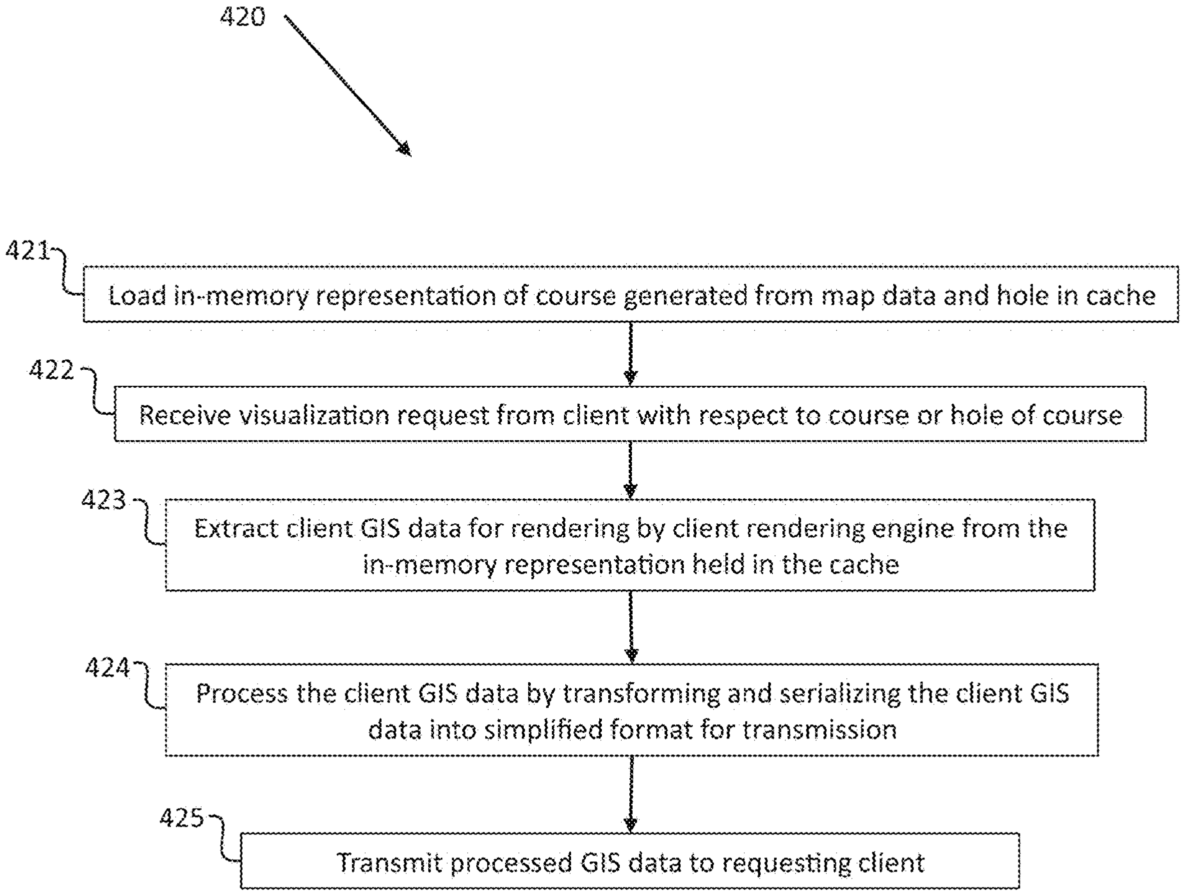

In method 420, depicted in FIG. 4B, an in-memory representation of course generated from map data is loaded and held in memory 421, which in this example comprises cache. The cache may be read-only or otherwise configured for quick access. In various embodiments, the in-memory representation may be generated by a GIS data packager 32 and loaded in memory 33 by a GIS data controller 34, which may be in a manner similar to that described above. In another example, the GIS data controller 34 may be configured to generate the representation and hold the corresponding GIS data in memory 33. Method 420 may also include receiving a visualization request from a client with respect to course of hole of course 422. In one example, the visualization request may include a request for client GIS data as described above or elsewhere herein. Method 420 may also include extracting client GIS data for rendering by a rendering engine 90 from the in-memory representation held in the cache 423. In various embodiments, extraction of the client GIS data may be as described above or elsewhere herein, e.g., effectuated by the GIS data controller 34. Method 420 may also include transforming and serializing the client GIS data into simplified format for transmission 424. Transforming the client GIS data may be optional. In some embodiments, the representation is provided in a coordinate system corresponding to a coordinate system utilized by the client-side application. In one embodiment, the client-side application transforms the client GIS data. Method 420 may also include transmitting the processed GIS data to the requesting client 425.

Figure 4C:
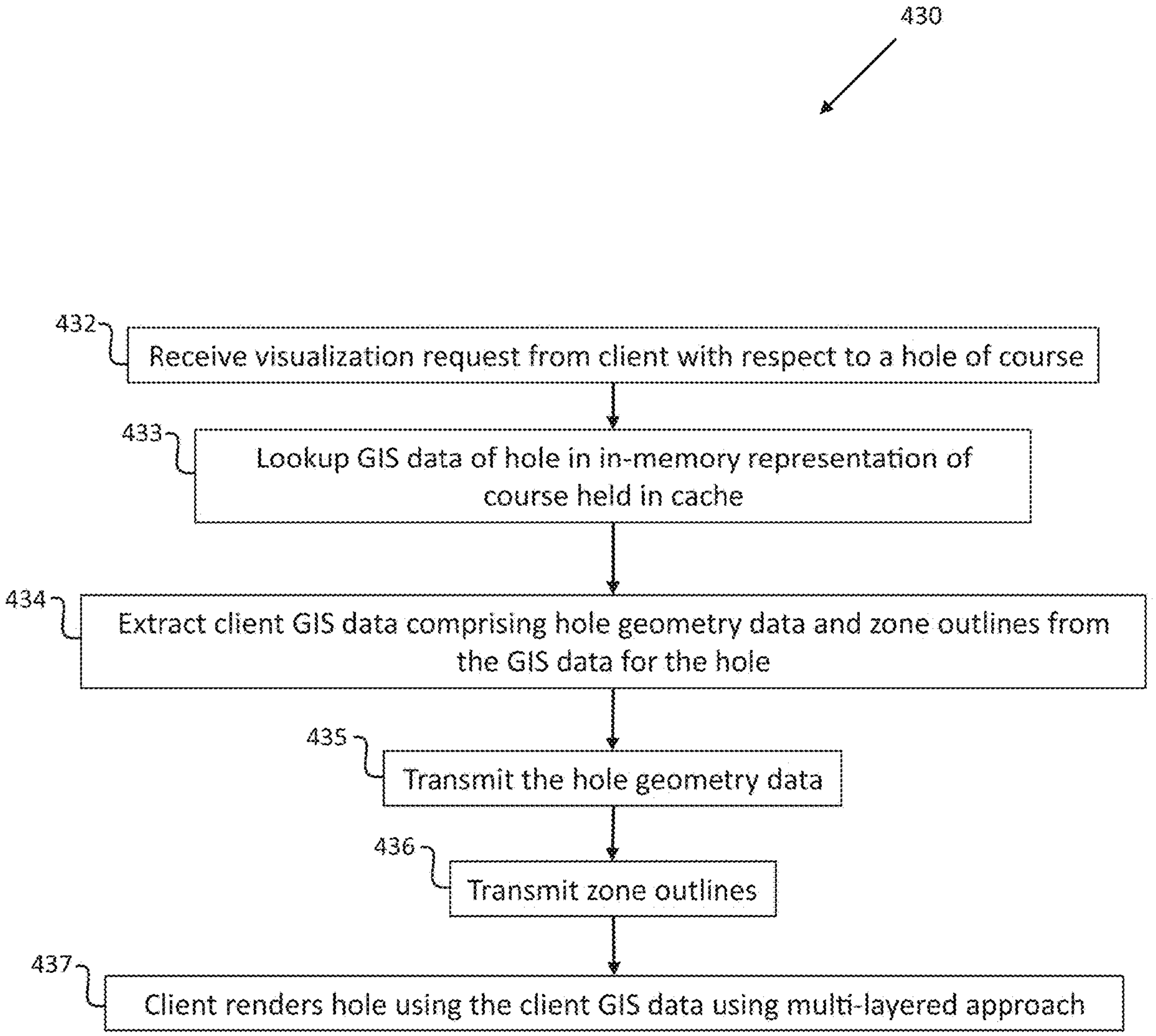

In method 430, depicted in FIG. 4C, a visualization request may be received from a client with respect to a hole of a course 432. The client may comprise a user device 8 executing a client-side application. Method 430 may include looking up GIS data of hole in an in-memory representation of the course held in cache 433. Method 430 may also include extracting client GIS data comprising hole geometry data and zone outlines from the GIS data for the hole 434. In various embodiments, the client GIS data is extracted by a GIS data controller 34 in any manner described herein. The GIS data may comprise map data corresponding to the course, such as map data provided by models of terrain, objects on the terrain, which may be referred to as obstructions, and zone information, such as zone names and zone outlines. In one example, the GIS data includes map data comprising a DTM, an obstruction model, and zone information. The models and other information may be defined in the GIS data within one or more 3D coordinate systems. The visualization system 30 may be configured to translate coordinates, e.g., utilizing a transformation unit 36, among different 3D coordinate systems to ensure data processing, rendering, and calculation consistency. In some embodiments, the GIS data includes DSM, DEM, or other models or map data. Method 430 may include transmitting the hole geometry data 435 and the zone outlines 436. As described above, in one embodiment, the hole geometry data and zone outlines may be transmitted in separate responses. According to one embodiment, method 430 includes the client rendering the hole using the hole geometry data and zone outlines using multi-layered approach 437. The rendering may be executed by a rendering engine 90, which may be consistent with that described above and elsewhere herein. The multi-layered approach may include a base layer and additional layers, which may also be consistent with that described herein.

Figure 4D:
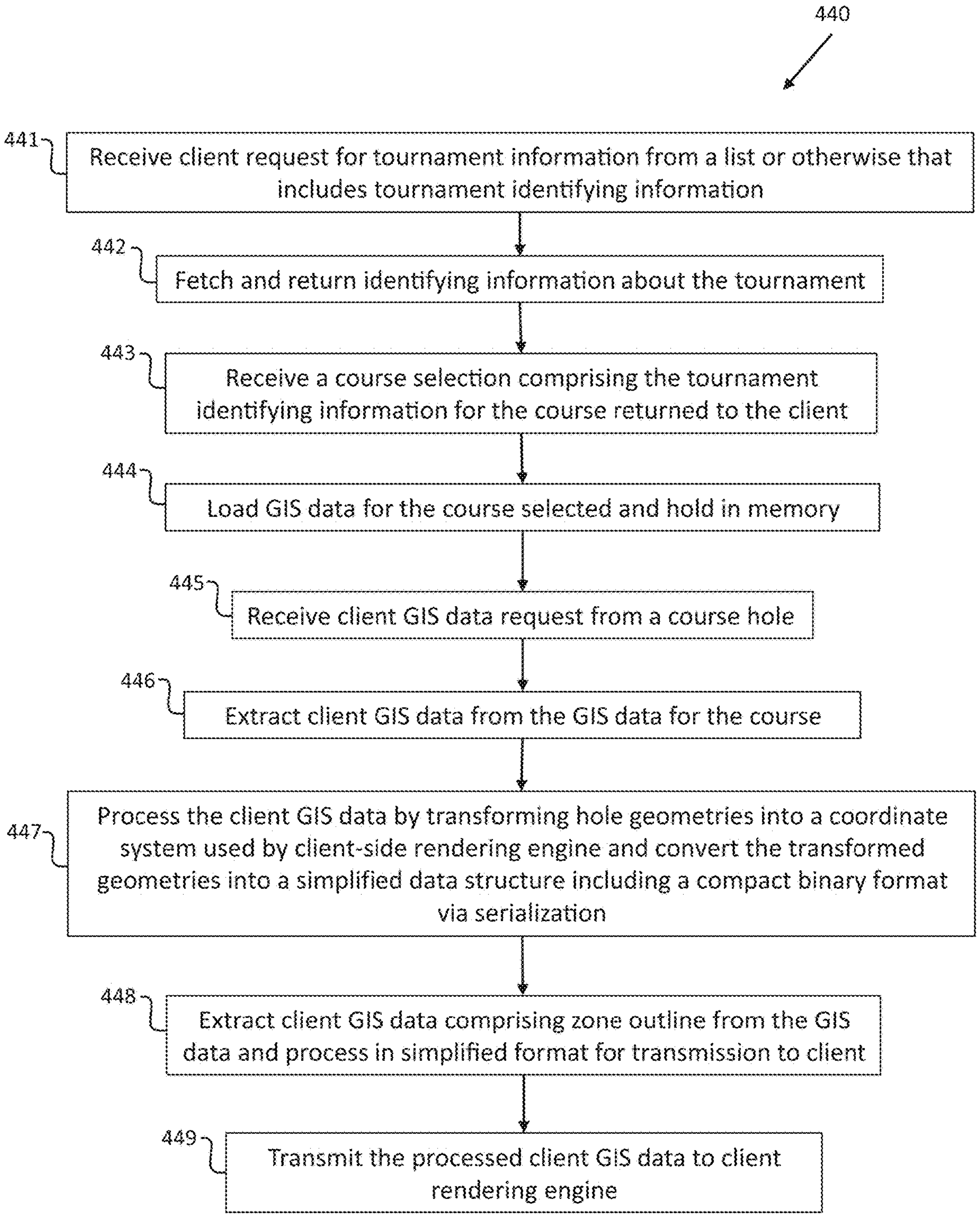

Method 440, depicted in FIG. 4D, a request for tournament information from a list or otherwise that includes tournament identifying information is received from a client 441. Method 440 further includes fetching and returning identifying information about the tournament 442 to the client. For example, a data object controller 31 may be configured to fetch and return identifying tournament information from a tournament/course data object repository 37. The tournament identifying information may include that described herein, such as tournament name, course, identification number, or the like. In some embodiments, the tournament identifying information may be course identifying information without tournament identifying information. Method 440 may include receiving a course selection comprising the tournament identifying information for the course returned to the client 443. For example, the tournament identifying information transmitted to the client may be presented in a selectable format within a user interface 80 enabling a user to select a desired tournament or course for which visualizations of the course are desired. Selection of the tournament or course may cause a request to be populated with the identifying information for the selected tournament or course and sent to the visualization system 30. Method 440 may include loading the GIS data for the course selected and holding the GIS data in memory 444. In one example, a GIS data controller 34 is configured to fetch and load the GIS data with respect to the course. As described above, the GIS data may comprise an in-memory representation of the course generated from map data. In one example, the GIS data is packaged in GIS data packages and stored in a GIS data package database 65 with other GIS data packages, which may include in-memory representations of other courses that may be served to clients upon request to handle management of multiple courses. The GIS data or packages may be one or more of serialized, transformed, or compressed. In one such example, when the GIS data controller 34 fetches the GIS data, the GIS data is one or more of deserialized or decompressed. In another or a further example, the GIS data may be transformed before loading. Method 440 may include receiving a client GIS data request for GIS data with respect to a course hole 445. The method 440 may also include extracting the requested client GIS data from the GIS data for the course 446. Extraction of the client GIS data from the GIS data may be executed as described above or elsewhere herein. For example, the GIS data controller 34 may extract the client GIS data. Method 440 may include processing the client GIS data by transforming hole geometries into a coordinate system used by a client-side rendering engine 90 and converting the transformed geometries into a simplified data structure including a compact binary format via serialization 447. In one embodiment, processing may be performed by the GIS data controller 34 according to any methodology described herein. In this embodiment, the GIS data controller 34 transforms the hole geometries into a client-side or map coordinate system and serializes the hole geometries. As described above, the hole geometries may include coordinates of features. The coordinates may include faceted geometry vertices, such as vertices of triangles that may be used by a rendering engine 90 to reconstruct the GIS data representation or portion thereof. Method 440 may include extracting client GIS data comprising zone outline from the GIS data and processing the zone outlines into a simplified format for transmission to client 448. The zone outlines may comprise outline coordinates as described above and elsewhere herein. The processing may aid in transmission payload. In one example, the processing is optional. The method 440 may further include transmitting the processed client GIS data to the client rendering engine 449. As described above, in one embodiment, the hole geometry data and zone outlines may be transmitted in separate responses. According to one embodiment, method 440 may further include the client rendering the hole using the hole geometry data and zone outlines using multi-layered approach. The rendering may be executed by a rendering engine 90, e.g., which may be consistent with that described above and elsewhere herein. The multi-layered approach may include a base layer and additional layers, such as zone outlines, rendered thereon.

Figure 5:
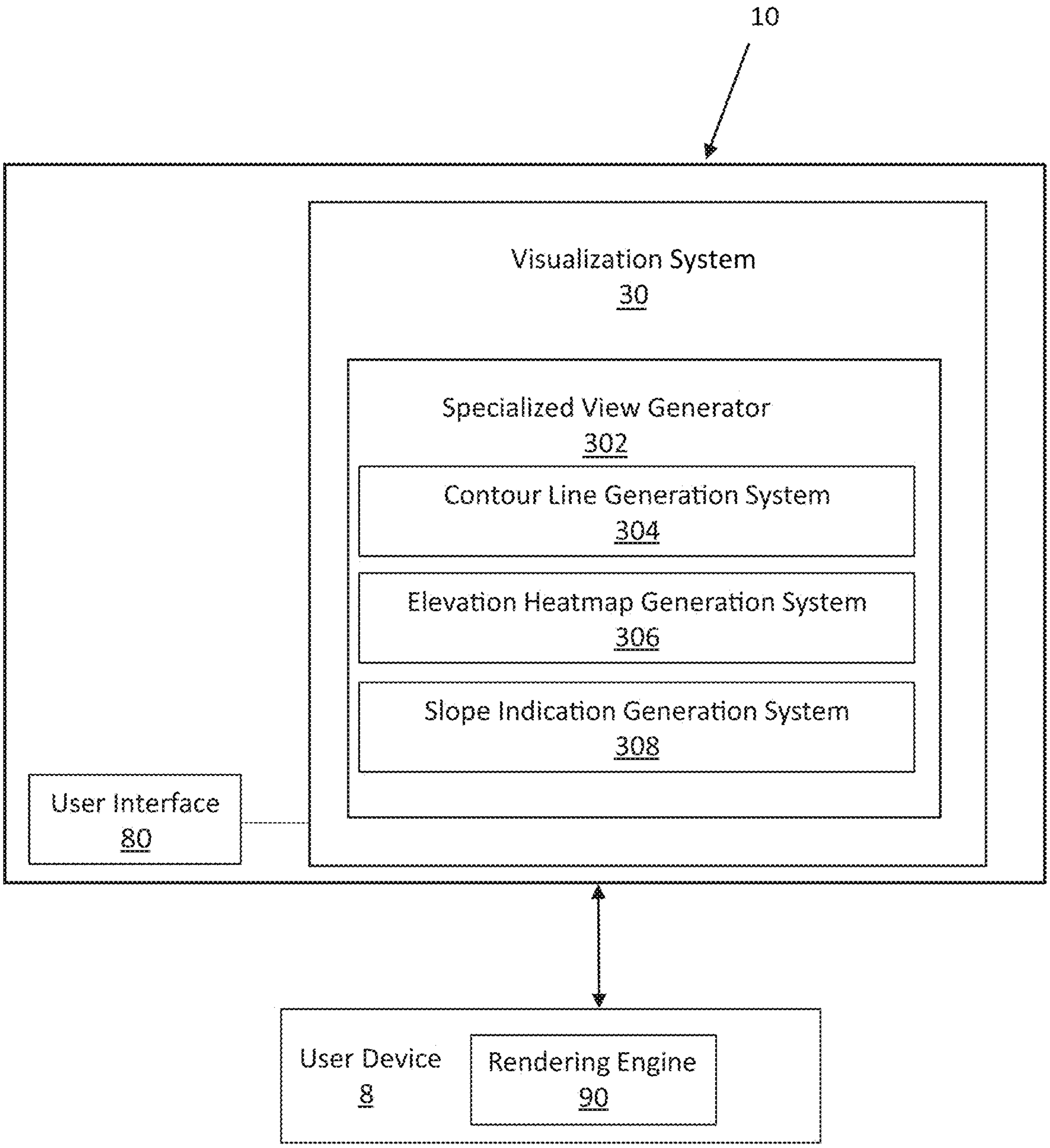
FIG. 5 schematically illustrates components of a specialized view generation feature of a visualization system according to various embodiments described herein.

With further reference to FIG. 5, the visualization system 30 may be configured to create rich, interactive representations of golf courses. As described above, the visualizations may use a combination of server-side data preparation and client-side rendering techniques. The process may employ a server, where the previously loaded and processed course GIS data is prepared for visualization. The server may execute operations described herein with respect to the visualization system 30, and components thereof. In various embodiments, the GIS data may include hole geometry data containing detailed information about the course or hole's topography and features. In some embodiments, processing of this hole geometry data may include serializing the hole geometry data into a compact binary format. On the client-side, the rendering engine 90 may process the hole geometry data and zone outline data, which may together be referred to as zone geometry data, one or both of which may be serialized. As noted above, the zone outlines may be layered over a base layer comprising the hole geometry data. In various embodiments, the rendering engine 90 may be configured to process the zone geometry data along with one or more specialized visualization layer data and combine these various data sources 60 to create a final course visualization. The visualization system 30 may be configured to support dynamic toggling and layering of different visualization elements, allowing users to customize their course visualization of the hole or course.

In one configuration, the visualization system 30 employs a multi-layered approach to render the course. For example, a zone base layer may utilize serialized zone geometry data, e.g., zone outline data layered on hole geometry data, to display base course features such as greens, fairways, bunkers, or other course elements. On top of the zone base layer, the course visualization system 30 may generate specialized view data that produce one or more specialized views when rendered, such as layer rendering. These layered specialized views may be referred to as specialized visualization layers. For instance, the visualization system 30 may include a specialized view generator 302. In various embodiments, the specialized view generator 302 may include one or more of a contour line generation system 304 that processes elevation data to create vector-based contour lines representing changes in a green's height, an elevation heatmap generation system 306 that produces a color-coded raster image depicting height variations across the course, a slope indication generation system 308 that calculates and displays arrows representing the direction and intensity of slopes, or other specialized view generators configured to generate special view data that may be rendered to provide specialized views or specialized visualization layers. In one example, the visualization system 30 provides users the ability to load and view historical data to analyze player performance and results for past tournaments. The historical data may be provided in a specialized view, e.g., that may be overlayed, to provide historical hole setup and course data for further analysis and comparison to simulated results. The historical hole setup may include indications of tee and hole locations used in previous play. The historical data may be stored in a historical database 62 maintained or accessed by the golf tournament management system 10 for use to generate historical setup and related views and player performance. In one embodiment, the specialized view generator 302 or a generation system thereof may be configured to generate specialized visualization layers triggered by a user request for the same. In this or another embodiment, the specialized view generator 302 or a generation system thereof may be configured to automatically generate one or more specialized visualization layers for a hole when a client GIS data, e.g., zone base layer, is received for the hole. In this or another example, the specialized view generator 302 or a generation system thereof may be configured to automatically generate one or more specialized visualization layers for each hole of a selected course when the course is selected. In this or another example, the specialized view generator 302 or a generation system thereof may be configured to automatically generate one or more specialized visualization layers for a hole or one or more zones of the hole when a request for a perspective view, described in more detail below, is received that includes one of the one or more zones of the hole in the perspective view. Additionally or alternatively, while extraction of client GIS data for rendering base hole views is described as being triggered by a request for such a hole view, in other embodiments, client GIS data comprising base hole views may be generated for all holes on a course upon user selection of the course. In another embodiment, client GIS data corresponding to base hole views are generated and maintained in memory for transmission to clients on-demand. In one embodiment, one or more operations of the specialized view generator 302 or a generation system thereof may comprise client-side operations associated with a client-side application of the golf tournament management system 10.

It is to be appreciated that the methodologies above for processing map data, such as GIS data, for generation of course and other visualizations described herein may be modified as well as replaced by other suitable map data and methodologies. As an example, a tile base data model may be utilized wherein in map data, such as GIS data, is processed to be broken into map tiles wherein each tile represents a portion of the course. The portions may be provided in any desired size, such as small sizes or various sizes, for ease of handling, transmission, or storage. For example, only tiles necessary for a current view may be loaded. As another example, an API model may be used. For instance, and on-demand fetching methodology using an API may be employed. In one implementation, instead of packaging GIS data or caching it, the visualization system 30 may serve only the required GIS data in real-time based on specific requests to the API. In yet another example, a deferred data loading scheme may be employed. For example, course data would be loaded in a progressive manner where only basic map data layout features are initially served. Thereafter, additional data is served based on the client's workflows, requests, or both.

Figure 6A:
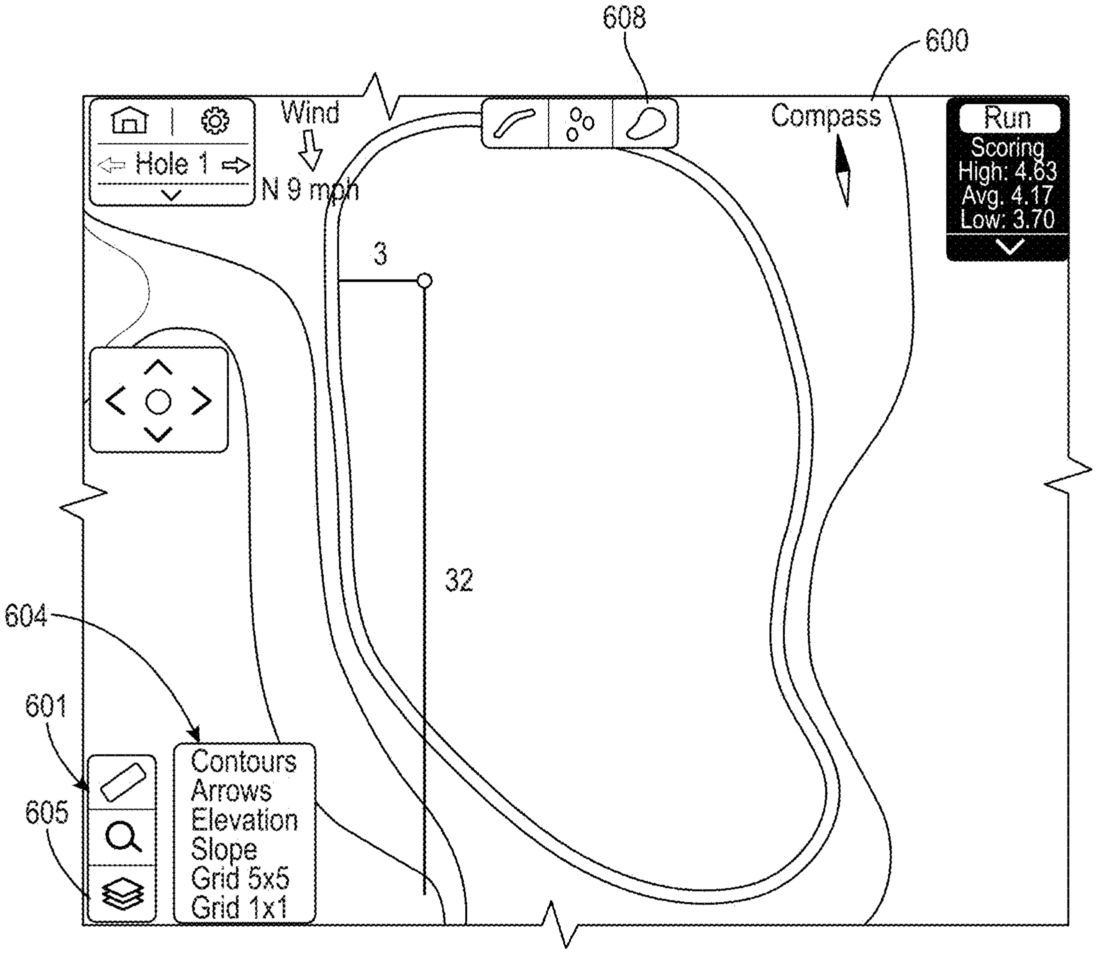

As introduced above, the visualization system 30 may be configured to generate specialized views, or specialized view data that may be rendered to create specialized views, of the course to allow a user to customize visualizations of a hole or portion thereof, e.g., utilizing a contour line generation system, elevation heat map generation system, slope indication generation system, or other specialized view generator. The specialized views, which may include specialized visualization layers in a multi-layered approach, may be selectable by a user. For instance, a user may select a specialized view for display, select specialized views to selectively toggle between views, or toggle specialized views on and off. Specialized views may comprise views that provide graphical depictions of terrain topography or other terrain features. For example, specialized views may include green views that depict green topography, such as slopes or elevations. FIGS. 6A-6E illustrate example operation and display of specialized views as applied to a green perspective view using a multi-layered approach. FIG. 6A illustrates a green perspective view 600 wherein a selectable green perspective view 608 has been selected. To cause rendering of a specialized visualization layer to generate a specialized view, a user may interact with the tool panel 601 by selecting the layer selection tool 605. Selecting the layer selection tool 605 reveals a list of available layers 604. While certain specialized views may be referred to herein as specialized visualization layers that may be layered over a base or base zone layer, those having skill in the art will appreciate that such specialized views may be provided for rendering separate of a base or base zone view, as a replacement of a base or base zone view, or otherwise. Contour line generation system, elevation heatmap generation system, slope indication generation system.

Figure 6C:
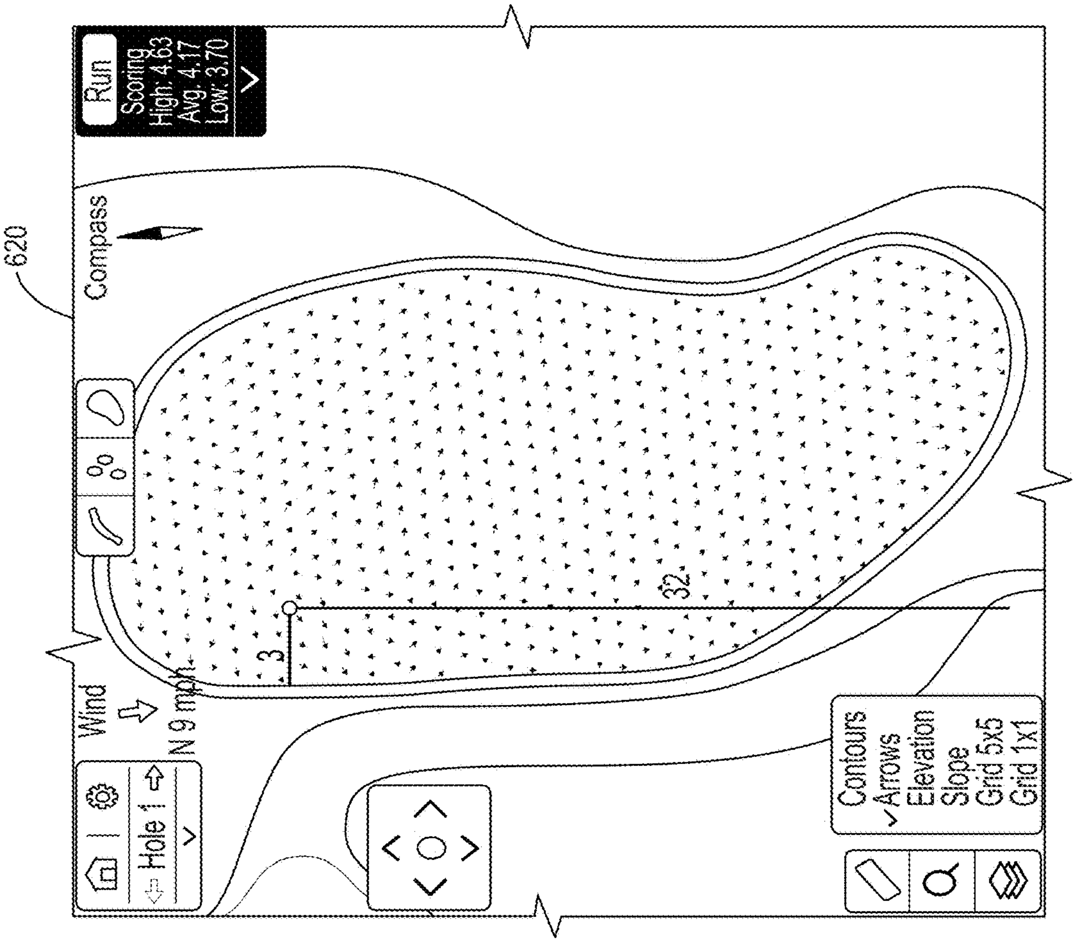
Figure 6B:
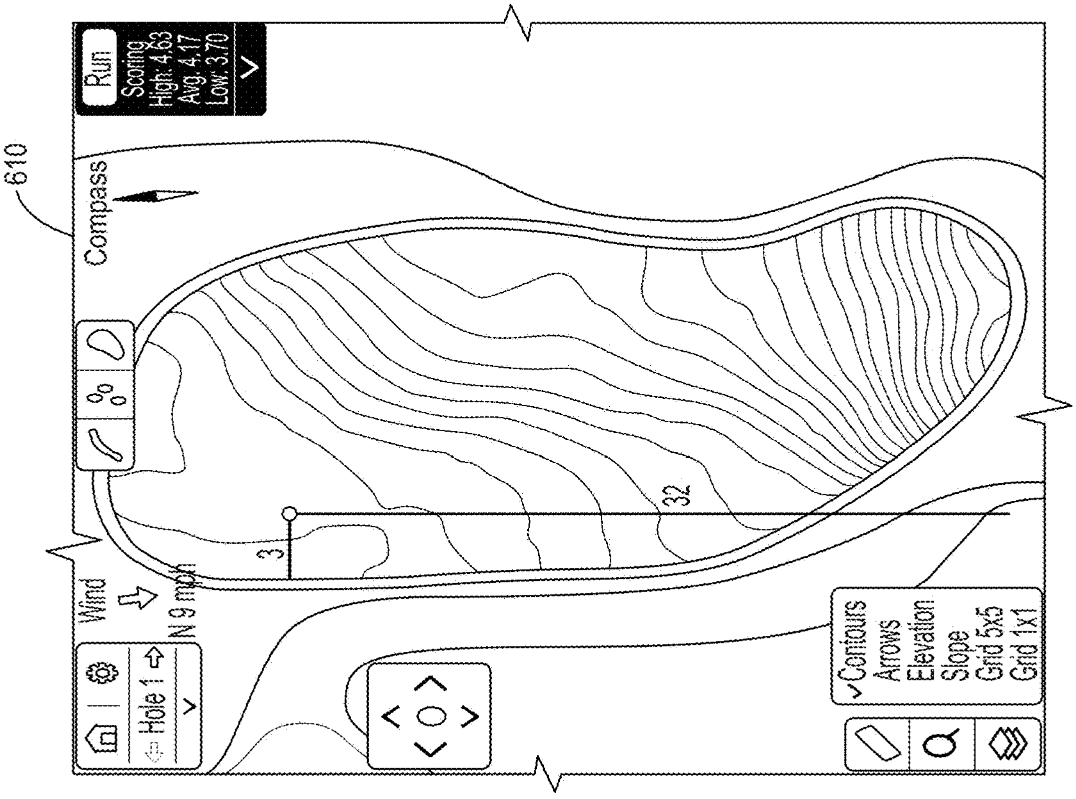
Figure 6D:
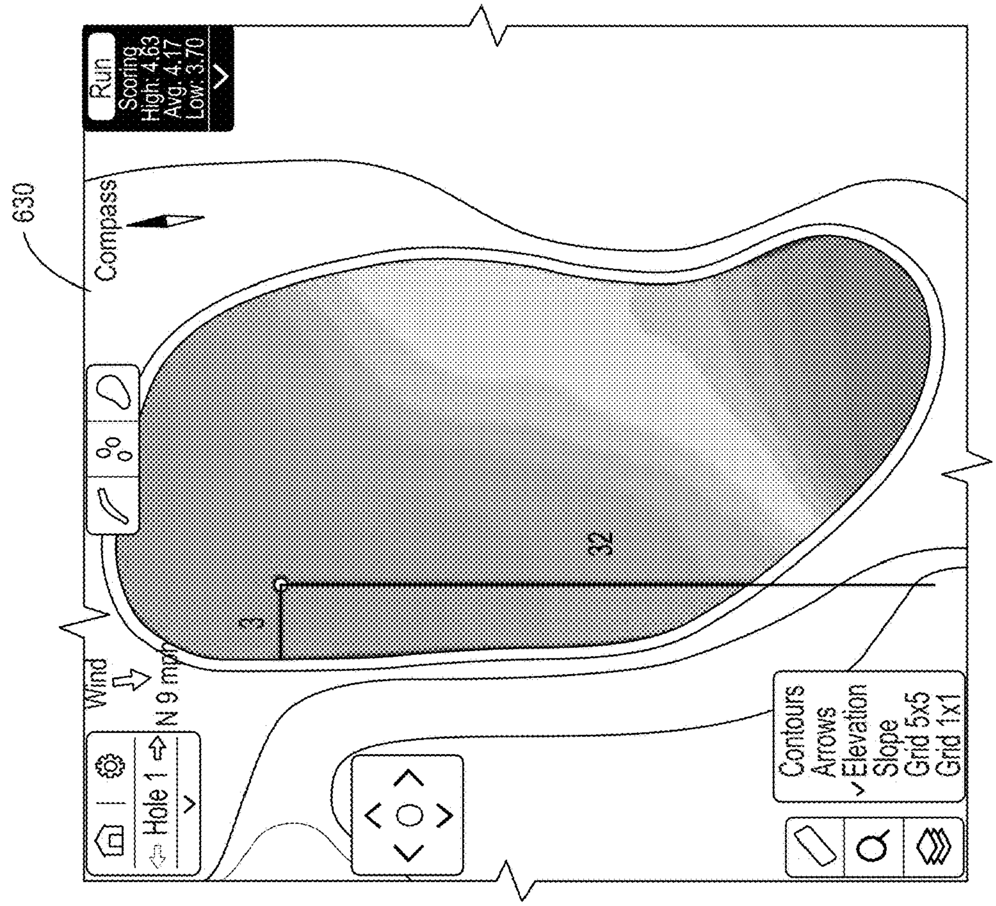
Figure 6E:
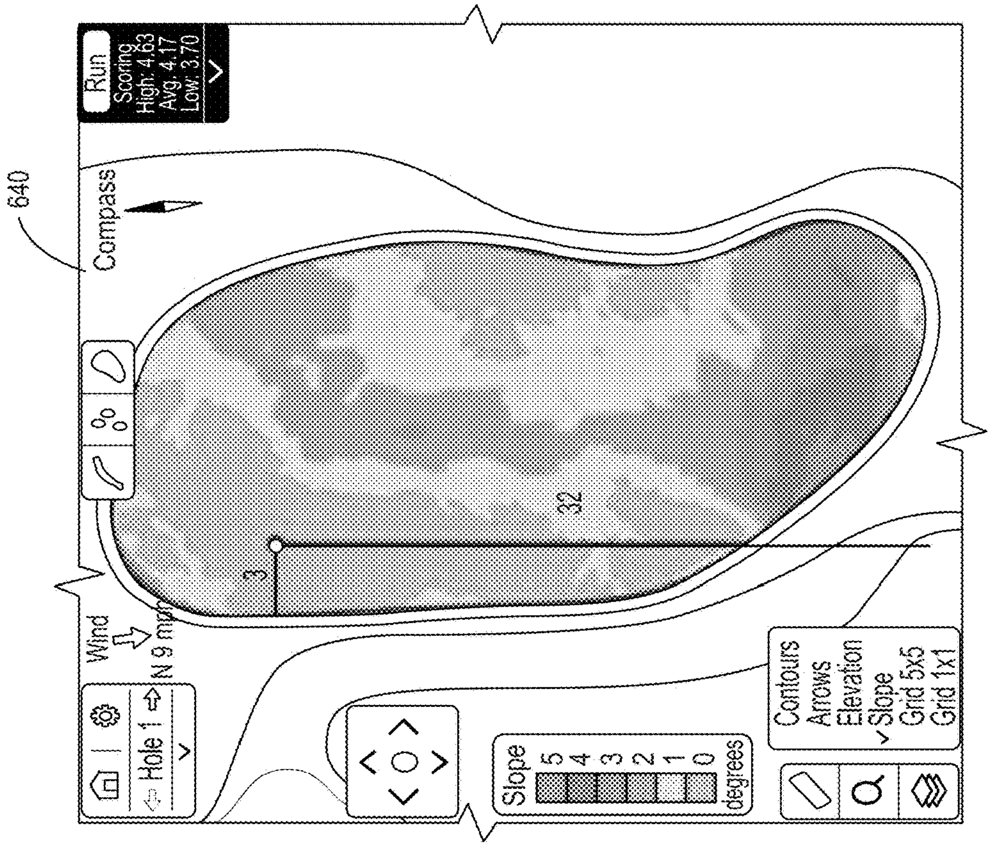
Figure 6G:
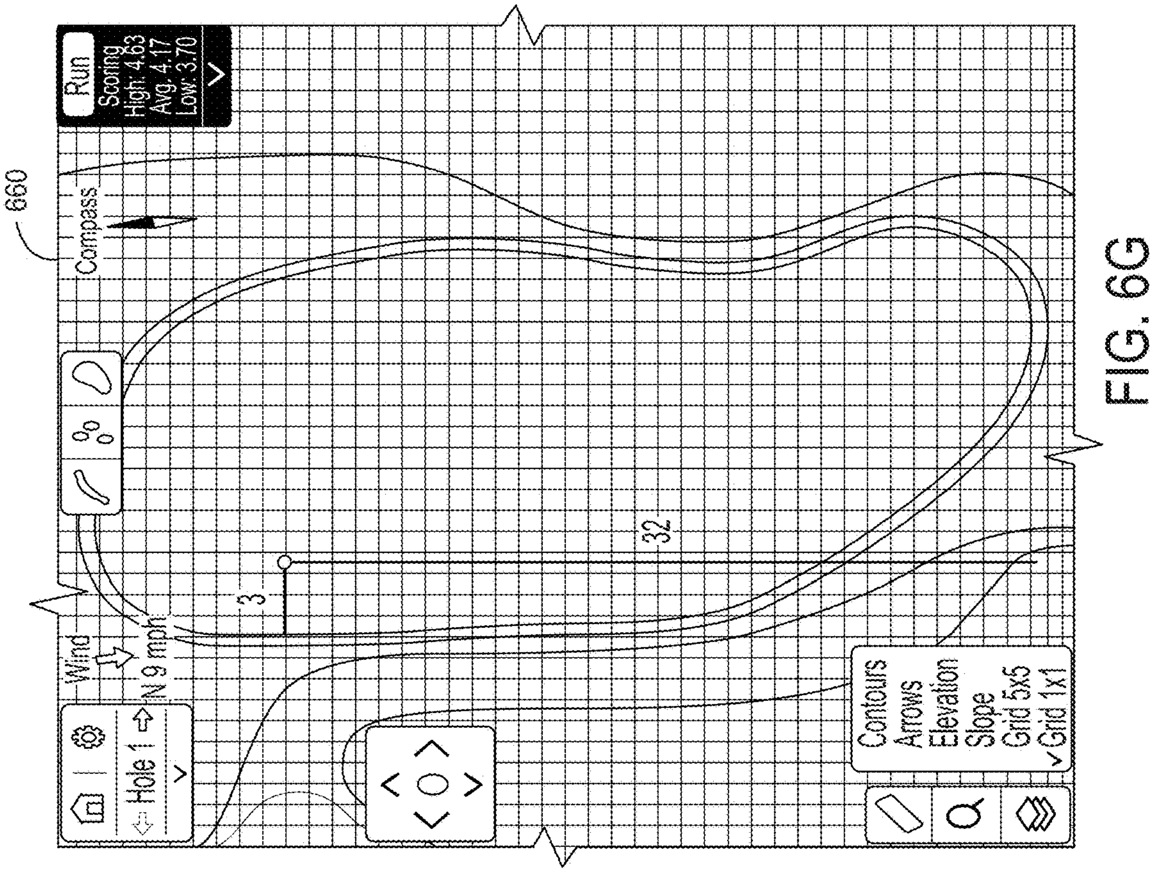
FIG. 6G illustrates a 1×1 grid system view.
Figure 6F:
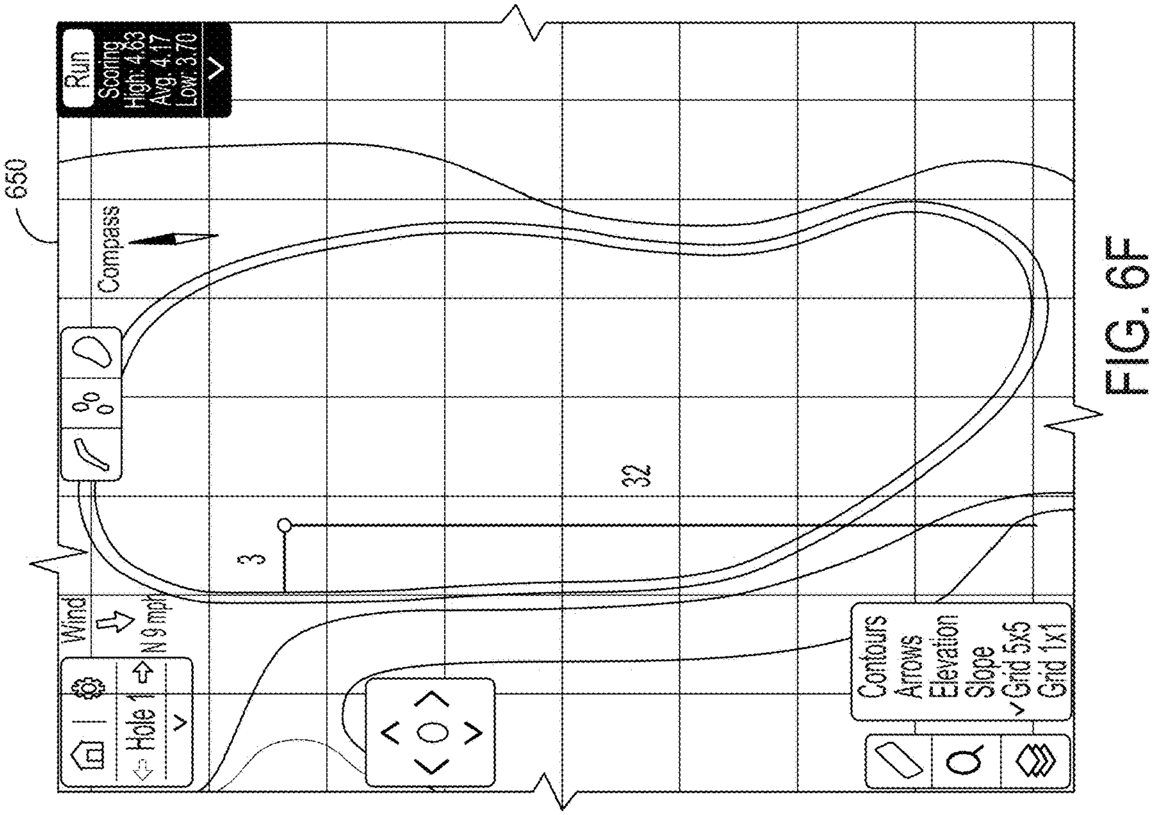
FIG. 6F illustrates a specialized 5×5 grid system view.
Figure 7:
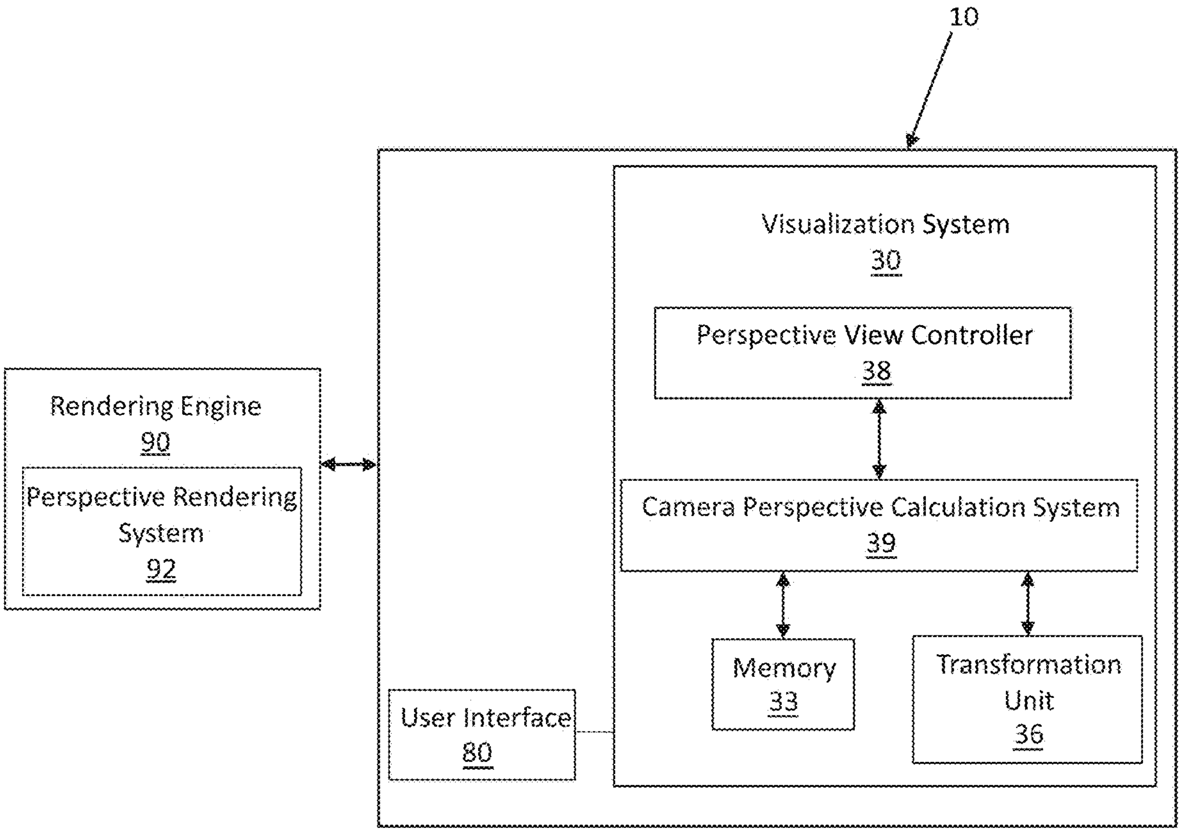
FIG. 7 schematically illustrates components of a perspective selection feature of a visualization system according to various embodiments described herein.

FIG. 6B illustrates a specialized green contour view 610 generated by the contour line generation system from elevation data, e.g., DTM or GIS data generated therefrom, wherein the contour lines represent changes height along the green. FIG. 6C illustrates a specialized green arrow view 620 generated by the slope indication generation system from elevation data, e.g., DTM or GIS data generated therefrom, wherein the arrows represent direction and intensity of slopes along the green. FIG. 6D illustrates a specialized green elevation heat map view 630 generated by the elevation heatmap generation system from elevation data, e.g., DTM or GIS data generated therefrom, that includes a color-coded raster image depicting height variations across the green. FIG. 6E illustrates specialized green slope heat map view 640 including a color-coded raster image generated by a slope indication generation system from elevation data, e.g., DTM or GIS data generated therefrom, that depicts slope along the green wherein different colors are uses to represent degrees of slope. FIGS. 6F & 6G illustrate specialized grid views 650, 660 generated by a specialized view generator from GIS data and from which green size may be visually analyzed or measured wherein FIG. 6F provides a 5×5 grid system and FIG. 6E provides a 1×1 grid system. In some embodiments, these specialized views may be packaged for display with other course visualization data for client-side rendering or otherwise for display in the user interface 80. While specialized visualization layers may generally be generated by server-side processing, in one embodiment, one or more of the visualization layers may be generated by client-side processing, e.g., by analysis of the client GIS data. While specialized visualization layers or specialized views depicting elevation data are described herein, it is to be appreciated that specialized visualization layers or views may be provided of off-green areas of the course. For example, course GIS data for off-green areas, such as the entire hole or course may be used such that off-green course visualizations including, contours, slopes, elevation, among others, may be available.

Figure 11A:
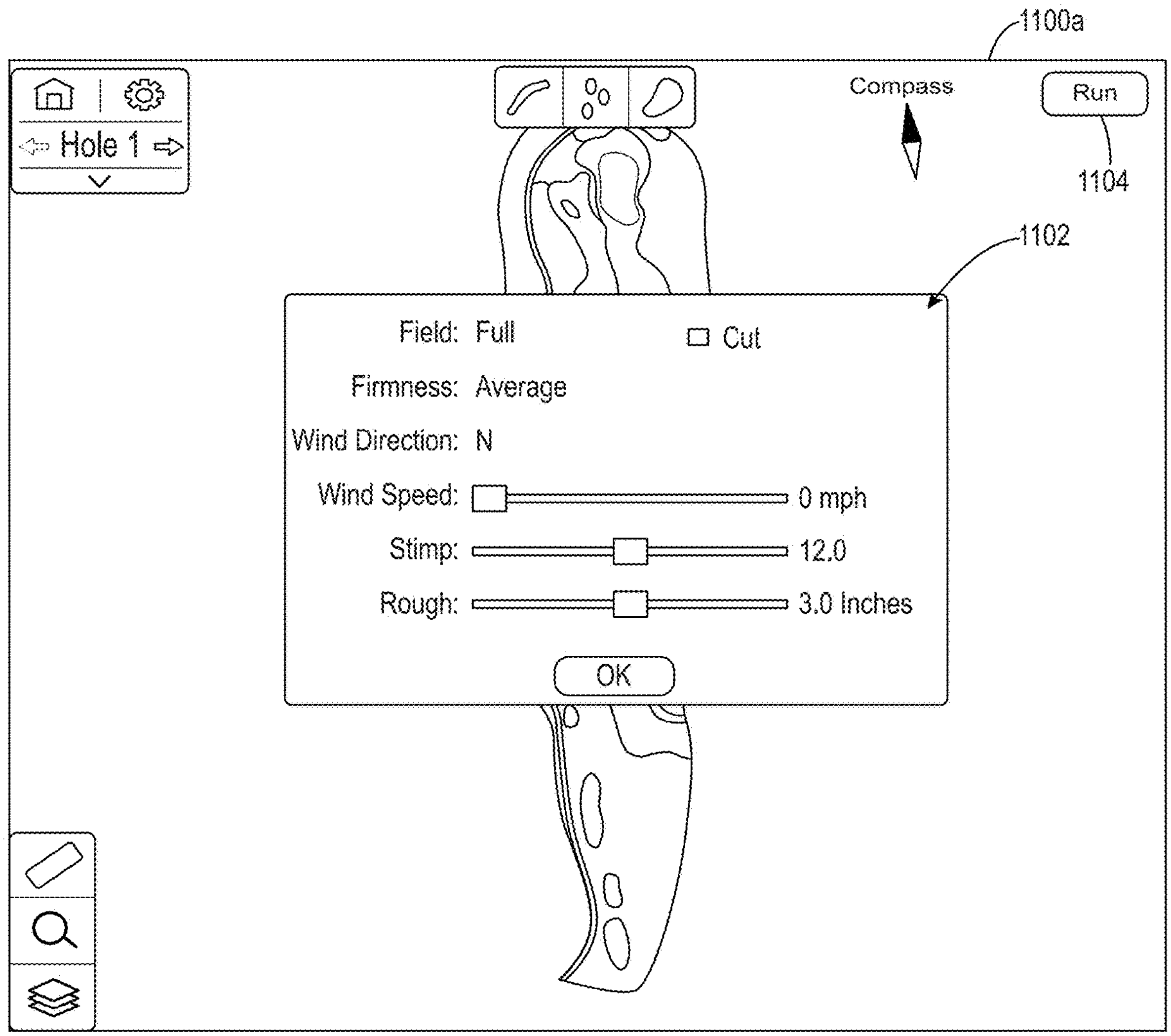
FIG. 11A illustrates a user interface comprising course visualization including a hole view including a course variable specification interface according to various embodiments described herein.
Figure 11B:
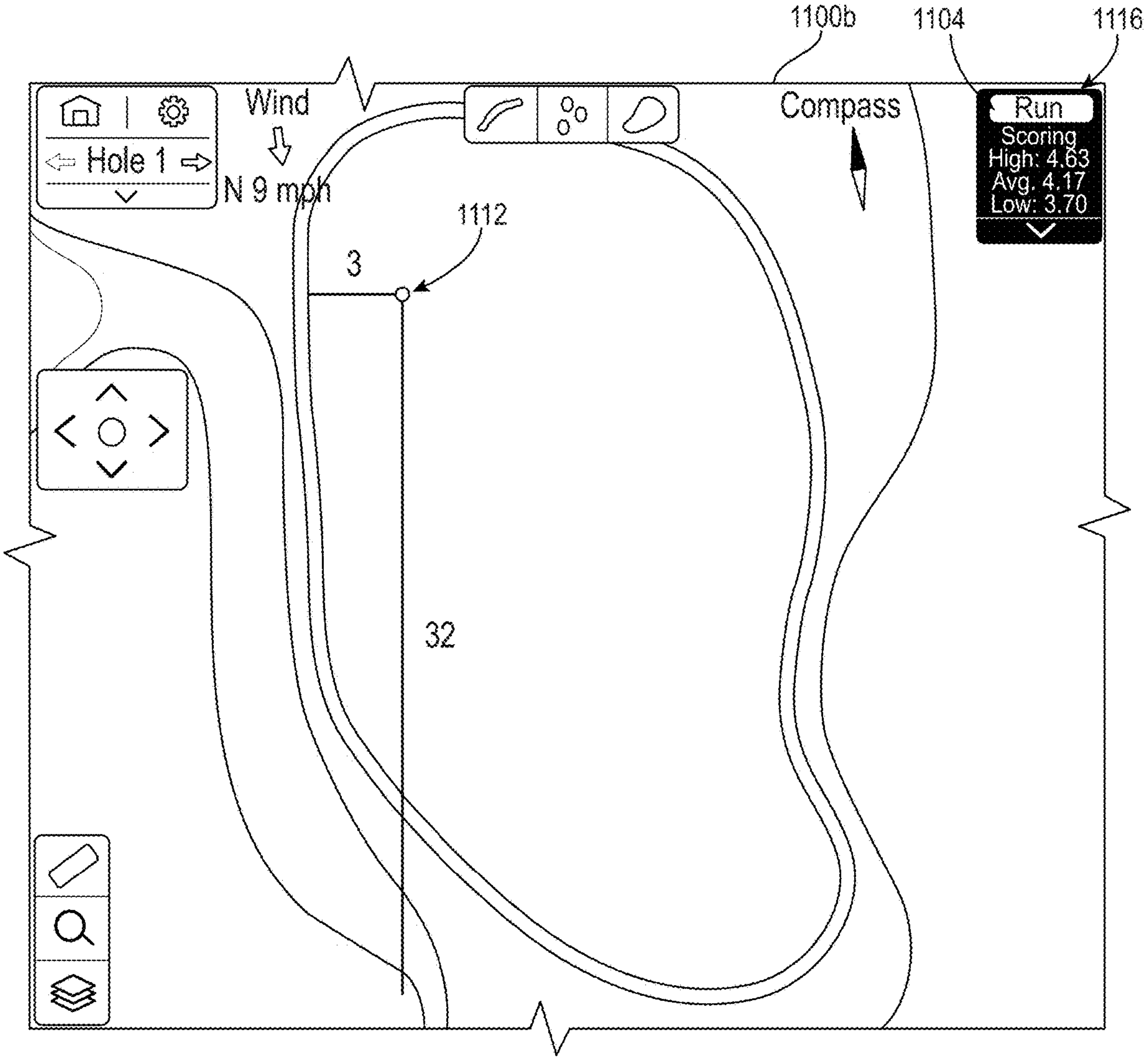
FIG. 11B illustrates a user interface comprising course visualization including an example green view depicting a pin placement operation according to various embodiments described herein.

In various embodiments, the course setup module 20 may be configured to provide historical data for viewing. This historical data may be integrated with the GIS data or client GIS data as described above for rendering of historical course setup views to allow users to analyze past course setups. In some embodiments, the historical data may integrate with data used to generate additional or alternative course visualizations such as those described with respect to FIGS. 13-19. This historical data may include course variables with respect to past tournaments hosted by the course. These past course variables may include past hole and tee locations. The past course variables may include course variables such as zone outlines, e.g., bunker locations. In some embodiments, past course variables including course condition variables such as rough height, rough density, fairway height, fairway firmness, green speed, green slope, green elevation, or other course condition variable. These variables may be integrated in the display, e.g., values with respect to the course condition variables may be displayed or displayable over features in which they relate. For example, a rough density value may be displayed over the rough or clicking or otherwise interacting with the rough may display the past rough density value. In another example, course condition values may be present in a list displayed or selectively displayable, which may include over the course visualization. Past environmental variables, such as wind direction, wind speed, humidity, forecasted precipitation, or the like may be similarly displayed or selectively displayable. For example, FIGS. 11A & 11B depict a wind feature 1105. The wind feature 1105 indicates a wind direction and speed. The wind feature 1105 also provides a visual indication of wind direction using an arrow showing the direction of the wind relative to the hole. The wind feature 1105 may be present to provide information about wind in course visualizations depicting past course setups, visualizations of proposed course setups, or visualizations of a current course setup wherein the wind feature represents live or forecast wind direction and speed.

In some embodiments, historical setup views may comprise specialized views. For instance, historical setup views may be generated for application in a multi-layered approach over a base layer, as described above. The historical setup views may be rendered for display as described above, e.g., via client-side rendering. In one configuration, historical setup views may be selectable by a user via interaction with the user interface 80. For example, applicable available historical setup views may accessible via interaction with the tool panel, for instance as a selectable specialized visualization layer. A historical setup view may also include player performance with respect to the past setups during play, such as in the past tournament. The player performance may be displayed together with the visualization of the course setup or separately. Player performance may be as described above and elsewhere herein. For example, player performance may include scoring statistics, such as high, average, and low scores, driving distance, fairway hit percentage, greens in regulation, penalties, among others. The player performance data may be displayed or displayable via user interaction with a historical setup view. For example, a table listing player performance scoring related data may be provided in a historical setup up view. In one configuration, a summary dialog may be provided within a historical setup view of the course for quick viewing of player performance during the past play the historical setup view applies. The summary dialog may be similar to the summary dialog 1116 shown in FIG. 11B and include past player performance results like scoring averages, driving distances, and penalties.

In one embodiment, specialized views, such as those described above or elsewhere herein may be provided for historical course setup views. This may be helpful in instances where course topography or other elements have changed. Additionally or alternatively, specialized views depicting shot locations or other scoring related statistics may be generated for display. For example, a specialized view that depicts location of shots relative to the course with a hole view or perspective view thereof may be generated that when displayed depicts landing or resting locations of shots. The shots may be specified shots such as those resulting from tee shots, layups, approach shots, or a particular shot number, player level, player group, round, pre-cut, post-cut, or otherwise. The specialized view, e.g., a specialized visualization layer, may be configured for selectable modification by a user. For example, a user may select a portion of the historical data provided by the view for display. Using the shot location example above, this may include specifying a shot number or a zone or area within the course visualization or an interface panel to cause rendering of a visualization layer depicting landing location of shots corresponding to the specified shot number, zone or area, or both for display. In a further example, one or more hole scores may be selected to display shot locations of balls of players that ultimately scored the one or more selected scores. In a further example, shot locations may be color coded by eventual hole.

In various embodiments, the visualization system 30 is configured to provide users with selectable perspectives views, such as tee, green, and hole views, to allow users to analyze different aspects of the course. For example, with further reference to FIG. 7, the visualization system 30 may include a perspective selection feature that provides users with multiple pre-calculated viewing angles of a golf course or portion thereof, thereby enhancing their ability to set up the hole. In one implementation the visualization system 30 includes a camera perspective calculation system 39 configured to analyze the GIS data of a hole to determine viewing angles and positions. This analysis may consider factors such as the layout and orientation of the hole and course features like tee boxes and greens. For each calculated perspective, the camera perspective calculation system 39 may generate a data structure. The data structure includes a set of outline coordinates defining the visible area. The data structure may also include a unique identifier for the perspective. In some embodiments, the data structure includes orientation features such as a center point coordinate representing the focal point of the view, a rotation angle to orient the view correctly, or both. To ensure consistency with other course visualization data and enable accurate rendering, e.g., client-side rendering, a transformation unit 36 may be available to transform the perspective coordinates, if necessary, from an internal application coordinate system to a standardized or "Map" coordinate system. User interactions with course views, such as tee or pin placements, may be captured by the golf tournament management system 10 in the system's internal space and the visualization system 30 may transform the coordinates to the Map coordinate system for rendering in the course visualization. In one example, when a user requests perspective options for a specific hole, a perspective controller 38, which in one embodiment comprises a dedicated controller, is configured to retrieve hole layout GIS data for use by the camera perspective calculation system 39. The hole layout GIS data may include hole specific tee boxes, greens, and boundaries of the hole. The perspective controller 38 may additionally invoke the camera perspective calculation system 39 to analyze the hole layout GIS data for the hole and return a collection of perspective data objects representing multiple available viewpoints for the specified hole. In various embodiments, the hole layout GIS data may comprise GIS data held in the memory 33 as described with respect to FIG. 3, which may include cache. As noted above, outline and center point coordinates of the data structures may be transformed into a standardized coordinate system. On the client-side, the rendering engine 90 may include a perspective rendering system 92 configured to interpret this data and reposition and rotate the view accordingly. For example, the collection of perspective data objects may include the data structure for each perspective such that selection or deployment otherwise causes the perspective rendering system 39 to apply the data structures to generate the selected perspective view. In one embodiment, perspective views may be generated automatically, e.g., when client GIS data is extracted for generation of a base hole view. In another embodiment, client GIS data or data structures corresponding to base hole views, perspective views, specialized visualization layers, or combination thereof are generated and maintained for transmission to clients on-demand such that extraction or generation of the client GIS data, specialized visualization layers, or data structures are present in memory 33 without being triggered for processing by receipt of a user request. In one embodiment, one or more operations of the perspective controller, camera perspective calculation system, or both may comprise client-side operations associated with a client-side application of the visualization system 30. While the terms client and server have been used to described certain operations of the visualization system 30 and associated generation of course visualizations, it is to be appreciated that some embodiments may not use a client-server architecture and thus the present description is not limited to such architectures. Client requests and interactions may be initiated from a user interface 80 to processing components of a visualization system 30 comprising a same or different computing device that is not a server. Operations of the visualization system 30 may similarly be output to the user interface 80 or processing components thereof, which may include rendering engine 90. Thus client GIS data or other operations or aspects noted as client-side may refer to frontend aspects such as those relating to visualization rendering and user interaction.

Figure 8A:
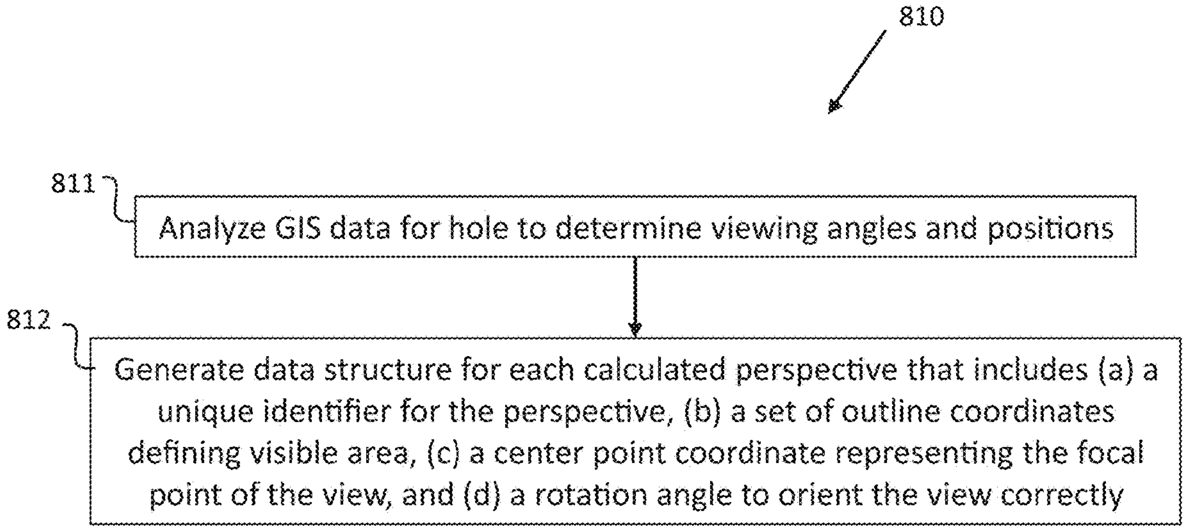
FIG. 8A illustrates a method of generating a perspective view data structure according to various embodiments described herein.

FIG. 8A illustrates a method 810 of generating a perspective view data structure according to various embodiments. The method 810 includes analyzing GIS data of hole to determine one or more viewing angles and positions 811. As introduced above, the analysis may be performed by a camera perspective calculation system 39. In one example, the analysis considers the layout and orientation of the hole. Additionally or alternatively, the analysis may consider features of the hole such as tee boxes, greens, or other features. The method 810 may include generating a data structure for each calculated perspective that includes (a) a unique identifier for the perspective, (b) a set of outline coordinates defining visible area, (c) a center point coordinate representing the focal point of the view, and (d) a rotation angle to orient the view correctly.

In one example, where the GIS data of the hole is provided within a different coordinate system than is utilized by the client-side course visualization or interaction operations, the camera perspective calculation system 39 may be configured to transform, e.g., using the transformation unit 36, the perspective coordinates into the coordinate system utilized by the client-side operations to ensure consistency with other course data and enable accurate client-side rendering. In another example, the rendering engine 90 may be configured to transform the perspective coordinates.

Figure 8B:
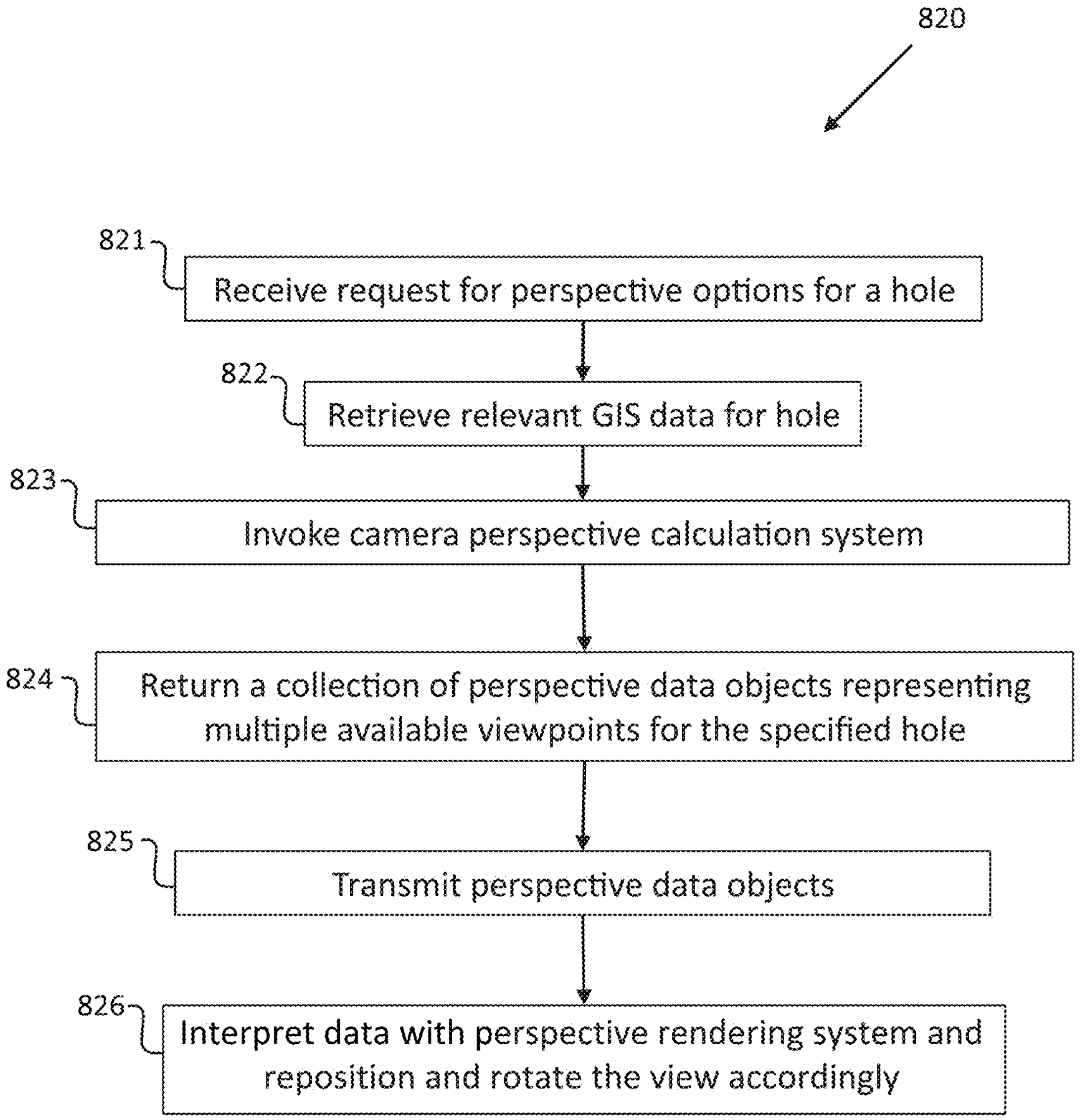
FIG. 8B illustrates a method of utilizing a visualization system to generate perspective views according to various embodiments described herein.

FIG. 8B illustrates a method 820 of utilizing the visualization system 30 to generate perspective views utilizing the camera perspective calculation system. 39. Method 820 includes receiving a request for perspective options for a hole 821. Method 820 may further include retrieving relevant GIS data for the requested hole 822. Method 820 may further include invoking the camera perspective calculation system 823. As described above, the above steps may be executed by a perspective controller 38. In one embodiment, invoking the camera perspective calculation system 38 causes the camera perspective calculation system 38 to perform method 810 described above with respect to FIG. 8A. Method 820 may further include returning a collection of perspective data objects representing multiple available viewpoints for the specified hole 824. Method 820 may further include interpretation of the data by a perspective rendering system that repositions and rotates the view accordingly.

Course visualizations generated from GIS data may be displayed in user interfaces 80 to provide visual aspects for user interaction. For example, user interfaces 80 may provide an interactive platform from which users may interact with the operations of golf tournament management system 10. Users may interact with course visualizations to access the operations of the course setup module 20. For example, course visualizations may be displayed for interaction with respect to the course variables specification unit 22 to define course variables. As noted above course variables may be defined by selecting, entering, plotting, or otherwise indicating course variables, which may include accepting course variables presented by the course variables specification unit 22 within the user interface 80. User interfaces 80 may display course visualizations in a user interactive environment in association with the operations of the course setup module 20.

Figure 9A:
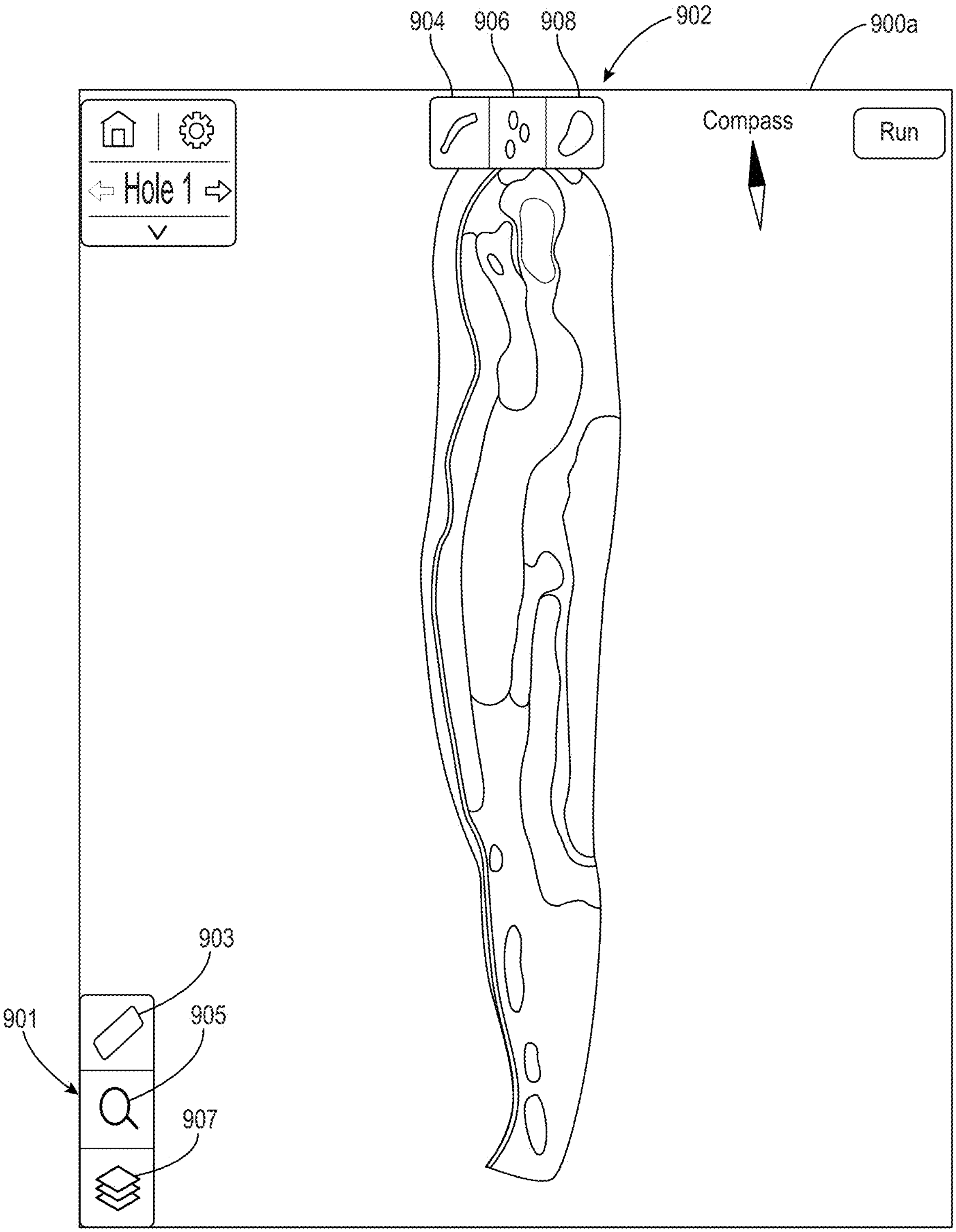
FIG. 9A illustrates a user interface comprising course visualization including a hole view generated by a rendering engine for display in a user interface provided on a user device according to various embodiments described herein.
Figure 9B:
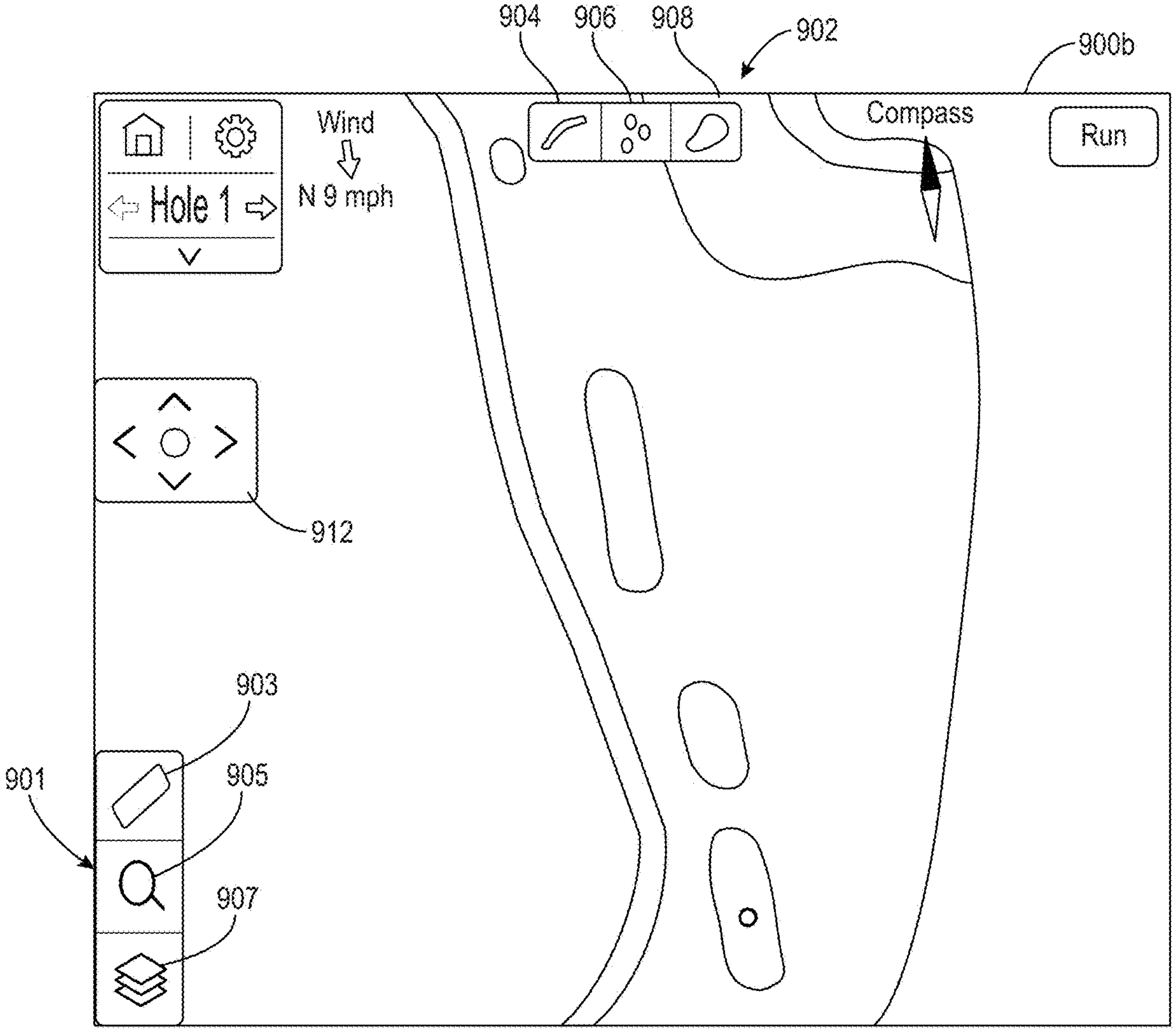
FIG. 9B illustrates a user interface comprising course visualization including a tee box perspective view according to various embodiments described herein.
Figure 9C:
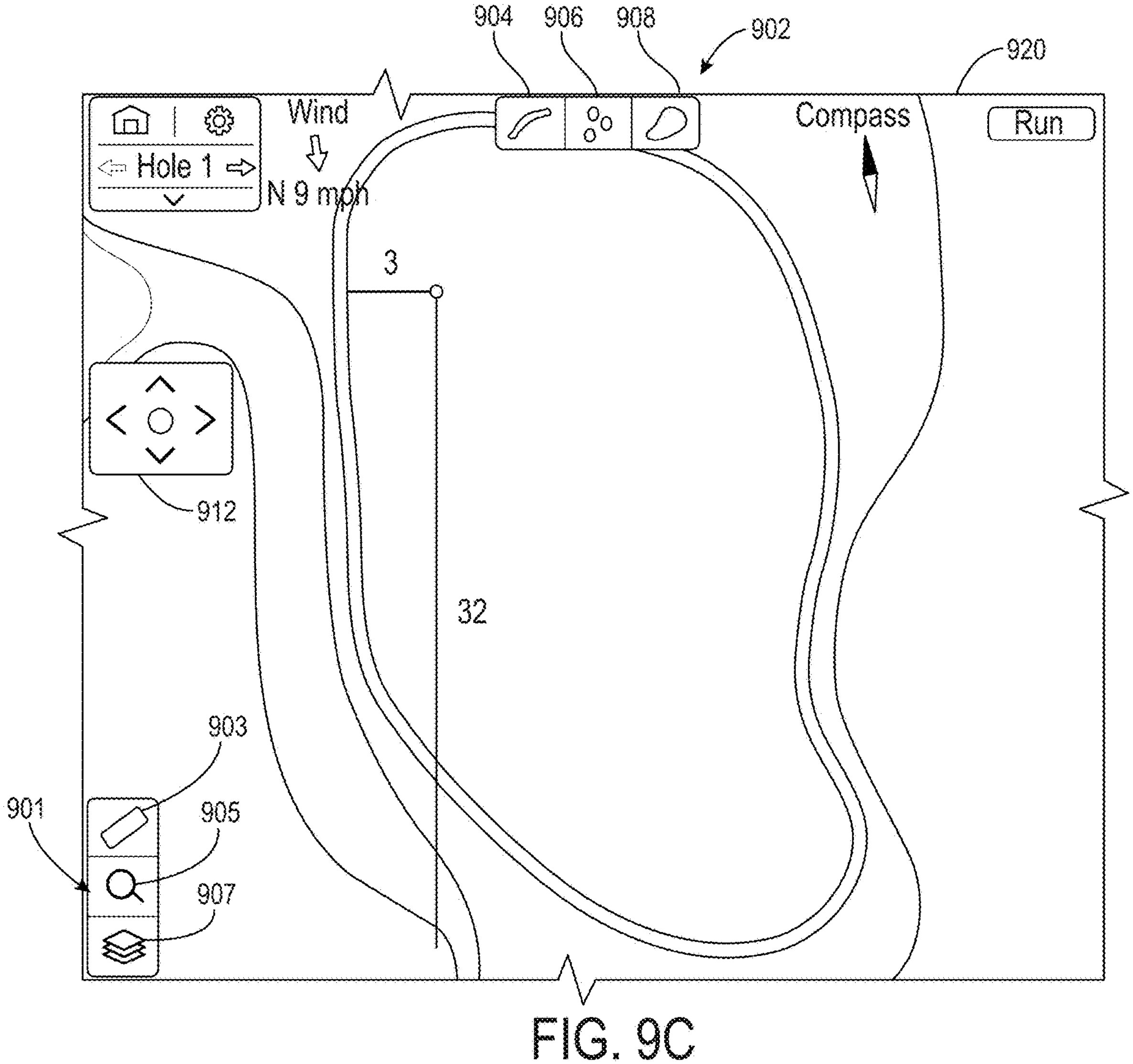
FIG. 9C illustrates a user interface comprising course visualization including a green perspective view according to various embodiments described herein.

An example user interface **900*a* comprising an interactive course visualization according to one embodiment is illustrated in FIG. 9A. The course visualization comprises a hole view of a first hole of a course. The user interface 80 includes a perspective panel 902 including a plurality of perspective views selectable by a user via interaction with the user interface 900*a*. The perspective panel 902 includes a selectable hole view 904, which is the currently displayed view, depicting the full hole, including the hole zones, such as tee boxes, fairway, rough, bunkers, water hazard, cart path, and green. The perspective panel 902 also includes a selectable tee box perspective view 906. An example user interface 900*b* depicting a tee box perspective view is shown in FIG. 9B. In this view, the tee box zone is displayed and includes additional zones, such as portions of the rough, water hazard, and cart path. The perspective panel 802 also includes a selectable green perspective view 908. An example user interface 900***c* depicting a green perspective view 920 is provided in FIG. 9C. The user interface 80 also includes a tool panel 901 including selectable interactive tools for interactive analysis of the course visualization. In the depicted tool panel 901, a measurement tool 903 is provided to allow a user to select points in the display that prompt the golf tournament management system 10 to calculate and return a measured distance between the points. FIG. 9C illustrates use of the measurement tool 903 to measure location of a pin placement relative the front of the green and the closest edge of the green at a 90-degree angle from a line that runs parallel to a line extending from the front of the green to the back of the green. A selectable magnification tool 905 is also provided that allows the user to zoom into and out of the displayed visualization or the hole. In one example, selection of the magnification tool also causes display of a view rasterization tool 912 (see, e.g., FIGS. 9B & 9C) that enables a user to directionally adjust the center point of the current view. Use of the magnification tool results in dynamic calculation and adjustment of representative dimensions to achieve proper scaling during magnification and center point maneuvering at any magnification level. operations. The tool panel 901 also includes a layer selection tool 907. Interaction with the layer selection tool 907 enables the user to select special visualization layers, such as those described herein. For example, interaction with the layer selection tool 907 may reveal available special visualization layers. The user interface 80 may also be configured to enable allow the user to toggle through displays rendering selected special visualization layers.

While the perspective views provided in the drawings depict overhead views, in some embodiments different or additional perspective views may be provided such as perspectives other than overhead, like player view, fan view, 45 degree to terrain view, or other discrete or range of degree view, which may include from multiple directions or from a dynamically maneuverable perspective that enables a user to fly around the hole. As noted above, visualizations may be provided in various formats, which may include renderings, hybrid photo and image renderings, such as photo simulations, animations, virtual reality, mixed reality, augmented reality, as examples. The visualization formats may be 3D, 2.5D, 2D, or hybrid. In one example, visualization formats may include full 3D model visualizations. In a further example, the visualization formats may be non-immersive, semi-immersive, or fully immersive.

As introduced above, the visualization system 30 may be configured to enable toggling of various visualization layers. The visualization system 30 may include layer management features providing user controllable layer incorporation. For example, layers may be used to present various representations of data, such as heatmaps, slope or contour views, course setup simulations or simulation results, historical setup views, course technical data views (historical, proposed, or current), or course tracking system component placement views (historical, proposed, or current). In some embodiments, the visualization system 30 enables dynamic specialized visualization layers that layer dynamic data such as player tracking, ball tracking, or both over the course visualization. The dynamic data may be with respect to a past or current course setup. For example, the visualization system 30 may be configured to display a current course setup as described herein. Live, on course player, ball, or other object tracking data including coordinates thereof, which may be translated to the display coordinate system if needed, may be transmitted to the user device 8 for integration in the course visualization as a dynamic visualization layer. The tracking data may be captured by a tracking sensor network, which may include tracking sensors comprising camera devices, radar devices, laser devices, or tracking sensors worn by players or other personnel configured to track locations of objects relative to a coordinate map of the course. Thus, the user interface 80 may enable users to view a current course setup and follow player locations, ball locations, or both. As described in more detail below, such live tracking may also include visualizations of fields of view of tracking system sensors. Users may view the field of view visualizations to determine if fields of view should be adjusted to better capture tracking data, such as by pan control, tilt control, or zoom control, e.g., adjustment of focus or depth of field. In a further embodiment, the user interface 80 provides field of view manipulation controls that allows a user to remotely address or otherwise access tracking sensor control devices in order to manipulate positions, fields of view, or related automated or semi-automated tracking programing of tracking sensors. In one example, the tracking sensor control devices include gearing, robotics, focus adjustment apparatuses, or other machinery or software solutions. In a further example, the tracking sensor control devices include mechanized pan and tilt heads on which tracking sensors are mounted that include a motor configured to drive pan and tilt movements and a control system addressable by the competition management system, such as a user device 8 executing operations of the system, to manipulate the field of view of mounted tracking sensors.

As introduced above, the course setup module 20 may be configured to enable a user to define course variables for the course of play, such as setup variables, environmental variables, or both, and view the setup variables in the course visualization, simulate impact of the course variables on player performance, or combination thereof. In some such embodiments, the course setup module 20 is further configured to enable a user to define performance variables with respect to the skill level of competitors for application to simulation of play including the course variables.

Figure 10:
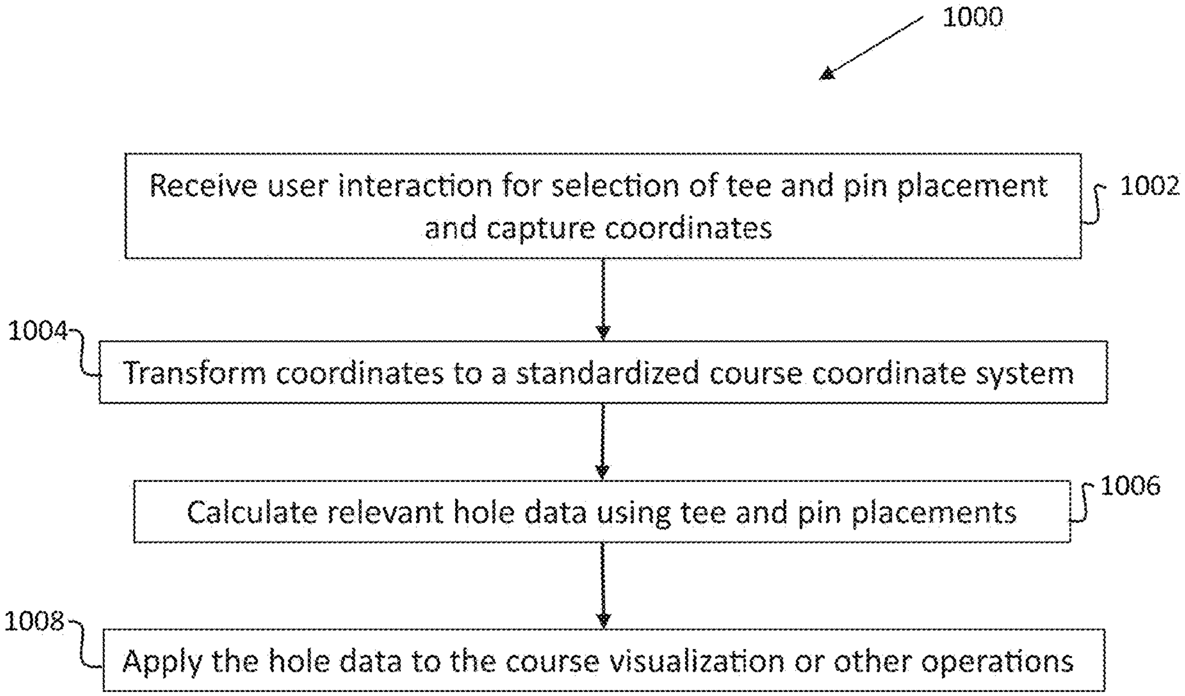
FIG. 10 illustrates a tee/pin placement method according to various embodiments described herein.

As introduced above, e.g., with respect to FIG. 2, the course setup module 20 may include a course variable specification unit 22 configured to manage course variables. In various embodiments, the course variable specification unit 22 includes a tee/pin placement tool 24 that allows a user to interactively place and adjust tee and pin locations. The course visualization may include an interface for tee and pin placement incorporating visual indicators, such as nudge indicators and distance lines. For example, tee/pin placement tool 24 may be configured to support interactive positioning and adjustment of the locations of tee boxes and pin positions on the golf course within course views. The tee/pin placement tool 24 may be configured to operate on a coordinate-based framework, e.g., utilizing the course GIS data or other map data, to ensure accurate placement within the course topography. Relevant data from the placements may be calculated and provided to the simulation engine 29 for running a simulation using the data calculated from the placements. With further reference to FIG. 10, the tee/pin placement tool 24 may be configured to execute a tee/pin placement methodology 1000. User interaction with respect to a course visualization may be received for selection of a tee or pin placement and the coordinates of the placement may be captured 1002. For instance, a user may interact with a course visualization to specify a location of a pin or tee. In one example, a user may click or otherwise indicate a pin or tee position within the respective green or tee box zone, which may be indicated with respect to the hole in the course visualization. The selection may be captured by the tee/pin placement tool 24. The tee/pin placement methodology 1000 may include transforming the coordinates in the course visualization to a course coordinate system, such as a standardized course coordinate system 1004 to ensure accurate placement relative to the topography of the course. In one example, the coordinates are captured in the application internal coordinate system. In a further example, the tee/pin placement tool 24 is configured to transform, e.g., using the transformation unit 36, the coordinates to the standardized course coordinates. The tee/pin placement tool 24 may process the coordinates for additional analysis of the placement. In one example, tee/pin placement tool 24 may employ a pin paces calculation algorithm that analyzes the geometry and features of the green to determine the position of the pin relative to the edges of the green. This may be expressed in paces from the front, back, and sides of the green, for example. The calculation may consider the shape of the green, which may be irregular, and applies the coordinate system of the course to measure distances accurately. This information may be output to users (e.g., see FIG. 11B), used in subsequent processes, or both. For tee placements, the course setup module 20 may be configured to verify that a selected location falls within designated teeing areas. Similar verification may be performed with respect to hole placements. In one embodiment, the tee/pin placement methodology 1000 may further include calculating relevant hole data using tee and pin placements 1006 and applying the hole data to the course visualization or other operations 1008. In one example, this may include dynamically updating placements of tee and pin in the course visualization, which may include utilization of the visualization system 30, allowing users to visualize the impact of the placements on the layout and playing characteristics of the hole. The update may be with respect to a base view, e.g., FIGS. 11B & 11C. In further embodiments, the update may include updated placements within specialized views, e.g., FIGS. 6B-6G. In the above or another example, calculating relevant hole data using tee and pin placements may include generating, either initial simulations or updated simulations, of player performance to reflect the placement. Data may be derived from tee and pin placements, such as hole length and expected shot distances. These and other data may impact hole strategies with respect to target landing locations, potential shot obstructions, and the like. Accordingly, tee and pin coordinates or data derived therefrom are used by the simulation engine 29 to run simulations. Therefore, relevant data may be updated and applied to simulations to update player performance predictions. Changes to displayed or displayable data impacted by the placement may also be updated in the course visualization or otherwise, e.g., a display of hole length, expected shot distances, or both may be updated if impacted.

As introduced above, the course setup module 20 may include a course variable specification unit 22 is configured to enable a user to define conditions of play such as course conditions, environmental conditions, or both, that impact player performance and course difficulty. The course variable specification unit 22 may be configured to interface with users to manage course variables, such as those specified by users via interaction with the user interface 80 provided by the golf tournament management system 10 and rendered on the user device 8. The user interface 80 may include graphics providing visualizations of the course and other aspects of play, tournament, or information related thereto. The user interface 80 may include elements such as hard buttons, soft buttons, sliders, dropdown lists, toggles, sliders, text fields, or other interactive features, such as those described herein, configured to present course variables and receive user interactions, e.g., course variable specifications for visualization or evaluation and analysis.

FIG. 11A illustrates a user interface 1100*a* comprising a course variable specification interface 1102 or a course variable specification unit 22 overlaying a hole view. The course variables available for specification in the illustrated course variable specification interface 1102 include various elements for inputting values for course condition variables. An input for specification of overall field strength, which also includes a modifier with respect to post-cut or pre-cut in this example to signify whether the field strength applies to a full field for pre-cut or post-cut rounds. The course variable interface 1102 also includes inputs for specification of course conditions such as green speed (measured in stimp), course firmness, and rough height. The available input values for field, firmness, and wind direction are provided in dropdown lists, while that for cut is provided in a selection box and those for wind speed, green speed, and rough height are provided in sliders within available ranges of values. The variables may be represented by a specific data type and range of values in the system. For example, green speed is typically measured on a scale of 7 to 14 stimp, while firmness is represented as a categorical value (soft, medium, firm). The rough height is measured in inches, allowing for precise adjustments. When a user modifies these variables, the course variables specification unit 22 causes the changes to be reflected in a course data model applied by the simulation engine 29 for simulations. Accordingly, when simulations are run, the results of the simulations take these variables into account. The simulation engine 29 may use the specified values to adjust various aspects of the simulations. For instance, changes in green speed affect the ball roll calculations in the putting and approach shot simulations, while changes in course firmness impact bounce and roll distances. Rough height adjustments increase the dispersion of shots out of the rough. In one example, field strength acts as a global modifier, affecting dispersion of shots for all players from all distances and launch zones. The course variable specification interface 1102 also includes course variables comprising environmental variables that impact play. The environmental variables comprise weather components include specifications for setting wind speed and direction, which further impact shot trajectories and distances. The depicted hole view also includes a run simulation interface 1104 that a user may select to initiate the simulation engine 29 to run a simulation based on the input variables. In some embodiments, some course variables may be initially set at baseline or typical value, location, or level such that simulations may be run when a user has not specified all available course variables. In one configuration, course variables may be initially set to correspond to course variables present at a previous tournament. In this or another example, one or more course variables may be preset or set by the user as a null value and the impact of the course variable is ignored in simulations when the null value is present. In some embodiments, the course variables specification unit 22 may be configured to access a course weather forecast corresponding to the course and a date or date range. The forecast weather may be provided as a default, a suggestion, or as an option for selection.

FIG. 11B illustrates a user interface 1100*b* providing a course visualization comprising an example green view 1110 depicting a pin placement operation. Utilizing the tee/pin placement tool 24, the user may interact with the green within the course visualization green view and indicate the desired pin location 1112 on the green. In the illustrated example, the green view may employ a pin paces calculation algorithm as described above to determine the pin position relative to edges of the green. However, in other embodiments, a pin paces calculation algorithm is not used. Distance lines are shown with measured lengths also numerically depicted next to the corresponding lines. The green view also includes a run simulation interface 1104 that a user may select to initiate the simulation engine 29 to run a simulation based on the pin placement set using the tee/pin placement tool 24 and other course variables specified using the course variable specification unit 22. A summary dialog 1116 for viewing simulation results like scoring averages, driving distances, and penalties based on the hole setup is displayed in a corner of the view. As shown, an average simulation score for the hole is shown along with high and low simulation averages for the hole setup. The summary dialog includes a dropdown interface to view additional simulation results.

Figure 11C:
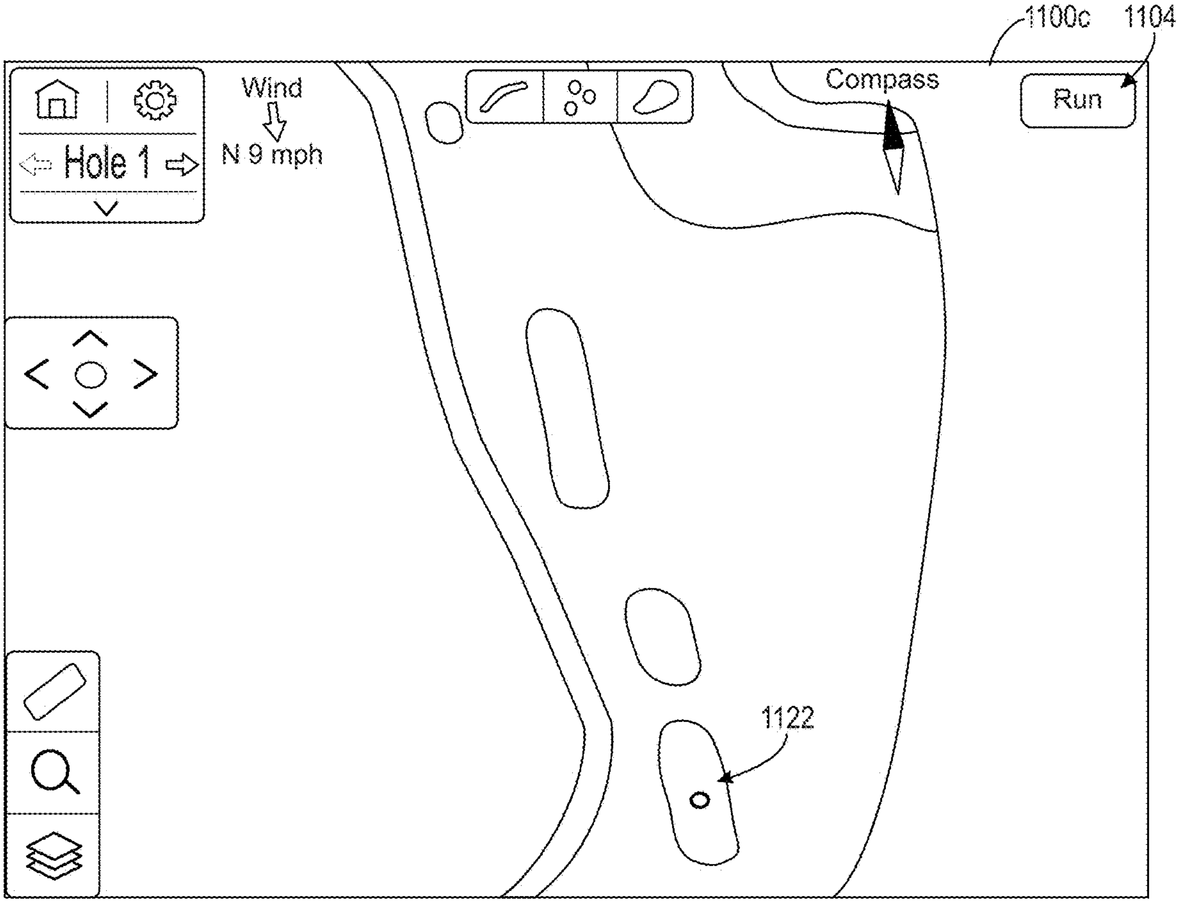
FIG. 11C illustrates a user interface comprising course visualization including an example tee box view depicting a tee placement operation according to various embodiments described herein.

FIG. 11C illustrates a user interface 1100*c* provides a course visualization comprising an example tee box view depicting a tee placement operation. Utilizing the tee/pin placement tool 24, the user may interact with the tee box within the course visualization tee box view and specify the tee location 1122 within the tee box zone. For example, the user may click the desired tee location or drag a tee icon to the desired location. The illustrated tee box view also includes a run simulation interface 1104 that a user may select to initiate the simulation engine 29 to run a simulation based on the tee placement set using the tee/pin placement tool 24 and other course variables specified using the course variable specification unit 22.

With reference again to FIG. 2, the course setup module 20 may include a simulation engine 29 configured to run simulations of play in the presences of specified course variables to analyze how particular course variables may impact player performance. For instance, the course setup module 20 may provide an interactive simulation engine 29 configured to simulate player performance to predict player performance outcomes like scoring averages, driving distances, and penalties based on a specified course setup. The simulation engine 29 may include a system designed to predict and analyze how golfers, generally professional golfers, would perform under various course conditions and setups. Simulations may be performed according to any suitable methodology. Simulations may typically be executed by server-side processes to preserve resources by allocation of the simulation service burden. However, in one embodiment, all or a portion of simulations may be executed by client-side processes.

The simulation engine 29 may be configured to run simulations that predict impact of user defined course variables on player performance. Impacts may include predicted outcomes such as one or more of scoring averages, driving distances, or penalties when the course is played in the presence of the course variables defined by the users. Course variables may include course condition variables such as but not limited to pin placement, tee placement, rough height, rough density, fairway height, fairway firmness, green speed, green slope, green elevation, among others. Course variables may include environmental conditions such as but not limited to wind direction, wind speed, humidity, forecasted precipitation, among others. For simulation purposes, course variables may also include player skill level, such as field type, e.g., alternate field, full field, cut, signature events, or other player level differentiator, such as tour level.

Based on the course variables specified by the user and ingested course data, the simulation engine 29 may provide various levels of player performance data points. For example, the simulation engine 29 may provide projected hole-level and course-level data points, which may include but not limited to scoring average, segmented scoring (e.g., birdies, par, bogeys), rough penalty, miss fairway penalty, as well as statistics such as average driving distance, fairways hit, greens in regulation, among others. Where appropriate, this player performance data may be further generated at a sub-hole level (e.g., specific zones for each hole). Also where appropriate, the simulation engine 29 may provide the visualization system 30 with data points with respect to various shot from/to locations to various zones or areas of the hole. The visualization system 30 may convert these data points, e.g., coordinates, to ball plots for course visualization application at the corresponding hole coordinates within the course visualization operations. In one example, ball plots or other data point representations may be incorporated into specialized visualization layers that may be layered over a zone base layer.

In various embodiments, the simulation engine 29 is configured to utilize a shot simulation process that models each shot from tee to green. This process may include an optimum target analysis for each tee shot. The optimal target analysis may calculate the ideal landing spot based on the hole layout, current simulated lie of the ball, and the target for the next shot, be it the green or the next landing area. The ideal landing spot calculation may include consideration of historical shot locations or targets from the current simulated location of the ball on the hole in the same or similar level of play that is being simulated. For example, the GIS data or data associated therewith may include historical shot data for the hole in previous tournaments. Such data may also include shot strategies for holes, which may be used to further inform calculation of ideal landing spot. In some embodiments, if historical play data is not available for the hole, historical play data may be used from holes having similar layouts. In some embodiments, historical analysis of historical data is performed using data other than the GIS data. For example, historical play data from the historical play data base, such as historical play data collected by golf tracking systems, e.g., ShotLink, owned and operated by PGA TOUR. The current simulated lie of the ball for the shot may be further considered with respect to location and distance in the calculation of an ideal land spot.

Using the ideal landing spot for the next shot, the simulation engine 29 is configured to simulate the next shot and then repeats the process until the ball is on the green. The simulation engine 29 may calculate or obtain a dispersion coefficient for use in the simulations. The dispersion coefficient may be applied to each shot calculation to determine how much a shot might deviate from its intended target. Dispersion coefficients may be calculated utilizing analysis of historical shot data from players having similar skill level as those being simulated. This calculation may consider factors such as distance to the pin and the launch zone. The launch zone consideration may include the type of surface the ball is being hit from, such as fairway, rough, tee, or bunker. In a further embodiment, the launch zone consideration considers course variables such as the course condition variables, e.g., rough height, rough density, ground firmness, or the like. The simulation may further account for different shot types, including drives, approach shots, and recovery shots. Each hole may be simulated multiple times to generate statistically significant results. For example, each hole may be simulated hundreds of times, e.g., 600 times or more.

Figure 12:
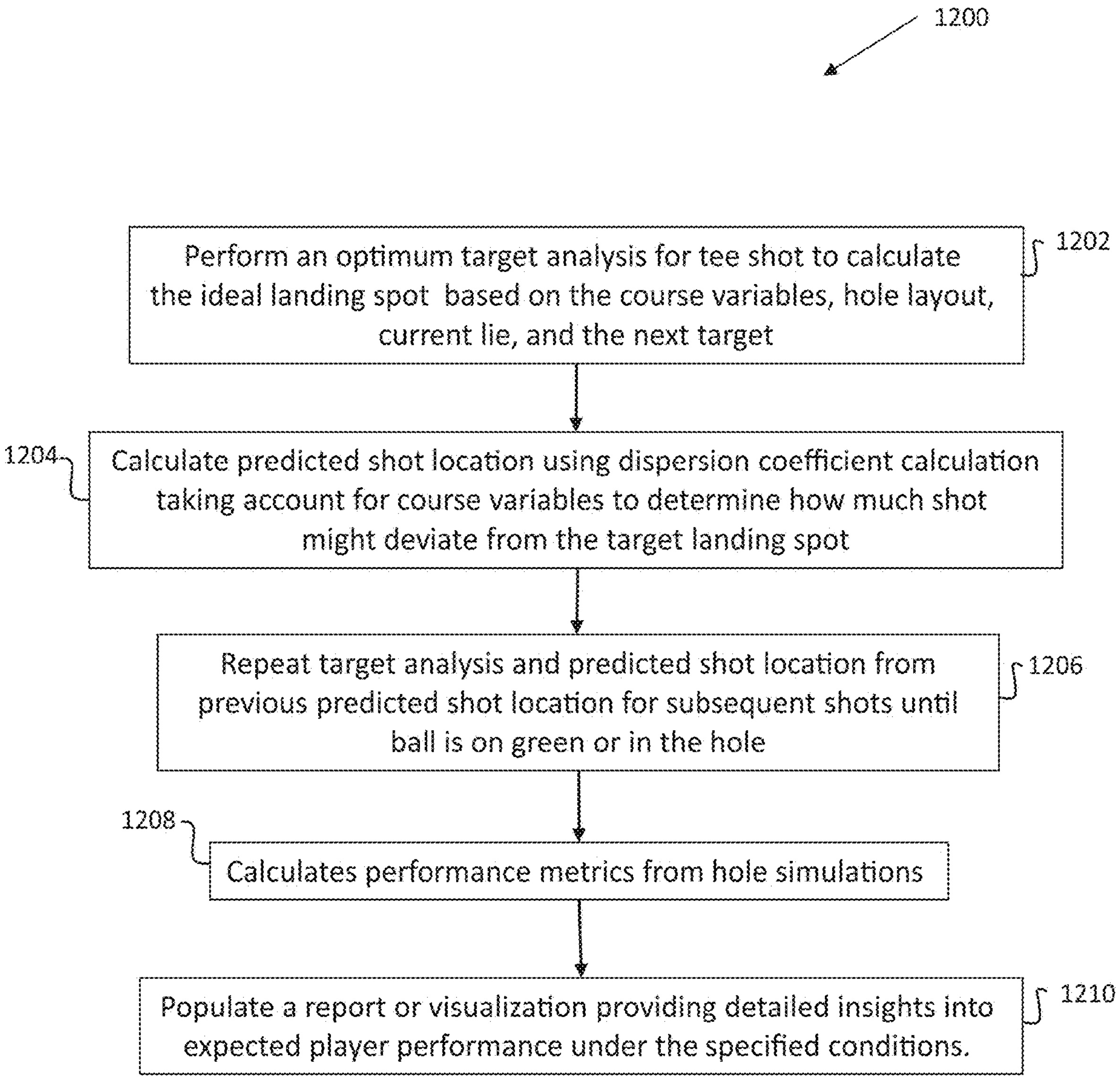
FIG. 12 illustrates a method of predicting and analyzing how golfers would perform under various course variables according to various embodiments described herein.

After each hole simulation, the simulation engine 29 may calculate various player performance metrics, such as score, driving distance, fairways hit, greens in regulation, strokes gained, as examples, in different aspects of the game. FIG. 12 illustrates a method 1200 of predicting and analyzing how golfers would perform under various course conditions and setups. Method 1200 may include performing an optimum target analysis for tee shots to calculate the ideal landing spot based on the course variables, hole layout, current lie, and the next target 1202. Course variables may include those described herein. Optimum target analysis may consider hole strategies and historical data as described herein. Method 1200 may include calculating predicted shot location using a dispersion coefficient calculation considering course variables to determine how much shot might deviate from the target landing spot 1204. Dispersion coefficients may be calculated as described herein. Method 1200 may include repeating target analysis and calculation of predicted shot location from the previous predicted shot location for subsequent shots until ball is on green or in the hole 1206. The target analysis considers course variables such as those relevant to the predict shot location and target landing area, such as shot distance and conditions of shot location. Conditions of the landing area may also be considered. For example, the type of surface, zone conditions, topography, and the like. The simulation may include simulation modeling and run within a 3D model as described herein. Thus, the simulation may be calculated within the 3D environment of the course including obstructions, topography, and surface characteristics. In some embodiments, putts may be simulated in method 1200. In other embodiments, a putt average calculation may be employed. In one example, a putt average calculation is employed based on the predicted distance the ball is from the hole. used. Method 1200 may include calculating performance metrics from hole simulations 1208. Method 1200 may include populating a report or visualization, such as a course visualization, providing detailed insights into expected player performance under the specified conditions 1210. In one embodiment, the course visualization may be dynamically updated with updated predicted performance metrics based on the simulation incorporating the course variables. For example, an interface update tool may be configured to receive predicted performance metrics and update the user interface, which may include graphically, such as in a summary panel or other field that is displayed or displayable within the user interface. For example, the interface update tool may update the user interface as described below with respect to FIGS. 11A-11C or elsewhere herein.

In one embodiment, dispersion coefficients are calculated by grouping historical data, from each launch zone and distance interval, which may further include other conditions impacting the shots, such as rough height and wind interval. For each shot the proximity from a target, such as a pin for a chip shot, may be calculated and then the results may be aggregated or averaged to identify which dispersion coefficient would result in that outcome, fitting the historical data. In a further or another example, the dispersion coefficient calculation can be determined, at least in part, via a lookup table created prior to the historical analysis that maps proximity from a target to a coefficient. This lookup table may be created using various known methodologies. In one example, the lookup table is created by running simulations for every dispersion coefficient, such as 1 through 10, at a 0.1 interval, and analyzing the proximity results to create the mappings.

In various embodiments, dispersion coefficients relate to where the ball lands. For example, a dispersion coefficient of 5 might result in a shotgun spread of shots with an average proximity to the pin of 10 feet. But a coefficient of 10 might result in an average proximity of 20 feet. In one example, application of dispersion coefficients may be used to determine landing spread. Thereafter bounce and roll physics may be used together with one or more present variables such as environmental variables, terrain, e.g., surface properties of impacted surfaces, or other present conditions.

In one example, launch parameters of a shot, such as speed, launch angle, spin, may be determined by using a lookup table. The lookup table may be calculated by grouping historical data and analyzing these components of the historical data to determine the average launch parameters for a given distance and zone. Wind speed and direction may be applied as variables that go into the simulation of the shots, such that if a player is hitting into the wind, the launch speed parameter would be adjusted accordingly.

A launch zone of a shot, such as fairway, rough, bunker, may affect the dispersion coefficient. Player characteristics, such as skill level, may similarly affect dispersion coefficient. Thus, in some embodiments, dispersion coefficients may be adjusted as needed depending on launch zone conditions, such as rough height, or player field type/level, e.g., alternate field, full field, cut, signature events, or other player skill level differentiator. In such an example, when a user changes course variables such as rough height or player field type/level, the simulation is affected as well as player performance results, such as final score projections and statistics.

In one embodiment, dispersion coefficients may be constant for all distances. However, in other embodiments, historical analysis may support dispersion coefficients for shots from some launch zones, e.g., tee shots, may comprise different or modified coefficients based upon the distance to the pin, such that the coefficients better match historical data.

The simulation engine 29 may run simulations within a 3D model. In one example, the 3D model comprises a DSM. The 3D model may include obstructions, such as trees. For example, if a tee shot is simulated to hit into trees, the impacted surfaces of the tree, which may include surface properties thereof may be considered it determination of the subsequent travel of the ball, such as the ball impacting the tree and falling to the ground and any subsequent bounce or roll behavior to a final resting position. In various embodiments, simulations utilize the course GIS data loaded in the memory 33. For example, simulations may include surface DTM, the obstruction point cloud, and the zone outlines/information for course holes present in the GIS data.

In some embodiments, putts are treated similar to other shots. For example, a current simulated location on the green is considered and putting data from the position relative to the hole may be used to determine subsequent putts to hole the ball. In one configuration, green elevation and slope features between a ball location and the pin are used as variables or in a dispersion coefficient calculation. For example, magnitude, variation, differential, or degree of elevation, slope, or other green characteristics present between the ball and the pin may be used as variables based on analysis of the impact of the same on shot dispersion of similarly skilled players. In another embodiment, a number of putts based on putting average of similarly skilled players is used. In a further example, the number of putts is based on a putting average distribution and a random number generator is used to select the number of putts for each hole from the putting average distribution. In another example, any of the above is applied relative to the location of the ball on the green, e.g., after the simulated approach shot and any subsequent putts. In one embodiment, strokes gained baselines from historical play are used once a ball is simulated to come to rest on the green.

In various embodiments, simulation engine 29 is configured to operate in a reverse manner than that described above such that the user may define desired player performance, e.g., with respect to desired results for scoring, scoring related data, statistical data, or the like, and the simulation engine 29 may use the desired player performance to output one or more combinations of course variables projecting to achieve the desired player performance. In one implementation, a user may specify one or more course variables and query the simulation engine 29 for one or more remaining course variables projected to result in a desired player performance outcome. For instance, a user may specify course condition variables such as rough density, stimp, and firmness, tee placement, environmental variables, player skill level, and a desired player performance outcome, and request the simulation engine 29 output a rough height and pin placement projected to result in the desired player performance. In some embodiments, this reverse operation may be available at multiple levels, such as a per hole level, user defined hole grouping level, course level, or tournament level. In one example, a user may specify a desired pin placement and player performance, and, using the simulation engine 29, the golf tournament management system 10 may return one or more tee placements and other course variable values projected to achieve the desired player performance. In these or other configurations, the user may specify or the simulation engine 29 may output values for environmental variables in the reverse operations. In one embodiment, a user may specify course variables and request an output of values of one or more particular course variables predicted to achieve a specified player performance. In one configuration the simulation engine only operates in the reverse manner.

In various embodiments, the simulations may be dynamically run such that impact of specified course variables on player performance is generated and displayed or available for display contemporaneously or nearly contemporaneous, e.g., near real time. Thus, when a user moves a tee placement or pin placement, simulations results may update to account for the modified placement. In this or other embodiments, simulations are run when initiated by the user.

The simulation engine 29 may be configured to be flexible with respect to shot tracking data it may ingest. For example, the simulation engine 29 or course setup module 20 may be configured to utilize coordinate data defined within multiple coordinate spaces. For instance, coordinate data may be ingested or transformed prior to ingestion in multiple coordinate spaces. In one embodiment, the simulation engine 29 may be configured to simulate player performance, even in instances where no shot-level data specific to the course exists. For instance, the simulation engine 29 may be configured to generate relevant data point baselines from analysis of other events. Such events, for example, may include events taking place on similar courses with similar level competition.

The course setup module 20 may include tools for documenting and saving course setup configurations, which can be used for future reference and analysis. In one embodiment, the course setup module 20 includes a report generation tool that enables users to create, view, print, share, and save detailed course setup reports. For example, simulation results may be utilized to populate various reports and visualizations within the course setup module 20 to provide users with detailed insights into expected player performance under the specified setup conditions. In one implementation, the report generation tool is configured to generate single hole, 9-hole, or 18-hole reports to provide views and insights into how a particular setup will play, as well as generate reports at the event level. For instance, the reports may provide set-up profiles for each round/event to help ensure setups over the course of a season are balanced and not favoring one particular style of play.

With reference again to FIGS. 1 & 2, the golf tournament management system 10 may include a tracking system management module 40 configured to enable users to manage tracking system positions, operations, or both. The management operations may include managing field of view of tracking sensor devices such as cameras devices, radar devices, laser devices, or other tracking sensor devices used to track objects, e.g., such as players, balls, or both. In some embodiments, the tracking system sensors also track scoring. In one example, the tracking system sensors comprise tracking sensor devices or operate in a tracking system as disclosed in U.S. patent application Ser. No. 17/841,660, filed Jun. 15, 2022, U.S. patent application Ser. No. 18/238,234, filed Aug. 25, 2023, or U.S. Provisional Patent Application 63/599,557, filed Nov. 15, 2023, the contents of which are hereby incorporated by reference. The tracking system management module 40 may provide interactive visualizations of positions, field of views, or both. In some embodiments, the tracking system management system may be similarly utilized to manage other sensor devices, such as media devices, e.g., media camera positions.

Figure 13:
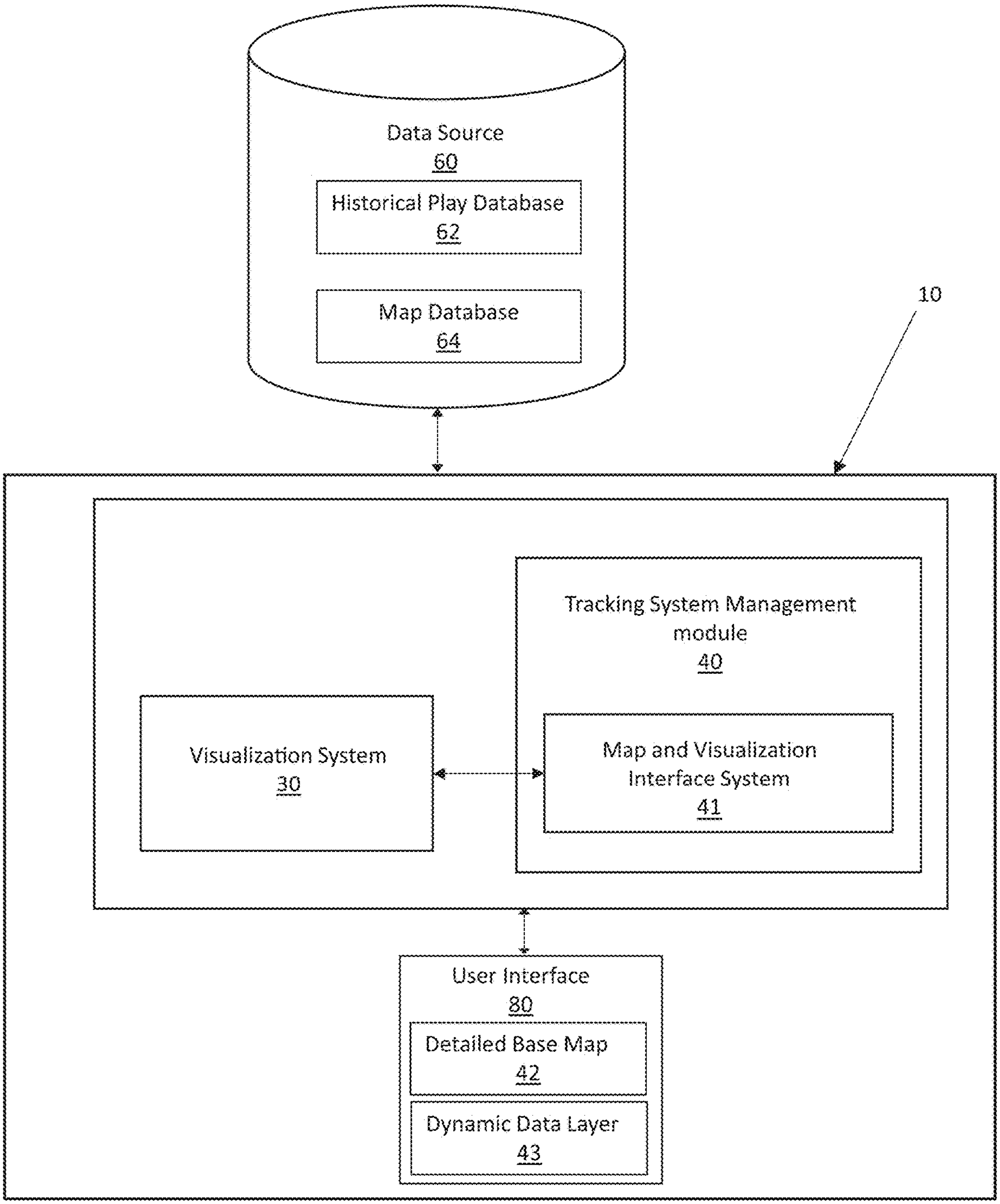
FIG. 13 illustrates components of a visualization and map interface system according to various embodiments described herein.

With further reference to FIG. 13, the tracking system management module 40 may include a map and visualization interface system 41 configured to provide location visualization, coverage, and status of tracking system sensors, such as cameras devices, radars devices, or both on a golf course map. The map and visualization interface system 41 may be configured to enable interactivity for placing and managing the tracking system sensors.

The map and visualization interface system 41 may be configured to interact with the visualization system 10 to display and interact with golf course data and provide a user interface 80 for course management and analysis. The map and visualization system 46 may leverage a mapping framework to render a highly detailed base map 42 of the golf course. For example, custom map tiles generated from high-resolution satellite imagery and course survey data may be utilized to ensure accurate and detailed representation of course features. A dynamic data layer 43 may overlay the base map 42 to display course setup information, such as information related to cameras, radars, key features, sprinklers, or fairway widths. Operations of the map and visualization interface system 41 may be interfaced with users within a user interface 80 to thereby enable users to manipulate objects on the map rendered in the user interface 80. These objects may be rendered as draggable icons. In one embodiment, as the icons are dragged or otherwise adjusted, the map and visualization interface system 41 may dynamically recalculate and visualize their coverage areas using terrain-aware algorithms.

Figure 14:
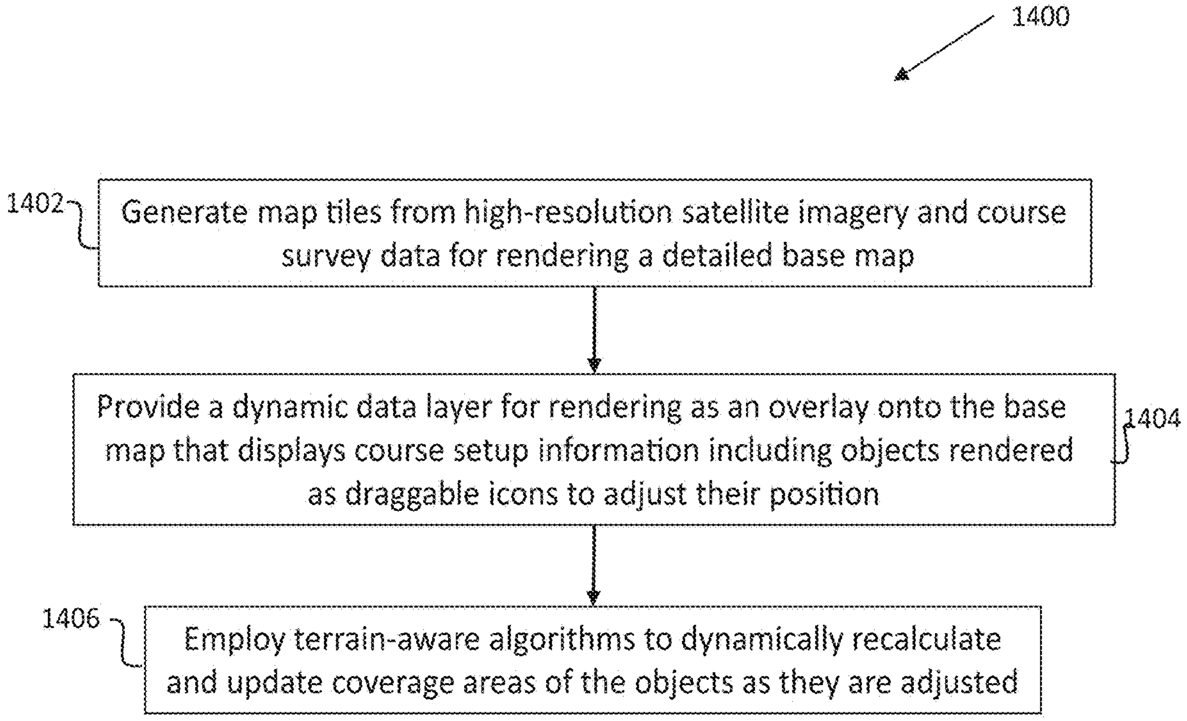
FIG. 14 illustrates a map and visualization method including dynamically recalculating and updating coverage areas for objects updated in a course visualization according to various embodiments described herein.

FIG. 14 illustrates a method 1400 of generating an interactive map including adjustable objects and dynamically recalculating and updating the coverage areas of the objects when adjusted. The method 1400 includes generate map tiles from high-resolution satellite imagery and course survey data for rendering a detailed base map 1402. The method 1400 may include providing a dynamic data layer for rendering as an overlay onto the base map that displays course setup information including objects rendered as draggable icons to adjust their position 1404. The base map, dynamic data layer, or both may incorporate data obtained from a map database 64, historical play database 62, or both. For example, map tiles and dynamic data layer may be generated using map data from a mapping data database 64. In this or another example, historical course features or setup information may be obtained from a historical play database 62. Course variable information may be obtained from the course variable specification unit 22. Course variables such as tee or pin placements may be used for evaluating coverage areas of the objects, e.g., field of view. The method 1400 may include employing terrain-aware algorithms to dynamically recalculate and update coverage areas of the objects as they are adjusted 1406. For example, the coverage areas with respect to the fields of view of the tracking or media devices may be updated for adjustments and available for evaluation. The update may be applied to visualization of coverage area with the display, e.g., a 2D or 3D depiction of the field of view. In some embodiments, the update may be applied to calculated 3D perspectives that a user may select to view a 3D graphical depiction with respect to the field of view, which may be from the perspective of the object or otherwise.

In one embodiment, the map and visualization interface system 41 may be configured for course management of sensor devices, e.g., tracking or media devices. For example, manipulation of tracking sensor positions or coverage areas may be provided for view adjustment operations driven by the map and visualization interface system 41. Field of view visualizations of sensor devices may be provided in the user interface 80 to enable users to determine if fields of view should be adjusted to better capture tracking or media data within coverage areas, such as by pan control, tilt control, or zoom control, e.g., adjustment of focus or depth of field. The map and visualization interface system 41 may include or interface with a user interface 80 that provides coverage area manipulation controls, such as field of view manipulation controls, that allows a user to remotely address or otherwise access sensor device control devices in order to manipulate coverage areas, e.g., by manipulating positions, focus, field of view, or otherwise. In one configuration, coverage area controls include access or modification of automated or semi-automated tracking programing of sensors devices. In one example, the tracking sensor control devices include gearing, robotics, focus adjustment apparatuses, or other machinery or software solutions. The map and visualization system may be configured to track manipulations of the field of view of the actual sensor devices and dynamically update the dynamic data layer to reflect the manipulations of the coverage areas. In a further example, the sensor device control devices include mechanized pan and tilt heads on which sensor devices are mounted that include a motor configured to drive pan and tilt movements and a control system addressable by the map and visualization interface 41 to manipulate the coverage areas of mounted sensors devices. Historical data from previous tracking system or media device setups with respect to the course may be integrated in the visualization operations. For example, previous tracking system setups may be displayed and include tracking sensor locations and coverage areas. In one implementation, the visualization operations provide the ability to compare past data with current setups. In some embodiments, historical data may be used to suggest optimal tracking or media device placements for current and future events to enhance decision-making. Using the visualization operations while incorporating real-time feedback, poorly places or angled tracking or media devices may be identified and corrected. In one embodiment, the map and map and visualization interface system 41 may enable tagging and metadata marking of video timestamps during live events. In one embodiment, the map and visualization interface system 41 may be configured to provide functionality to create, read, update, and delete sensor device data within the application. In one embodiment, the map and visualization interface system 41 is configured to simulate shot locations and automate tracking or media device placements based on rules and historical data, which may be beneficially applied to tracking system management for new courses.

The visualization operations of the visualization system 30 with respect to the map and visualization interface system 41 may be similarly applied to operations of the course setup module 20 for providing course visualizations of course variables other than or in addition to sensor device locations or views. For example, hole views, green views, tee box views, or views of other zones may be used to provide course layout and feature location understanding to aid in understanding impact of course variables, such as placements and course edits. In some embodiments, the course visualization may be provided with respect to a simulation wherein the simulation may be played back to a user within the dynamic data layer 43. The playback may present shot-level data including shot locations and in some embodiments ball trajectory information, such as shot traces. In one example, the user may select shots, holes, players, groups, or other portions of a simulation to view.

Figure 15:
FIG. 15 illustrate a user interface comprising course visualization including a 3D course view of a 3D course perspective system according to various embodiments described herein.

With further reference to FIG. 15, illustrating an example 3D course view 1500, the tracking system management module 40 may be configured to enable users to interact with a 3D golf course view to manage sensor device positions, such as media devices, tracking devices, or combination thereof. For example, the tracking system management module 40 may be configured to manage media or tracking device positions, such as camera device positions, radar tracking devices positions, or settings thereof while also leveraging historical data and predictive analysis to ensure optimal coverage of the course.

Figure 16:
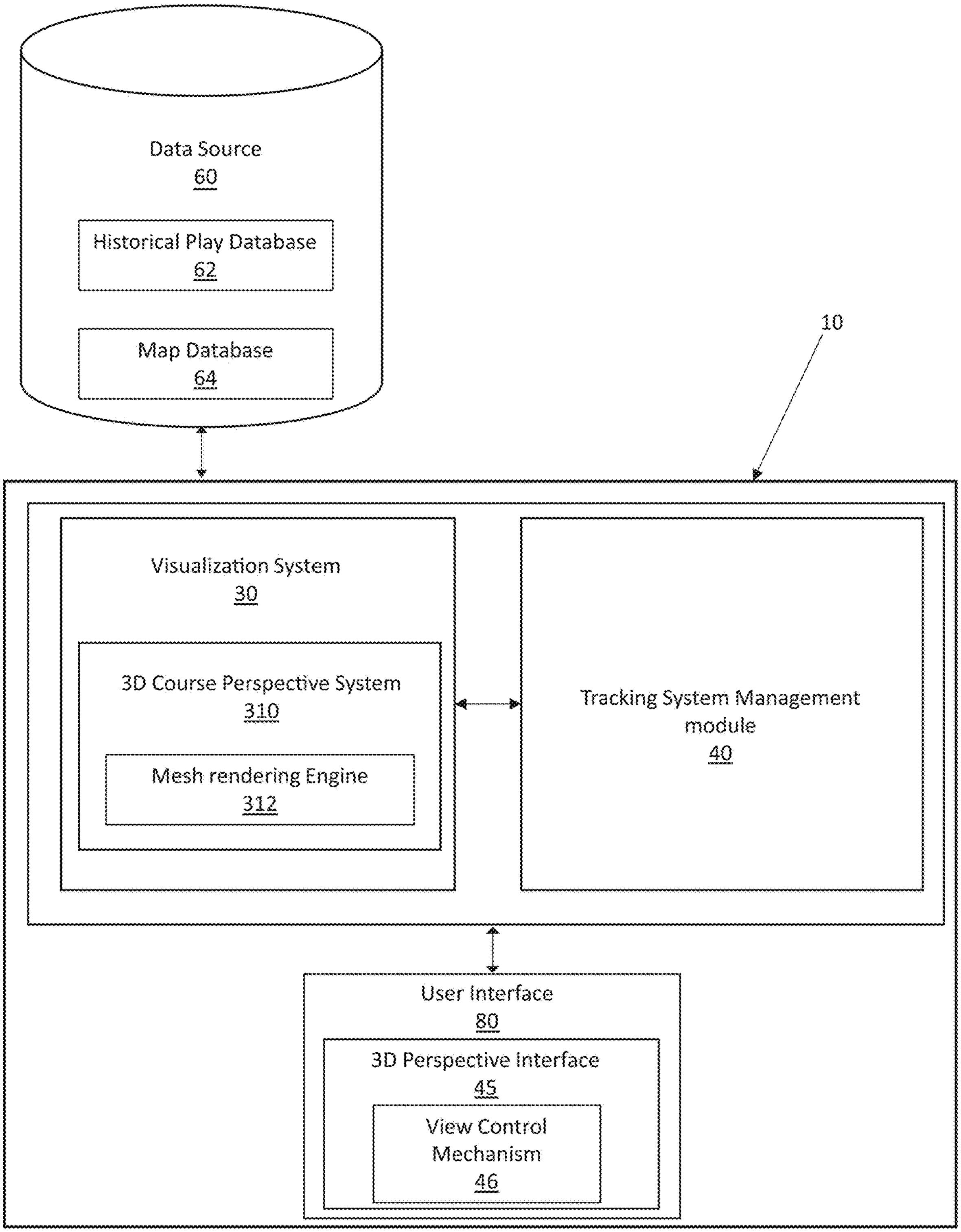
FIG. 16 illustrates components of a 3D course perspective system according to various embodiments described herein.

With further reference to FIG. 16, the tracking system management module 40 may include a 3D course perspective system 310. In some embodiments, the 3D course perspective system 310 may integrate or various visualization operations of the 3D course perspective system 310 may be provided by the visualization system 30. The 3D course perspective system 310 may be configured to enhance visualization of the course layout and player activity. Example, player activities that may be available for visualization may include current location of players along the course, a player's current pace of play, player specific shot trails, player specific shot characteristics, among others. The 3D course perspectives system 310 may include or associate with the visualization system 30 to generate and interact with 3D representations of golf courses. This 3D course perspective system 310 may be configured to convert course data, which may include one or more of topographical information, course layouts, or object placements, into a format suitable for 3D rendering. A mesh rendering engine 312 may be deployed to construct a high-fidelity terrain mesh. This mesh may serve as the base or foundation for the course representations. Onto this mesh, detail, structures or the like may be built to construct a detailed 3D depiction of the course environment. For example, map data, such as 3D models, which may include DTMs, textures, or combination may be integrated to represent course features such as trees, buildings, and other landmarks that may be mapped to create an immersive environment. Course and map data may be obtained from data sources 60 such as historical play databases 62, map databases 64, or the like. The 3D perspective course visualization may be provided to users in a user interface 80 comprising a 3D perspective interface 45 within which a user may interact with the course visualization. In one embodiment, a view control mechanism 46 in incorporated with the 3D perspective course visualization that defines movement boundaries. The movement boundaries may be employed to prevent user disorientation while intuitively navigating the 3D space. In some embodiments, a view control mechanism 46 is not provided.

Figure 17:
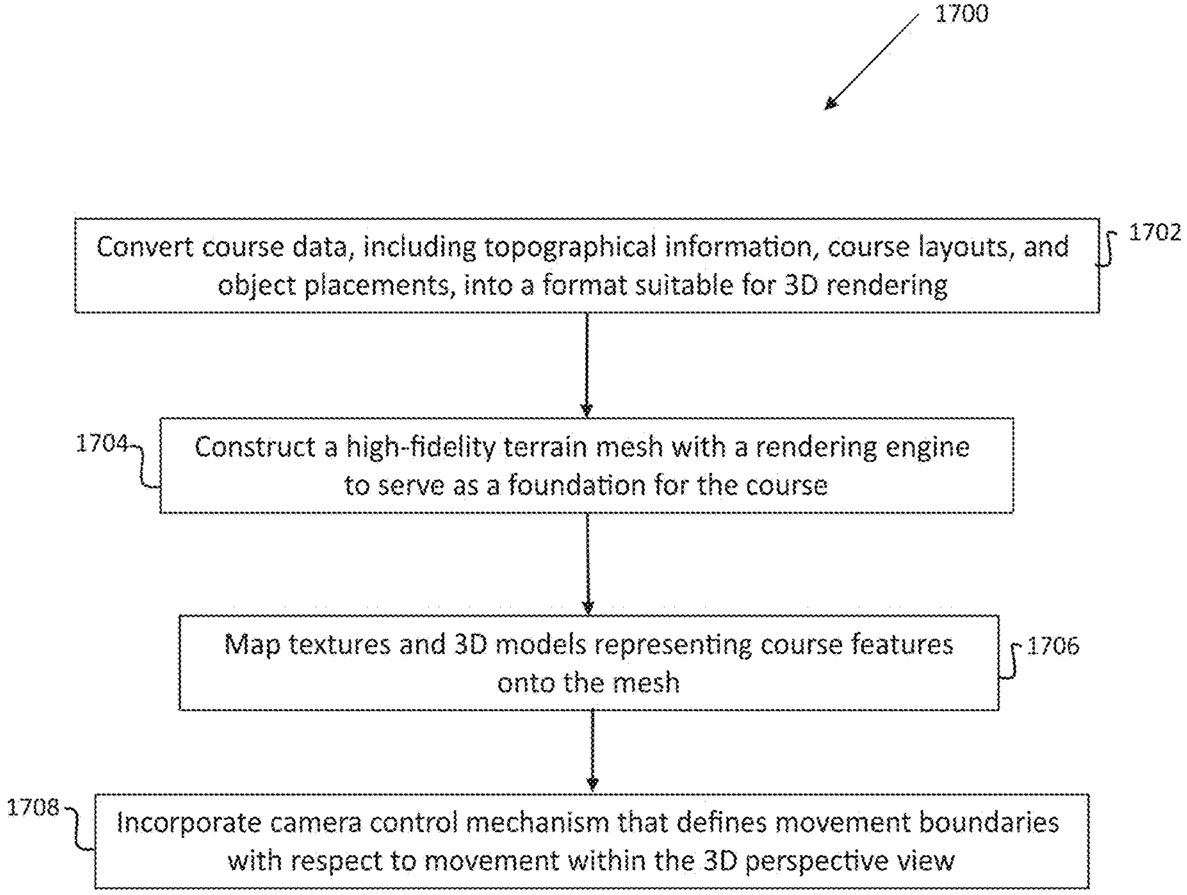
FIG. 17 illustrates a method of producing an interactive 3D course perspective according to various embodiments described herein.

FIG. 17 illustrates an example method 1700 of providing a 3D course perspective. The method 1700 includes converting course data, including topographical information, course layouts, and object placements, into a format suitable for 3D rendering 1702. The method 1700 may include, constructing a high-fidelity terrain mesh with a rendering engine to serve as a foundation for the course 1704. The method 1700 may include mapping textures and 3D models representing course features onto the mesh 1706. As noted above, the course features may include features such as trees, buildings, or other features to create an immersive environment. The method 1700 may include incorporating a camera control mechanism that defines movement boundaries with respect to navigation within the 3D perspective view 1708. The camera control mechanism allows intuitive navigation while preventing disorientation.

The visualization operations of the 3D course perspective system 310 may be similarly applied to operations of the course setup module 20 for providing 3D perspective views of a course or hole thereof to provide user 3D perspective views of course variables other than or in addition to sensor device locations or views. For example, 3D views from tee boxes or other locations of a hole may be used to provide course layout and feature location understanding to aid in understanding impact of course variables, such as placements and course edits. In some embodiments, 3D perspective views may be provided with respect to a simulation wherein the simulation may be played back to a user from one or more user selected perspectives. The playback may present shot-level data including shot locations and in some embodiments ball trajectory information, such as shot traces. In one example, the user may select shots, holes, players, groups, or other portions of a simulation to view.

In some embodiments, course data includes GIS data. In one example, the GIS data may be processed as described herein, which may include pre-processing of the GIS data into GIS data packages for subsequent access and processing by the visualization system 30 or 3D course perspective system 310 thereof for use in the visualization operations of the visualization and mapping interface system 41 or 3D course perspective system 310.

Figure 18:
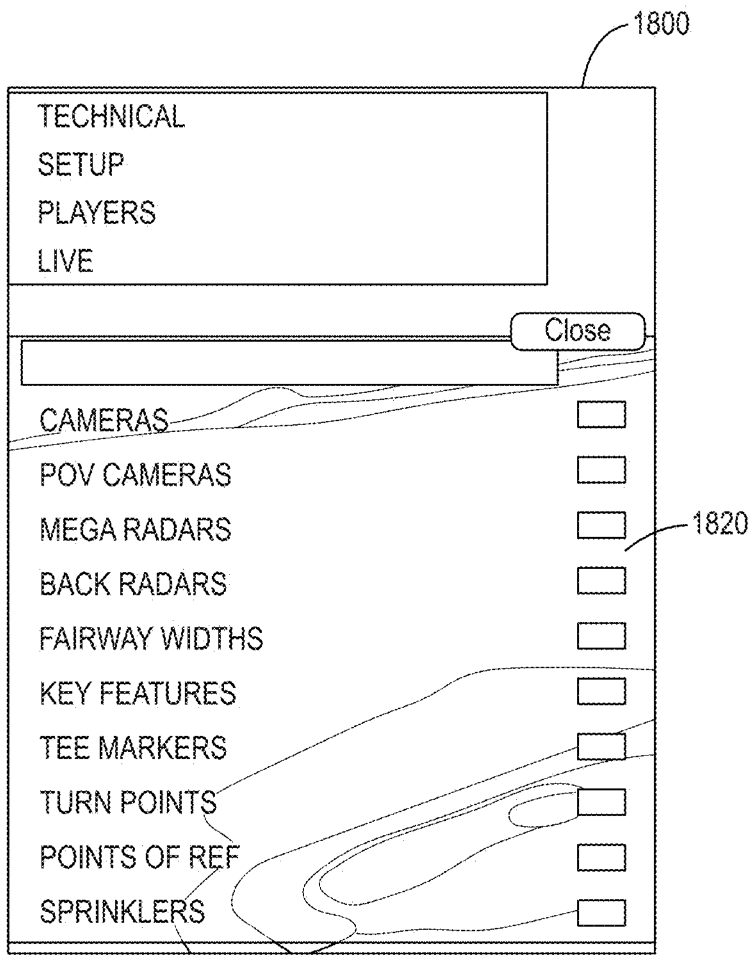
FIG. 18 illustrates a course technical detail menu of a map and visualization system according to various embodiments described herein.

FIG. 18 illustrates an example course technical detail menu 1800. The menu 1800 includes an inventory of technical features 1820 including cameras, point of view cameras, mega radars, back radars, fairway widths, key features, tee markers, turn points, points of reference, and sprinklers. Selection of an object from the list provides detailing information regarding the objects. The objects may be displaying in mapped views and their positions may be manipulated. Further selection of the appropriate objects may provide visualization of the coverage areas of the objects as described above.

In one embodiment, the map and visualization interface system 41 may be configured for content generation support operations. For example, using visualization aspects, the map and visualization interface system 41 may be utilized to assist in generating content for broadcast, digital, or social media by tracking when and where a ball appears in a camera view. This may be used to enable efficient video clipping. In one embodiment, the operations of the map and visualization interface system 41 deployed to provide seamless content generation across multiple platforms. For example, the tracking system management module 40 may manage device positions while leveraging historical data and predictive analysis to ensuring optimal coverage of the course. From this, the map and visualization interface system 41 may generate and distribute real-time content from cameras, such as media cameras, which may be integrated across multiple platforms such as websites, apps, social media, broadcasts, and the like. In one example, the tracking system management module 40 includes one or more of a Live Mode feature wherein live image snapshots or live video streams are captured from cameras, a Demo Mode feature configured to provide a virtual cinematic showcase of interesting holes, shots, or other points of interest, a demo Mode feature that highlights shots from leading players, which can be integrated across platforms to offer an enhanced viewing experience.

Figure 19:
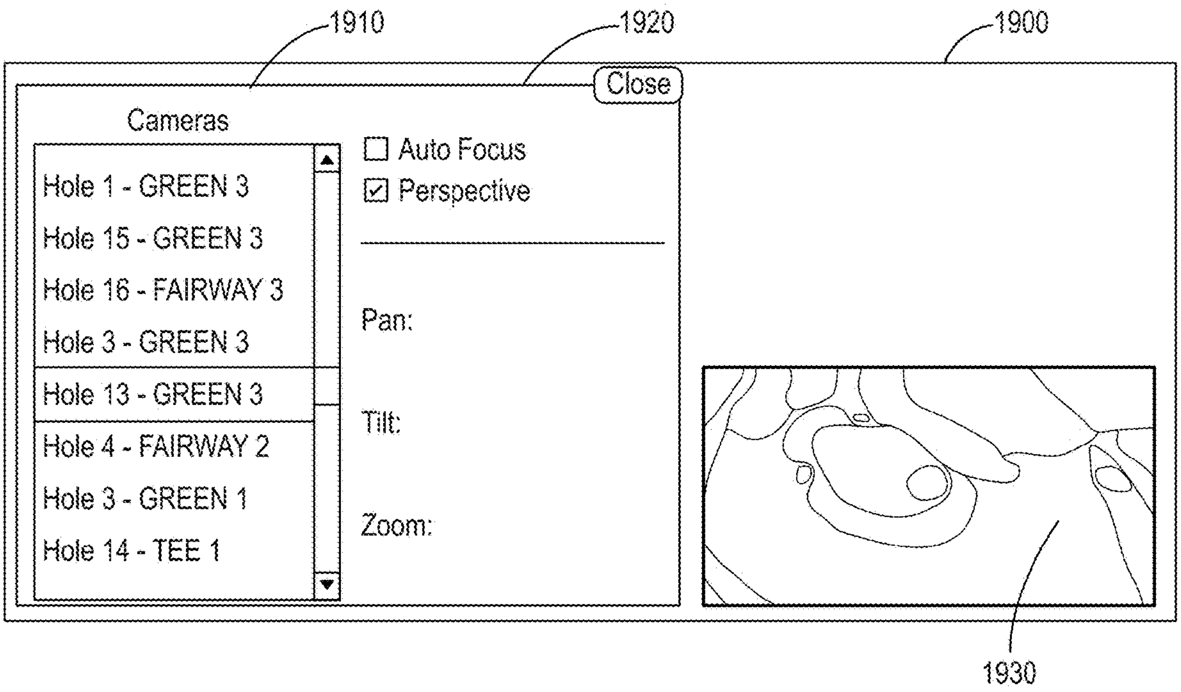
FIG. 19 illustrates a camera settings and picture-in-picture perspective view provided by 3D course perspective system according to various embodiments described herein.

FIG. 19 illustrates an example camera settings and picture-in-picture perspective view 1900. A list 1910 of available cameras for managing is provided is a menu. The cameras are identified by hole, location, and hole location number. Selection of a camera displays information about the selected camera. A management operations interface 1920 is also displayed enabling user interaction to manage the camera position or field of view. For example, management operations with respect to controlling the pan, tilt, or zoom of the camera are provided. The menu also includes view controls for viewing a perspective view of the field of view of the camera. In the illustrated embodiment, a perspective view of the selected camera's field of view 1930 is displayed within a picture-in-picture rendering, wherein the perspective view overlays a course view. The view controls also include an autofocus button to cause autofocusing of the perspective view.

As noted above, the golf tournament management system 10 may comprise various computing hardware executing instructions that cause performance of the operations of the golf tournament management system 10. The hardware may include various computing devices such as servers or other digital computing processors, which may comprise or consist of a user device. The hardware may be distributed, centralized, cloud-based or otherwise. The computing devices may be local or remote with respect to a user device receiving user interactions. In one embodiment, the golf tournament management system 10 resides on and is executed by the user device. In this or another embodiment, the golf tournament management system 10 is configured with a client-server architecture, e.g., comprises one or more client-server applications. Other architectures, such as peer-to-peer may be used. In one embodiment, the golf tournament management system comprises a standalone application executed on a computing device, such as a user device. In some configurations, execution of the various operations of the golf tournament management system 10 may divided or partitioned between different computing devices, such as two or more of an application server, service, or user device. In some embodiments, one or more aspects of the rendering system 90 may comprise server-side operations that are served to the user device 8. In one example, all or a portion of the 3D course perspective system 310, mesh rendering engine 312, or both comprise client-side operations or components, e.g., associated with a client-side application executed on the user device.

The systems, e.g., modules, units, tools, and components thereof, and methods described herein may find use in applications beyond golf. For example, the systems and methods may be used to enable management of other events such as sporting events and concerts. The systems and methods disclosed herein may include still further functionalities and features. For example, the operative functions of the systems and methods may be configured to execute on a special-purpose processor specifically configured to carry out the operations provided by the systems and methods. Notably, the operative features and functionality provided by the systems and methods may increase the efficiency of computing devices that are being utilized to facilitate the functionality provided by the systems and the various methods disclosed herein. For example, a reduced amount of computer operations may need to be performed by the devices and components of the systems using the processors and memories of the systems than compared to traditional methodologies. In such a context, less processing power needs to be utilized because the processors and memories do not need to be dedicated for processing. As a result, there are substantial savings in the usage of computer resources by utilizing the software, techniques, protocols, and algorithms provided in the present disclosure. In certain embodiments, various operative functionality of the systems may be configured to execute on one or more graphics processors and/or application specific integrated processors. In some embodiments, various functions and features of the systems and methods may operate without any human intervention and may be conducted entirely by computing devices. In certain embodiments, for example, numerous computing devices may interact with devices of the systems to provide the functionality supported by the systems. Additionally, in certain embodiments, the computing devices of the systems may operate continuously and without human intervention to reduce the possibility of errors being introduced into the systems.

Figure 20:
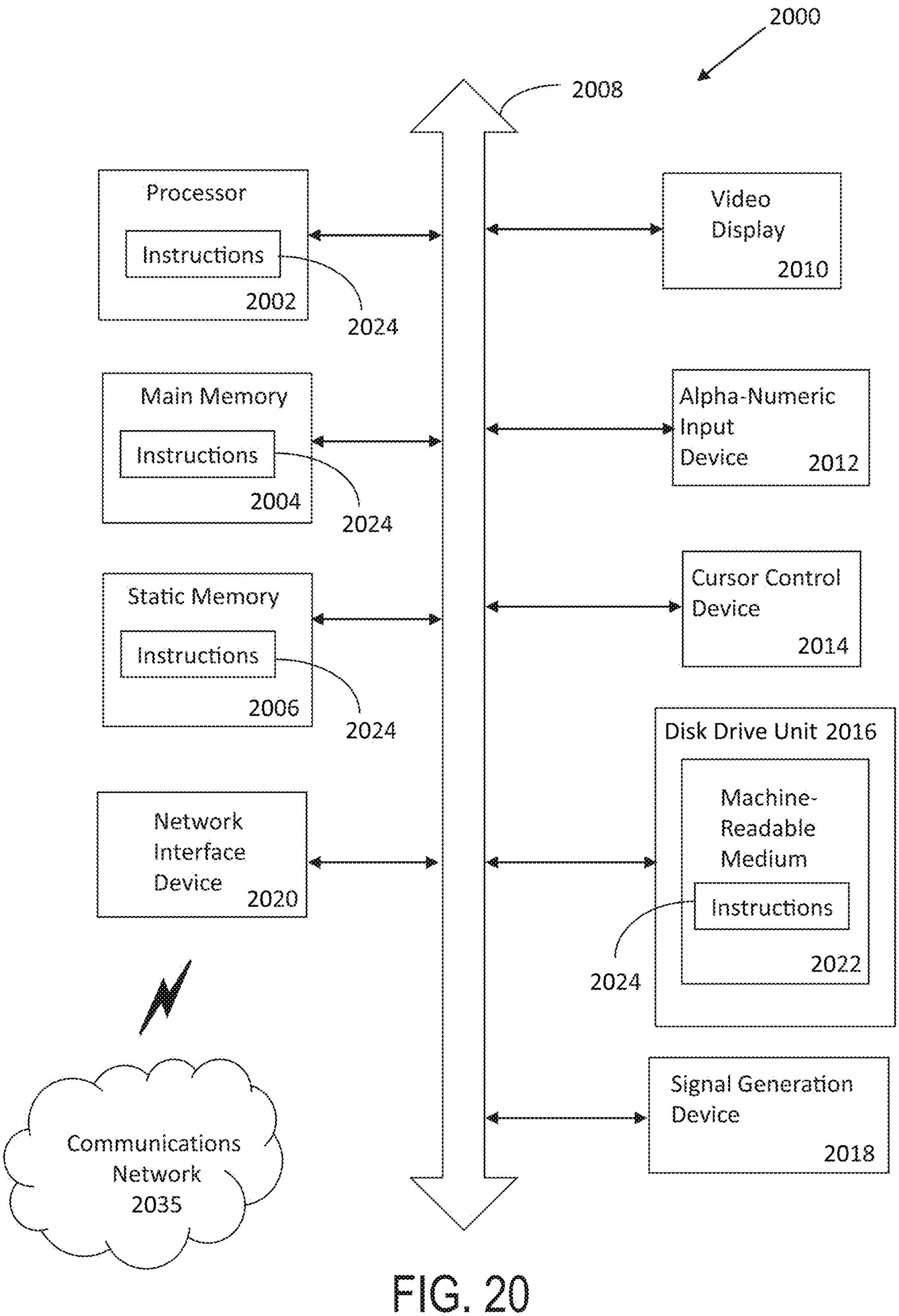
FIG. 20 is a schematic of a machine in the form of a computer system within which a set of instructions, when executed, may cause the machine to enable event broadcast production and distribution according to various embodiments described herein.

Referring now also to FIG. 20, at least a portion of the methodologies and techniques described with respect to the exemplary embodiments of the system (e.g., golf tournament management system 10) can incorporate a machine, such as, but not limited to, computer system 2000, or other computing device within which a set of instructions, when executed, may cause the machine to perform any one or more of the methodologies or functions discussed above. The machine may be configured to facilitate various operations conducted by the system. For example, the machine may be configured to, but is not limited to, assist the system by providing processing power to assist with processing loads experienced in the system, by providing storage capacity for storing instructions or data traversing the system, or by assisting with any other operations conducted by or within the system. As another example, the computer system 2000 may assist with obtaining event-related data, data transmission, modification of event-related data, data importation, data storage, data processing, data translation, data mapping, updates to any thereof, or a combination thereof, present in an environment being monitored by the system. As another example, the computer system 2000 may assist with output, distribution, or both of updates or assembling or compiling processed or modified GIS data or other data for delivery or distribution to clients, for viewing, manipulating, formatting, or combination thereof of the same.

In some embodiments, the machine may operate as a standalone device. In some embodiments, the machine may be connected to and assist with operations performed by other machines and systems, such as, but not limited to, any functionality, generator, simulator, database, engine, of other functionality described herein, any of which may be provided by such other machines or systems to the machine for use by system in performance of the operations described herein. The machine may be connected with any component in the system. In a networked deployment, the machine may operate in the capacity of a server or a client user machine in a server-client user network environment, or as a peer machine in a peer-to-peer (or distributed) network environment. The machine may operate in a cloud environment in which resources are distributed. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2000 may include a processor 2002 (e.g., a central processing unit (CPU), a graphics processing unit (GPU, or both), a main memory 2004 and a static memory 2006, which communicate with each other via a bus 2008. The computer system 2000 may further include a video display unit 2010, which may be, but is not limited to, a liquid crystal display (LCD), a flat panel, a solid-state display, or a cathode ray tube (CRT). The computer system 2000 may include an input device 2012, such as, but not limited to, a keyboard, a cursor control device 2014, such as, but not limited to, a mouse, a disk drive unit 2016, a signal generation device 2018, such as, but not limited to, a speaker or remote control, and a network interface device 2020. The network interface device 2035 may handle data communications for other devices, modules, units, or components of the system or another system or machine.

The disk drive unit 2016 may include a machine-readable medium 2022 on which is stored one or more sets of instructions 2024, such as, but not limited to, software embodying any one or more of the methodologies or functions described herein, including those methods illustrated above. The instructions 2024 may also reside, completely or at least partially, within the main memory 2004, the static memory 2006, or within the processor 2002, or a combination thereof, during execution thereof by the computer system 2000. The main memory 2004 and the processor 2002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2022 containing instructions 2024 so that a device connected to the communications network 2035, another network, or a combination thereof, can send or receive voice, video or data, and communicate over the communications network 2035, another network, or a combination thereof, using the instructions. The instructions 2024 may further be transmitted or received over the communications network 2035, another network, or a combination thereof, via the network interface device 2020.

While the machine-readable medium 2022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure is not limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A golf tournament management system comprising:

a 3D course perspective system configured to convert golf course data, including topographical information, course layouts, and course variables into a 3D rendering format;

a mesh rendering engine configured to construct a high-fidelity terrain mesh to serve as a foundation for a graphical rendering of the golf course;

a 3D perspective interface configured to map textures and 3D models representing golf course features onto the mesh to render a 3D perspective view and enable user selective perspective navigation within the 3D perspective view, wherein the course variables comprise placement of one or more sensor devices comprising media devices or tracking devices, each of the sensor devices having a field of view with respect to a sensor coverage area, and wherein the 3D perspective interface is configured to provide field of view visualizations within the 3D perspective view comprising one or more of a point-of-view representing the field of view or a representative field of view overlay overlaid within the 3D perspective view; and coverage manipulation controls that allow a user to remotely address sensor device controls to manipulate coverage areas of actual sensor devices represented by sensor device objects within the 3D perspective view, wherein the 3D perspective interface is configured to track manipulations of the coverage areas and dynamically update a dynamic data layer to reflect the manipulations of the coverage areas, and wherein the sensor device controls include mechanized pan and tilt heads on which sensor devices are mounted that include a motor configured to drive pan and tilt movements and a control system addressable by the golf tournament management system to manipulate the field of view of mounted sensor devices.

2. The system of claim 1, further comprising a simulation engine configured to simulate play of a player field on the golf course and output performance metrics with respect to capture of balls, players, or both within the sensor coverage areas during the simulated play.

3. The system of claim 1, wherein the field of view visualizations comprise a 3D cone projection that originates from the sensor device and projects outward onto the course to visualize the coverage and field of view of the device.

4. A golf tournament management system comprising:

a 3D course perspective system configured to convert golf course data, including topographical information, course layouts, and course variables into a 3D rendering format;

a mesh rendering engine configured to construct a high-fidelity terrain mesh to serve as a foundation for a graphical rendering of the golf course; and a 3D perspective interface configured to map textures and 3D models representing golf course features onto the mesh to render a 3D perspective view and enable user selective perspective navigation within the 3D perspective view, wherein the course variables comprise placement of one or more sensor devices comprising media devices or tracking devices, each of the sensor devices having a field of view with respect to a sensor coverage area, and wherein the 3D perspective interface is configured to provide field of view visualizations within the 3D perspective view comprising one or more of a point-of-view representing the field of view or a representative field of view overlay overlaid within the 3D perspective view, wherein the 3D perspective interface is configured to execute algorithms that receive terrain mesh data from the mesh rendering engine and obstruction data and, in response to user interaction adjustments to a sensor device's position or orientation within the 3D perspective view, dynamically recalculate and update the sensor coverage area of the adjusted sensor device within the 3D perspective view based on terrain topology, including elevation changes, surface contours, and obstructions.

* * * * *